(12) United States Patent
Richmond

(10) Patent No.: US 7,448,347 B2
(45) Date of Patent: Nov. 11, 2008

(54) ILLUMINATED HUMMINGBIRD FEEDER

(76) Inventor: Simon Nicholas Richmond, 42 Grasmere Rd., Princeton, NJ (US) 08540

( * ) Notice: Subject to any disclaimer, the term of this patent is extended or adjusted under 35 U.S.C. 154(b) by 53 days.

(21) Appl. No.: 11/755,917

(22) Filed: May 31, 2007

(65) Prior Publication Data
US 2007/0221133 A1  Sep. 27, 2007

Related U.S. Application Data

(63) Continuation of application No. 11/420,160, filed on May 24, 2006, and a continuation of application No. 11/303,247, filed on Dec. 16, 2005, now Pat. No. 7,336,157.

(60) Provisional application No. 60/811,137, filed on Jun. 5, 2006.

(51) Int. Cl.
*A01K 39/00* (2006.01)
(52) U.S. Cl. .................................... 119/72
(58) Field of Classification Search ............ 119/72, 119/52.2, 57.8, 57.9, 428, 429, 452; 340/815.73, 340/815.74, 815.77, 815.83, 539.26, 839.28, 340/601, 693.6; 362/84, 183, 186, 363
See application file for complete search history.

(56) References Cited

U.S. PATENT DOCUMENTS 3,720,184 A   3/1973   Pearce
4,558,662 A   12/1985  Peterson
5,454,348 A   10/1995  Colwell et al.
5,682,835 A   11/1997  Walter et al.
5,868,101 A * 2/1999   Marshall ................. 119/428
5,918,415 A * 7/1999   Locke et al. ............... 47/79
5,947,054 A * 9/1999   Liethen ................... 119/59.9
6,276,298 B1 * 8/2001  Welsh .................... 119/52.3
D454,669 S   3/2002   Lieb
6,584,933 B1 * 7/2003  Stone .................... 119/57.9
6,830,009 B1  12/2004  Kuelbs
6,901,882 B2 * 6/2005  Kuelbs ................... 119/452
D509,325 S * 9/2005   Jung et al. ............. D30/127
D517,749 S * 3/2006   Jung et al. ............. D30/124
7,017,521 B2  3/2006   Kuelbs
7,168,392 B2 * 1/2007  Kuelbs ................... 119/452
2006/0070578 A1 * 4/2006 Pavlik .................. 119/51.11
2007/0028846 A1 * 2/2007 Cohen .................... 119/69.5
2007/0274066 A1 * 11/2007 Lodhie et al. ............ 362/183
2008/0029035 A1 * 2/2008 Gou ..................... 119/52.2

* cited by examiner

*Primary Examiner*—Yvonne R. Abbott
(74) *Attorney, Agent, or Firm*—Fox Rothschild LLP; Richard C. Woodbridge

(57) ABSTRACT

A hummingbird feeder includes a solar panel power source for illuminating a reservoir of liquid hummingbird food so that the hummingbird can find it at night. The solar panel itself preferably hangs below the feeder in a flexible manner so that it can collect the maximum amount of sunlight and swing in the breeze. An LED attached to the solar power source is positioned to illuminate the liquid reservoir from within the reservoir. The parts that comprise the feeder are easily disassembled for washing and cleaning.

14 Claims, 37 Drawing Sheets ion Ser. No. 11/303,247 filed on
ILLUMINATED HUMMINGBIRD FEEDER

CROSS REFERENCE TO RELATED APPLICATIONS

This application claims the benefit of and is related to U.S. Provisional Patent Application 60/811,137 filed on Jun. 5, 2006 by Simon N. Richmond entitled "Illuminated Hummingbird feeder" and claims priority to and is a Continuation-In-Part of U.S. patent applicat Dec. 16, 2005 now U.S. Pat. No. 7,336,157 by Simon N. Richmond entitled "An Illuminated Wind Chime", and claims priority to and is a Continuation-In-Part of U.S. patent application Ser. No. 11/420,160 filed on May 24, 2006 by Simon N. Richmond entitled "A Solar Powered Fluorescent Gazing Globe", the entire contents of all three applications are hereby incorporated by reference.

BACKGROUND OF THE INVENTION

1. Field of the Invention

This application relates generally to hummingbird feeders and, in particular, to hummingbird feeders having solar-powered internal illumination of an aqueous nutrient solution for feeding at night.

2. Description of Related Art

People achieve pleasure from watching hummingbirds fly. Consequently, people who live in areas inhabited by hummingbirds often encourage their presence via the use of hummingbird feeders, the sugar-laden solution within giving the birds extra energy to hunt their main food of small insects. Hummingbird feeders differ from conventional seed type bird feeders in that they provide a liquid solution of granulated sugar and water as opposed to dry feed.

There are basically four common types or configurations of hummingbird feeders.

A first type utilizes a tube extending from the bottom of a bottle such as is shown in U.S. Pat. No. 4,558,662. The aforementioned type of hummingbird feeder exposes the solution which the hummingbirds drink at the bottom of the tube while in flight.

A second type utilizes a tube extending from above and to the side of a reservoir, often resembling a flower as disclosed in U.S. Design Pat. No. D454,669.

A third type of hummingbird feeder comprises a bottle or jar, the neck of which is located inside a covered bowl. The aforementioned type of hummingbird feeder is disclosed in U.S. Pat. Nos. 5,682,835 and 3,720,184. This type of feeder utilizes an internal vacuum to meter the flow of the solution of the bottle according to demand from the hummingbirds.

A fourth type of feeder is a pan or shallow bowl with a cover as disclosed in U.S. Pat. No. 5,454,348.

Solar energy systems that collect solar energy and convert it into electrical energy have been around for many years. However, only recently have these solar energy systems been developed to the point where they are small enough, efficient enough, and economical enough, to allow their widespread use in small electrical devices. One use of these small solar energy systems is to recharge rechargeable batteries in small household devices such as outdoor landscaping lighting. The rechargeable batteries provide power to illuminate the lighting elements during darkness, and the solar energy system collects and converts solar energy and recharges the rechargeable batteries during daylight. Another use is to illuminate bird seed feeders.

Solar illuminated bird feeders are known in the prior art and disclosed, for example, in U.S. Pat. Nos. 6,830,009, 6,901,882 and 7,017,521. Most current embodiments of solar lighted bird feeders have illumination sources outside the bird seed reservoir usually shining downward to illuminate the perch from above or illuminate part of the food reservoir from above. Some current embodiments of solar lighted bird feeders use light impermeable solid type feed. All current embodiments of solar lighted bird feeders are designed for using light-impermeable seed type feed. Some of the bird seed may also be illuminated but since bird seed is not light transmissive, only the region proximate to a surface of the food reservoir of a filled solar birdfeeder is illuminated. Thus the prior art does not disclose a bird feeder that illuminates throughout the food reservoir. Further, the seed reservoirs are usually a smooth sided glass or plastic material which reflects a substantial amount of light off the reservoir surface due to the low angle of incidence of the light source in relation the angle of the surface of the food reservoir. Thus there is a need for a solar lighted bird feeder that illuminates both a food reservoir and most of the food source therein. The present invention satisfies this need.

It is well known that a hummingbird's usage pattern may be broken if the feeder is empty. Accordingly, for best results and for the welfare of migrating hummingbirds, there is a need to keep fresh feeding solution for at least one week after the last bird has been seen feeding. The average hummingbird can consume up to 50% of its body weight in liquid food daily. The owner of a hummingbird feeder may enjoy watching the hummingbirds feed early during the day before they travel to their work. However, many people return home from work after dark. On an evening when a user cannot readily determine the solution level in the feeder and thus if the feeder needs refilling, the need is not readily apparent in the dark. Attempts to solve this problem have generally been based around simply increasing the food reservoir size but such an approach is not always practical as the solution has a tendency to spoil rapidly. The present invention overcomes such a problem by illuminating the liquid food supply so that it is visible from a distance at night. Thus there is a need for solar powered illuminated hummingbird feeder.

As noted above, it would be useful to know when the hummingbird feeder is approaching an empty state. Utilizing the change in weight of the declining food source in the feeder is a useful method of determining an approaching empty state before the feeder is empty. With seed based feeders, the various birdseed types have varying volume-to-weight ratios so it may be difficult to establish a universal "almost empty weight" for a seed feeder. Unlike seed used in solid birdseed feeders, the liquid food source used in hummingbird feeders has a relatively constant weight to volume relationship. Accordingly, it is relatively straightforward to establish a weight of the hummingbird feeder when it is not completely empty but is almost empty of the liquid food source. In the preferred embodiment of the present invention this problem is solved by the hummingbird feeder providing an alert system when the hummingbird feeder needs refilling. In the preferred embodiment, there is a visual alert system that is visible in low light conditions. Alternatively or additionally, there may be an acoustic alert system or the feeder may provide an alert system using radio frequency communication to a remote receiver unit.

Some hummingbirds commence feeding as early as 30 minutes before sunrise. However, it is dark at that time and thus not suitable for the owner of a feeder to view the hummingbird feeding. One embodiment of the present invention partially ameliorates such a problem by illuminating part of the feeder.

Some bird feeders use a phosphorescent glass food reservoir to provide some low level of illumination for a few hours at dusk, however, such a method of illumination does not visibly and clearly illuminate a liquid feed solution. This problem can be overcome by internally illuminating the light transmissive glass food reservoir from within using a high efficiency light emitting diode (LED). Then at night the liquid food solution is visible. The LED requires electrical power to operate. One method of powering is electrical cabling running from a main power supply near a house to the feeder. This is often inconvenient as the feeder may be located at an impractical distance from an electrical outlet. Accordingly, the present invention overcomes this problem by powering the LED by batteries of a common size and type. Alkaline batteries are economical but require frequent replacement which may be inconvenient for the owner. The present invention overcomes this problem by providing batteries which are recharged by a solar charging system thus removing the need for regular battery replacement.

Unlike seed type bird feeders, hummingbird feeders use a liquid food solution rich in sugar. Accordingly, the solution can spoil very easily and hummingbirds will not consume spoiled feed solution. Most feeders should be cleaned bi-weekly. This usually necessitates immersion of the solution contacting parts in water. Attempts have been made to circumvent this problem by making disposable hummingbird feeders but this is uneconomical and wasteful. Accordingly, frequent submersion washing is normally required for hummingbird feeders. One problem that exists with solar illuminated hummingbird feeders is the electrical parts that create the solar illumination are not usually suitable for water immersion. Accordingly, the present invention is designed such that the solar and water sensitive electrical parts are easily removable from the parts that require frequent washing and cleaning.

Most solar garden lights and solar birdfeeders use solar panels located on an upward facing surface of an upper canopy or housing because they utilize photovoltaic silicon solar panels made using a crystalline structure. This type of solar panel needs direct sunlight to charge normally and so the usual best orientation for receiving direct sunlight is a horizontally oriented solar panel located on an upper surface of the canopy or housing. However, in many situations it may be preferable to hang a bird feeder from a tree branch for support and to attract the birds to a more natural feeding environment. Unfortunately, the foliage or the branch itself may partially restrict the amount of sunlight or light energy from reaching the top of the bird feeder or lighting device and thus the solar panel. As a result, solar panels on the top of the light device or birdfeeder do not receive adequate sunlight to fully charge their batteries and fail to provide illumination of adequate duration. An embodiment of the present invention overcomes this problem by utilizing back-to-back thin-film amorphous silicon solar panels suspended vertically below the hummingbird feeder or solar light where it is low enough to be out of the way of the light blocking of foliage and can use ambient light to charge the solar panels instead of requiring direct sunlight.

Also, trees are usually planted and located a safe distance away from house and window structures to prevent damage from falling tree branches and migration of wood damaging insects such as termites or other pests that may use the tree structure as a means of invading the house structure. In addition, in wildfire prone areas, trees in close vicinity to homes are usually cut to provide a fire break or buffer in the event of a wildfire. An embodiment of the present invention overcomes these problems by providing a self supporting solar illuminated hummingbird feeder where it may be located in a sunny location away from trees but close to houses where the illuminated hummingbird feeder may be viewed from inside the home at night.

The manufacture of a solar illuminated garden light or solar bird feeder involves disparate manufacturing techniques. The housings are often made from a variety of materials including stamped metals, cast metals, thermoplastics and glass. The manufacturing facilities and environment for these materials is dramatically different from the manufacturing environment required to produce the electronics assemblies that form the solar charging and lighting functions. As a result the electronics assembly is often conducted remotely from activities such as die-casting of metal housings, some times in different countries. This means that the housings are usually transported to the electronics assembly locations. Unfortunately, the housings are the bulkiest and most expensive parts to send by freight but this has been the practice because the solar and electronic parts are integrally assembled into the housings. Further, many lighting and birdfeeder housings have different shaped and sloped regions on their top portions which makes some designs not suitable for locating solar panels thereon and those designs are not produced as solar products. Further, a factory may produce multiple housing designs which need to have solar panels incorporated therein. This results in some designs not being produced with solar functions and results in many different shaped and sized solar panel components that must be ordered from the solar panel producers. An embodiment of the present invention overcomes these problems by combining all the electronic solar charging, power storing, control and illumination components into an easily assembled module that may be incorporated into most hanging light fixtures and attached in a final assembly operation at any suitable location without any specialized equipment.

The size of a solar panel in most commonly sold landscape lights is usually sized in capacity to fully charge a power source in six to eight hours of direct sunlight. If the panel is sized with a larger charging capacity, the battery may be fully charged earlier and then the extra power generated by the panel is wasted. If the panel is sized with a smaller charging capacity, the battery may not be fully charged and might not illuminate the light source connected to the battery for the duration of time the light source was intended to illuminate. Since the solar panel is a major cost component of a solar landscape light, manufacturers have a problem in determining an optimal charging capacity of solar panel that finds a balance between insufficient operating hours with a lower cost i.e. and expensive wasted solar power generation.

Further, there are factors that are outside the control of the manufacturer of the solar light that affect the number of daily hours and strength of direct sunlight received by the solar panel. These include, the latitude of the light installation, the cloudy density and coverage, the season, and local shading conditions including structures, plants and trees that may block direct sunlight from reaching the solar panels for some period of time. Accordingly, there are situations where the solar light may not be fully charging the battery when located at its installed location by the user. Many solar landscape lights are sold in a convenience set with 4, 6, or more lights in a single retail package. When installed, in some situations, for example, where a plurality of solar landscape lights have been installed in a garden, there may be some light fixtures that are receiving adequate sunlight and some that are receiving inadequate sunlight. Further, as the seasons change some installed lights may not be receiving sufficient light for the solar panel to fully charge the battery. One embodiment of the present invention overcomes part of these performance problems utilizing a suspended releasably attachable vertically oriented booster solar panel to provide additional charging capacity where and when required.

BRIEF SUMMARY OF THE INVENTION

Briefly describe, it would be desirable to provide an illuminated hummingbird feeder which provides a different nighttime aesthetic appearance, as well as providing all the ease of use and cleaning of a non-electrically illuminated hummingbird feeder.

Therefore, the present invention provides a solar powered hummingbird feeder which illuminates from within the aqueous nutrient solution.

The aforementioned illumination effect is achieved by providing a hummingbird feeder having a rechargeable electrical power source and a solar energy system that collects solar energy, converts it into electrical energy, uses the electrical energy to recharge the rechargeable electrical power source, uses the electrical power source to power a light source which illuminates a liquid food source contained with the feeder so the liquid food source illuminates and is visible in low light conditions. It is also achieved by a novel releasable solar powered illumination assembly system to facilitate maintenance.

The solar powered bird feeder according to the present invention provides significant advantages, including: (1) the rechargeable electrical power source can be recharged by the solar energy system; (2) the lighting element allows the level of the food liquid in the hummingbird feeder to be monitored at night; and (3) the releasable solar electronics module facilitates easy and regular washing of the feeder parts. These and other features, objects and advantages of the present invention will be evident from the will be more fully understood by references to the following drawings and detailed description of the invention.

DETAILED DESCRIPTION OF THE INVENTION

A preferred embodiment and alternative embodiments of the present invention will now be described by reference to the accompanying drawings in which, as far as possible, like numbers represent like elements.

The present invention relates primarily to hummingbird feeders and particularly to solar powered illuminated hummingbird feeders.

Figure 1:
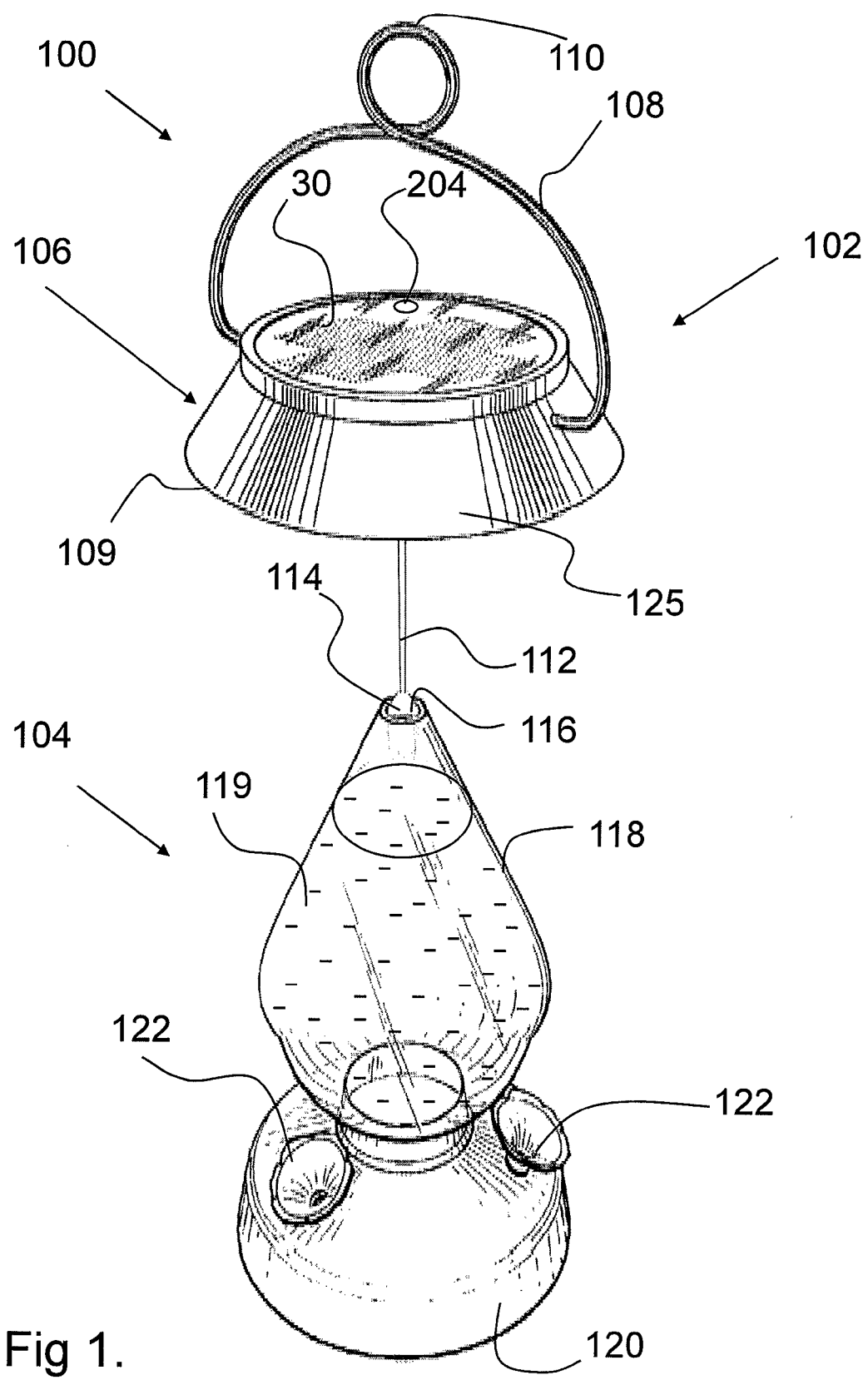
FIG. 1 is a schematic view of an assembled solar powered illuminated hummingbird feeder in accordance with the preferred embodiment of the present invention.

FIG. 1 is a schematic view of an assembled solar powered illuminated hummingbird feeder in accordance with the preferred embodiment of the present invention. In the embodiment illustrated in FIG. 1, the light device 100 includes a shade canopy assembly 102. A housing portion 106 is suspended below a hanger frame 108 positioned to be suspended from a zenith point 110. The housing portion 106 may be made from metal, plastic, wood or other suitable material or combination thereof. The upper shade portion of the housing 106 is made from a non-rusting metal such as brass or aluminum and the lower portion of the housing 106 is made from a thermoplastic. Disposed upon the surface of the housing portion 106 are several solar photovoltaic panels 30 that in the present embodiment 100 are of a crystalline silicon structure. The solar panels 30 are assembled using a lamination process as opposed to an epoxy embedded process. As an alternative, one or more amorphous silicon type solar panels 30 may be used. The shade canopy assembly 102 includes a suspension assembly 112 moveably suspended from the housing portion 106.

Figure 7:
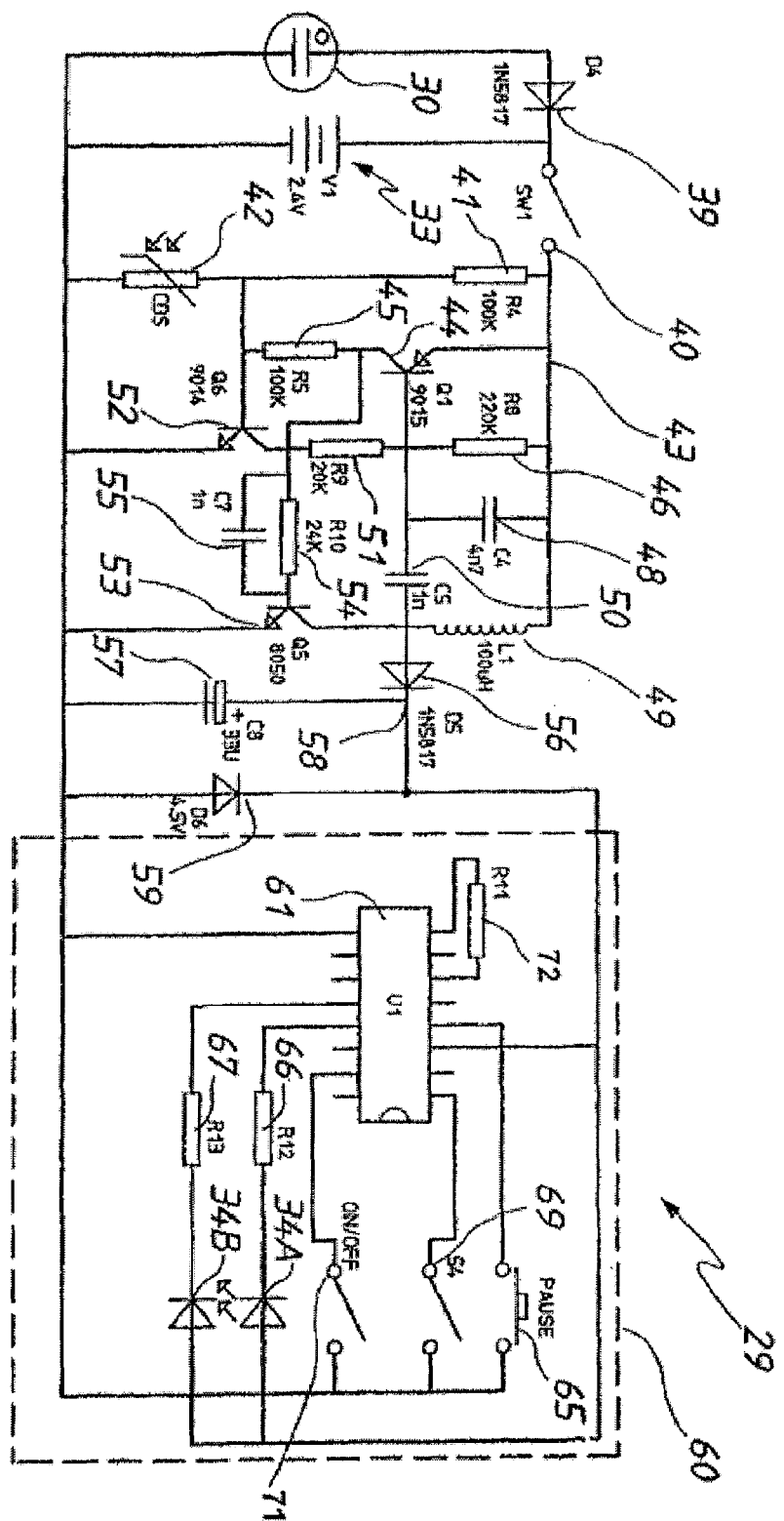
FIG. 7 is an electronic schematic diagram illustrating a power control circuit which may be used in the preferred embodiment.

Disposed within the housing 106 is a rechargeable power source which is recharged by the solar panels 30. In the preferred embodiment 100 the rechargeable power source comprised two AA size 600 mA/hour nickel cadmium batteries 124 as shown in FIG. 8B. Alternatively, other rechargeable power sources may be used including one or more nickel metal hydride batteries, rechargeable alkaline batteries, lead acid batteries, lithium ion batteries or similar rechargeable devices. Access to the batteries 124 for replacement is through a user accessible battery compartment located on the underside of the housing 106. A power supply circuit connects the solar panels 30 in series to a forward based diode, which is in turn connected to a positive terminal of at least one battery 124. A negative terminal of the battery 124 is then connected to the solar panel 30 to complete a power supply circuit. In the example shown herein, the diode may be a model number IN5817 Schottky diode 39 as shown in FIG. 7. It will be apparent to a person skilled in the art that other diode and battery configurations may be utilized without departing from the spirit and scope of the invention. When the solar panel 30 is exposed to sufficient light, the solar panel 30 converts some of the solar energy to electrical energy and creates a current that passes through the diode to charge the battery 124. Thus, during the day the solar panel 30 converts energy from the sun to charge the battery 124. The diode 39 prevents the battery 124 from expending any power on the solar panel 30.

Located within the housing 106 is the control unit 109 which may be arranged to sense the ambient light level, for example, in the present example, a light dependent cadmium sulfide resistor 204 is located in a light exposed location upon the housing, and if a determination is made by the circuit that insufficient ambient light is available, a connection is made between the batteries 124 and a light source 402, as seen in FIG. 6C, disposed at the end of the light source suspension cable 112 within a suspended releasable lighting module 114. An example of a circuit used in the control unit is shown in FIG. 7. If a determination is made that sufficient ambient light is available, a connection is not made between the batteries 124 and the light source 402 and current does not flow from the batteries 124. Specifically, the positive terminal of the battery 124 is connected to a switch 40 shown in FIG. 7 which is in turn connected to a 100 kΩ first resistor 41 as also shown in FIG. 7. The first resistor 41 is connected in series with a second, light dependent resistor 204 as seen in FIG. 8B. The second resistor 204 connects to the negative terminal of the batteries 124 to complete the lighting circuit. The value of resistance of the second resistor 204 depends upon the amount of light to which the second resistor 204 is exposed. When there is not much light, such as occurs at night, the value of the second resistor 204 increases. During the daytime, when there is sufficient light, the value of the second resistor 204 decreases. Accordingly, the resistor 204 allows the lighting circuit to operate only when there is insufficient light, i.e. at night.

Figure 2:
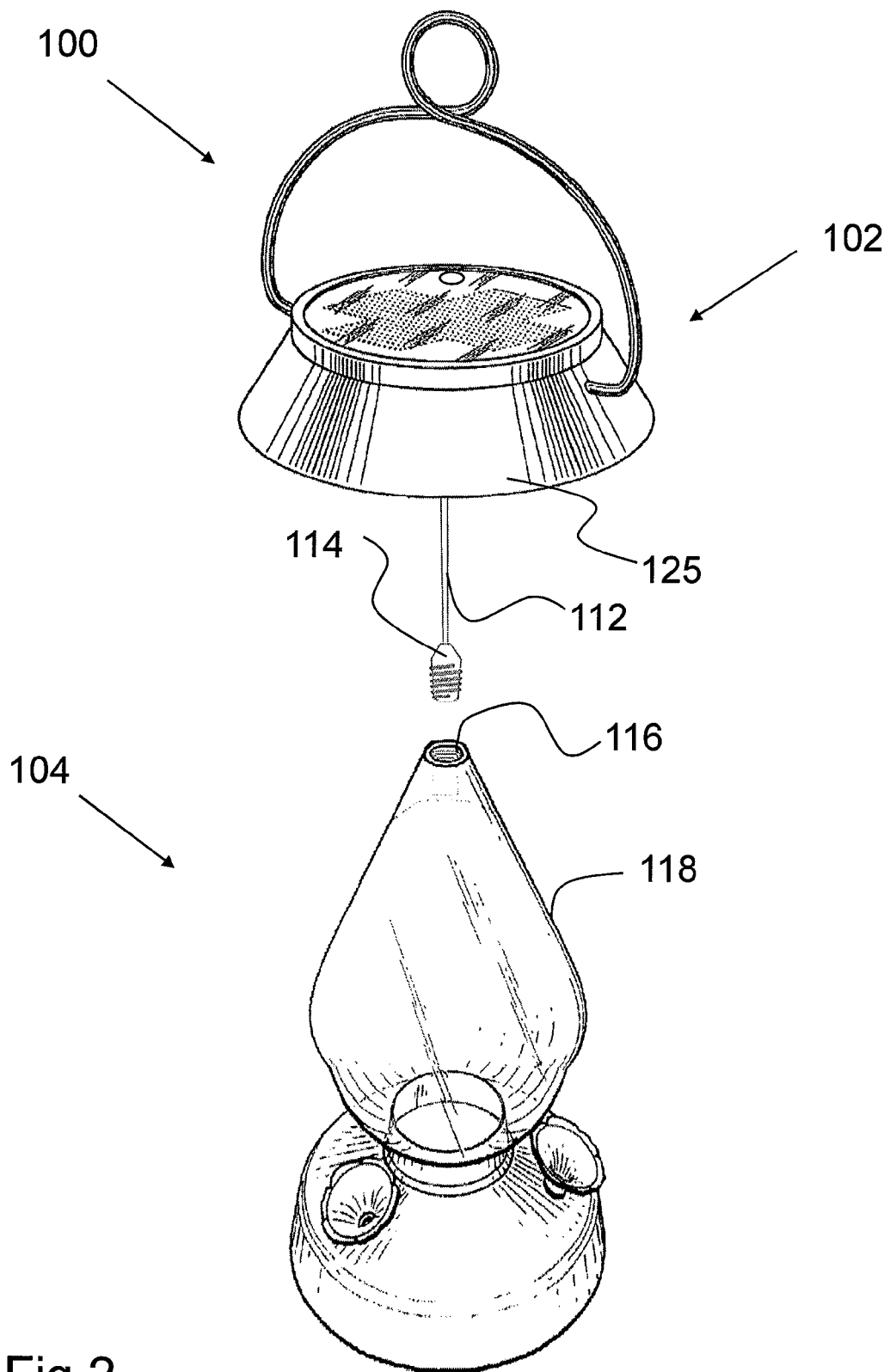
FIG. 2 is a schematic view of the preferred embodiment of the solar powered illuminated hummingbird feeder as shown in FIG. 1 in a partially unassembled state.

The assembly includes a suspension assembly 112 moveably suspended from the housing portion 102. Releasably attached to and connected below the suspension assembly 112 via a releasable lighting module 114 which engages with a socket housing module 116 is the hummingbird feeding assembly 104 as seen in FIG. 2. The feeding assembly 104 includes a liquid food reservoir 118 containing a nectar-like liquid food source 119, a covered feeding bowl assembly 120 and feeding stations 122.

The liquid food reservoir 118 is partially conical in shape with the upper narrow closed end and the lower end open. The only opening in the liquid food reservoir 118 is the lower end. Near the lower end of the liquid food reservoir 118 is a narrow flange. Between the flange and the open end of the liquid food reservoir 118 are threads which are located to securably connect with the covered feeding bowl assembly 120.

The covered feeding bowl assembly 120 is preferably circular in shape. The bottom portion has a central indentation projecting up into the cavity of the bowl assembly 120 thereby preventing pooling of the nectar in the center of the bowl away from the nectar ports 122. A plurality of small apertures is disposed in upper surface of the bowl assembly to accommodate the feeding stations 122.

The feeding stations 122 are the locations from which the hummingbird obtains nectar. Each feeding station 122 has a short narrow insert with an aperture running therethrough designed to accommodate the beaks and tongues of hummingbirds. The feeding stations 122 are preferably rimmed by a decorative blossom-shaped flange extending radially outward.

A suitable durable material to use in fabricating the feeding assembly 104 is polycarbonate plastic. The liquid food reservoir is made of glass. Hummingbirds respond to and are attracted by bright colors, particularly red. Thus the majority of the feeder assembly 104 is composed of red plastic and the feeding stations 122 are made of white plastic.

During sunny days, direct sunlight can cause the temperature of the liquid food source 119 located in the liquid food reservoir 118 to increase thus accelerating the time to fermentation process of the sugar-laden liquid food source 119. If the liquid food source 119 is not changed before it becomes fermented, i.e. spoiled, hummingbirds will not consume the food and will seek sustenance elsewhere. This may result in those hummingbirds no longer returning to the feeder 100 and negating a prime objective of all hummingbird feeders. In addition to housing the solar operative components, the shade canopy housing 102 has an overhanging canopy 106 that will provide some shade from the sun over the liquid food reservoir 118. This shading can help reduce the temperature of the liquid food source during the day and slow fermentation of the sugar in the solution and thus delaying the spoiling of the food source 119 and extending the useful life of the food source.

Assembly of the feeding assembly 104 is as follows: Being held upside down, the liquid food reservoir 118 is filled with a nectar solution 119. While still holding the liquid food reservoir 118 upside down, the bowl assembly 120 is screwed on securely. Then the feeding assembly 104 is quickly uprighted. The liquid nectar solution is shown at 119 in FIG. 1.

Since there are no other openings in the liquid food reservoir 122, the level of the nectar can be held at a higher elevation than the nectar level in the bowl assembly 120. When a sufficient amount of nectar is taken from the bowl assembly 120, air is able to bubble up in the liquid food reservoir 122, thus releasing a quantity of nectar into the bowl assembly 120. Any hole in the reservoir above the level of nectar in the bowl assembly 120 would cause the nectar 119 to leak out from either the hole itself or the bowl assembly through the feeding stations 122 because air would be then allowed to displace the nectar.

FIG. 2 is a schematic view of the preferred embodiment of the solar powered illuminated hummingbird feeder as shown in FIG. 1 in a partially exploded state. When the food reservoir is empty as shown in FIG. 2, the releasable feeding assembly 104 can be easily separated from the shade canopy assembly 102 by releasing the releasable lighting module 114 which is attached to the shade canopy assembly 102 from the socket housing module 116 located on the feeding assembly 104. The feeding assembly 104 can now be cleaned via washing and refilled without concern of damaging the water—sensitive electronics disposed within the shade canopy assembly 102.

Unlike seed type bird feeders, hummingbird feeders use a liquid food solution 119 rich in sugar. Accordingly, the solution can spoil very easily and hummingbirds will not consume spoiled feed solution. Most feeders should be cleaned biweekly. This usually necessitates immersion of the solution contacting parts in water. The electrical parts that create the solar illumination are not usually suitable for water immersion. Accordingly the releasable construction of the present invention ensures some of the solar and water sensitive electrical parts are easily removable from the parts that require frequent washing and cleaning.

Figure 18:
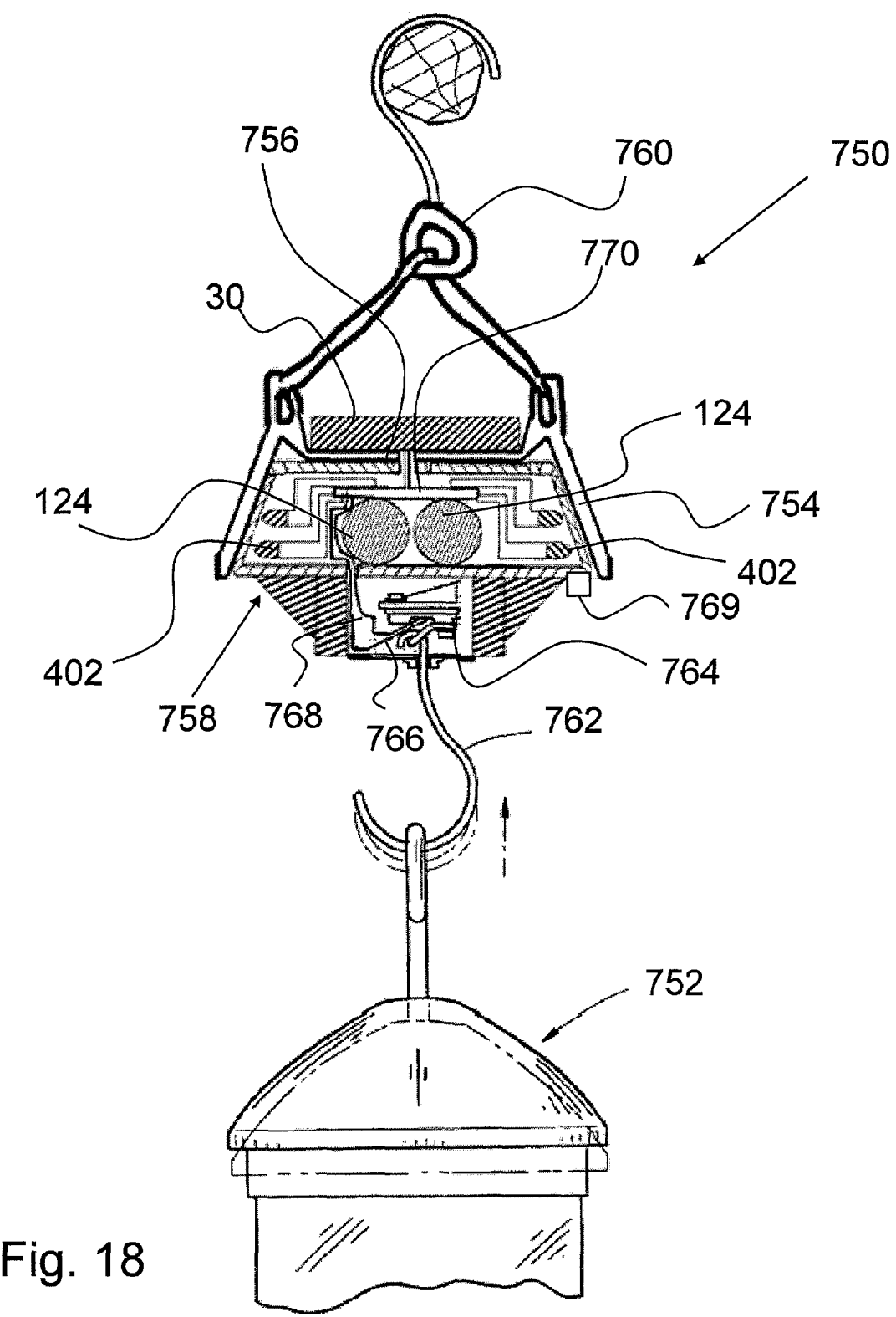
FIG. 18 is a cross-sectional view of a solar powered light fixture in accordance with a tenth embodiment of the present invention.

In one variation on the embodiment shown in FIGS. 1 and 2, there is also located within the housing 102 a sub-circuit 125 and structure 107 as shown in FIG. 18 that may be arranged to sense a change in the weight of the suspension assembly 112 connecting the hummingbird feeding assembly 104 below a predetermined weight and activate a predetermined lighting sequence or effect. If a determination is made by the sub-circuit 125 that insufficient weight is present, a connection is made between the batteries 124 and the sub-circuit 125 to vary the brightness of the light source 402 disposed at the end of the light source suspension cable 112 within a suspended releasable lighting module 114. If a determination is made that sufficient weight is present, a connection is not made between the batteries 124 and the sub-circuit 125 to vary the brightness of the light source 402. Thus if the liquid food source 119 is consumed such that the volume of the liquid food source 119 in the food reservoir 118 falls below an approximate predetermined level, the light source 402 in the lighting module 114 may illuminate the food reservoir 118 of the hummingbird feeder 100 in a flashing sequence at night thus alerting the owner of a refilling requirement. The structure 107 may include a load cell, spring mechanism or actuating contact arrangement to detect the change in weight below a predetermined level.

The flashing or varying light of the illuminated food reservoir 118 will assist the owner to locate the hummingbird feeder 100 for refilling. Further, when the owner removes the hummingbird feeding assembly 104 from the housing 102 for refilling or cleaning, the reduced weight will cause the sub-circuit 125 to activate the "refill" lighting sequence thus making it easier for the owner to locate the feeder in the dark at night to reconnect the food reservoir 118.

The structure 107 is a more specifically a load cell as shown in FIG. 18, and is calibrated such that when a filled hummingbird feeding assembly 104 is supported on the lower support 762, the circuit will be open. The load cell may be a S-load cell, a beam load cell, or any other type of load cell available on the market. If less than a predetermined weight is present on the hummingbird feeding assembly 104, such as when the feeder is empty, the load cell 107 will activate the sub-circuit 125 and the reduction in weight below a predetermined threshold of the feeding assembly 104 will activate the light 402 at night. The light 402 will flash to alert the owner to refill the feeder.

Figure 3A:
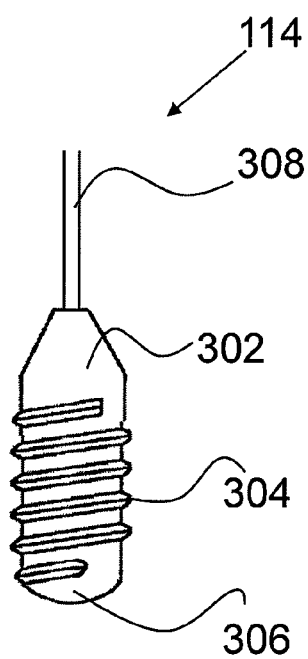
FIG. 3A is a detailed schematic view of a releasable lighting module for the solar powered illuminated hummingbird feeder as shown in the preferred embodiment of FIGS. 1 and 2.
Figure 3B:
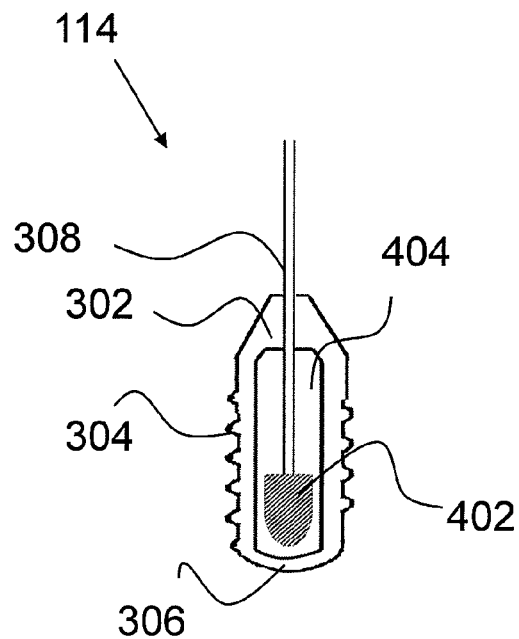
FIG. 3B is a cross-section view of the releasable lighting module shown in FIG. 3A.

FIGS. 3A and 3B show detail of the releasable lighting module 114 for the solar powered illuminated hummingbird feeder 100 shown in FIG. 2. The releasable lighting module 114 comprises a lighting module housing 302 that partially encloses a cavity 404. At the lower end of the lighting module housing is a lower lighting module portion 306 that is substantially light transmissive. Disposed within the lighting module housing 302 is at least one light source 402, preferably a light emitting diode (LED). The preferred LED never exceeds 100° Fahrenheit in temperature in order to avoid heating the liquid bird feed and accelerating its spoilage. In one embodiment, there are two or more LEDs disposed in the lighting module housing 302. On the outer side wall of the lighting module housing 302 are threads 304 to secure the lighting module 114 into a socket housing module of a feeder portion or other object to be illuminated that may include a bird feeder, wind chime, wind sock, lantern, lamp housing, globe, orb, garden ornament, planter, trellis, furniture or other object.

Figure 4:
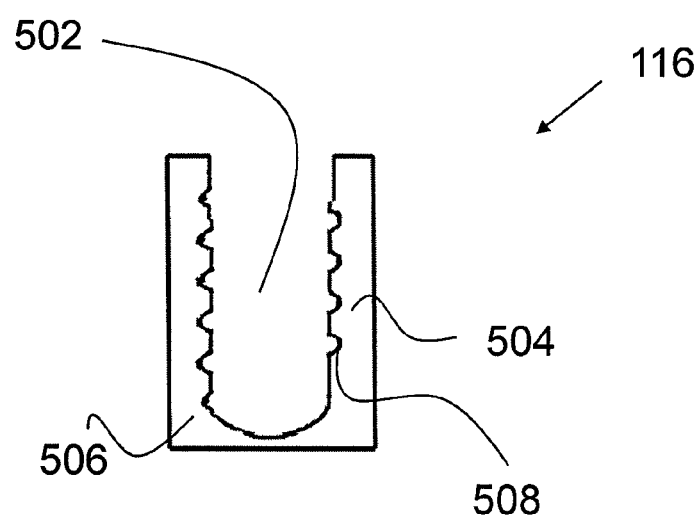
FIG. 4 is a cross-section view of a socket housing module of a solar powered illuminated hummingbird feeder in accordance with the preferred embodiment.

FIG. 4 is a cross-section view of a socket housing module 116 in accordance with the solar powered illuminated hummingbird feeder in accordance with the preferred embodiment. It comprises an open end, a substantially cylindrical outer wall 504 and a substantially light transmissive lower socket module portion 506. The interior shape creates a cavity 502 with reverse thread sections 508 that releasably mate with the thread 304 of the lighting module 114 shown in FIGS. 3 and 4.

Figure 5:
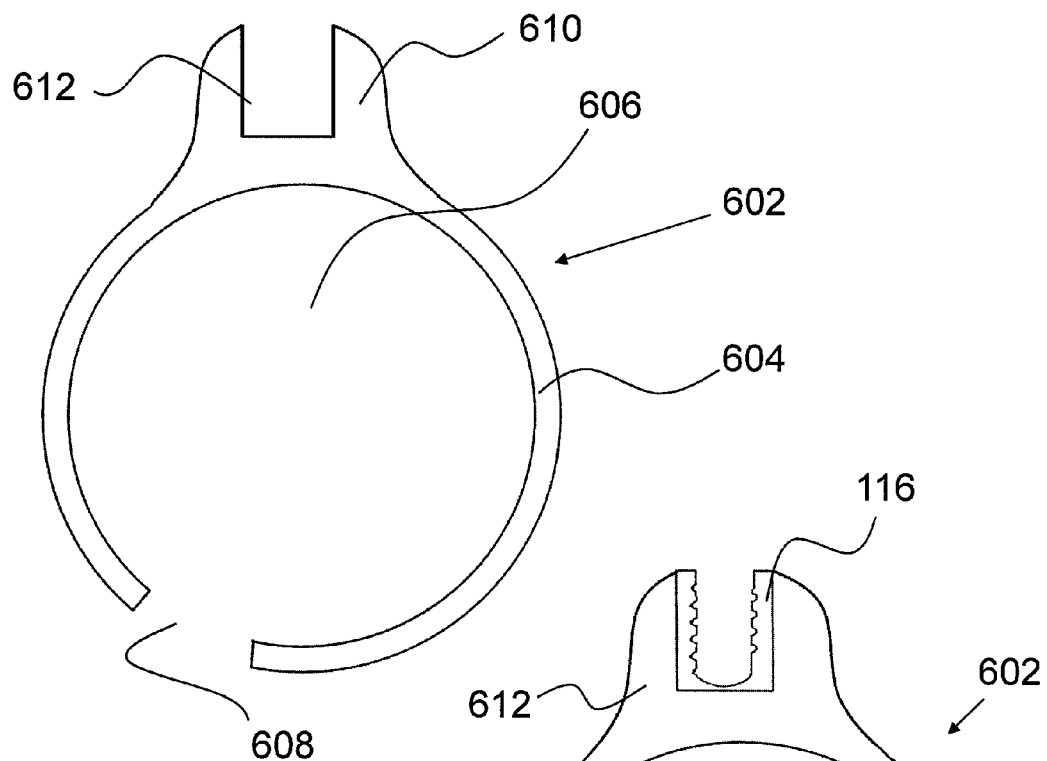
FIG. 5 is a cross-section view of an unassembled food reservoir for a solar powered illuminated in accordance with a second embodiment of the present invention.

FIG. 5 is a cross-sectional view of an unassembled food reservoir 602 for a solar powered illuminated hummingbird feeder in accordance with a second embodiment of the present invention. It shows the unassembled food reservoir 602 comprising an upper neck portion 610 that contains a socket receiving cavity 612, a reservoir portion 604 substantially enclosing a cavity 606, and an aperture 608. The unassembled food reservoir 602 is constructed from a hand-blown glass with the neck portion added and the aperture drilled out as second and third manufacturing operations respectively. Alternatively, there may be no socket receiving cavity 612 but instead the socket housing module 116 of FIG. 4 may be integrally formed with the neck portion 610. The food reservoir 602 is an elongated substantially cylindrically shaped container for housing liquid hummingbird feed solution. Other geometric shapes and sizes, as well as shapes in form of animals and flowers, of different colors for the solution reservoir are possible. The volume in the solution reservoir, or course, can vary depending on size of the food reservoir and the amount of feeding solution to be distributed therein. In addition, the feeder could be incorporated for feeding other types of birds and animals.

Figure 6A:
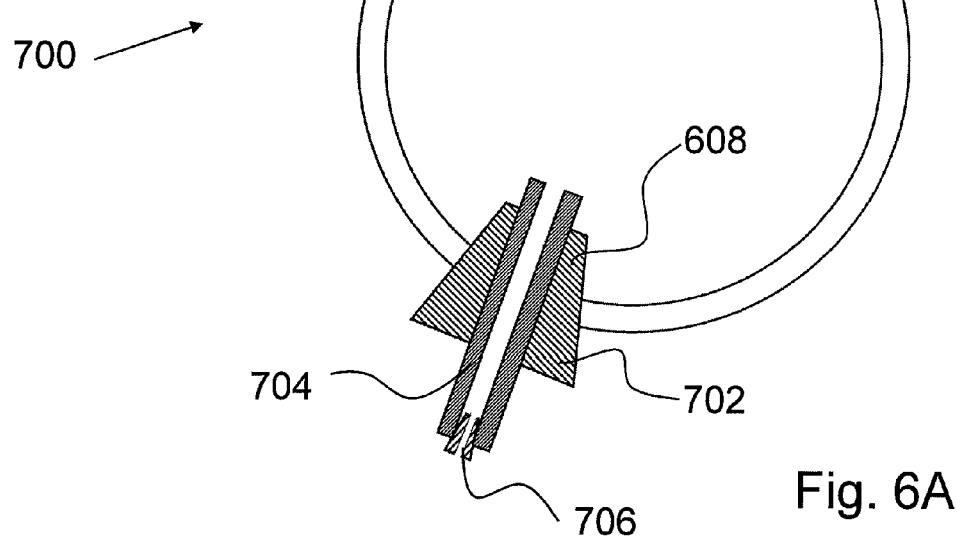
FIG. 6A is a cross-section view of a partially assembled solar powered illuminated hummingbird feeder in accordance with the second embodiment of the present invention shown in FIG. 5.

FIG. 6A is a cross-sectional view of a partially assembled solar powered illuminated hummingbird feeder in accordance with the second embodiment of the present invention shown in FIG. 5. A complete feeder assembly 700 is disclosed. The socket housing module 116 is permanently secured into the socket receiving cavity 612 of the food reservoir 602. Also disclosed is a feeding plug assembly 702 with a feeding tube 704 and liquid flow regulator 706. Disposed within the aperture 608 at a lower portion of the food reservoir 602 is the feeding plug assembly 702 which is easily releasably coupled to the feeding reservoir 602. The feeding plug assembly 702, which couples with aperture 608 when the feeder is in a final state of assembly for use, comprises a plug portion that compresses against the inner rim of aperture 608 to create a waterproof seal to prevent food liquid leakage.

The feeding plug assembly 702 has a tube portion 704 and a liquid flow regulator 706 to facilitate and control a liquid feed solution to flow out through the feeding plug assembly 702.

While assembling the food reservoir 602 and the feeding plug assembly 702 together to form a complete feeder assembly 700, the feeding plug assembly 702 is forced into the aperture 608 of the reservoir 852.

The above-described releasably coupling is possible with the selection of a substantially rigid material constituting the aperture 608 and a softer feeding plug assembly 702 such that some deformation of the feeding plug 702 takes place during the engagement of the surfaces. It is noted that appropriate tolerance, as well as proper material selection, between the coupling parts is essential to ensure that the surfaces are able to engage into place in a cooperative relationship, and to ensure that the surfaces maintain a secure waterproof position against each other thus preventing the disassembling of the food reservoir 602 and the feeding plug assembly 702.

In use, once the food reservoir 602 is determined to be filled with a feeding solution, the feeding plug assembly 702 is pushed into the aperture 608 to complete the assembling of the feeder assembly 700.

Figure 6B:
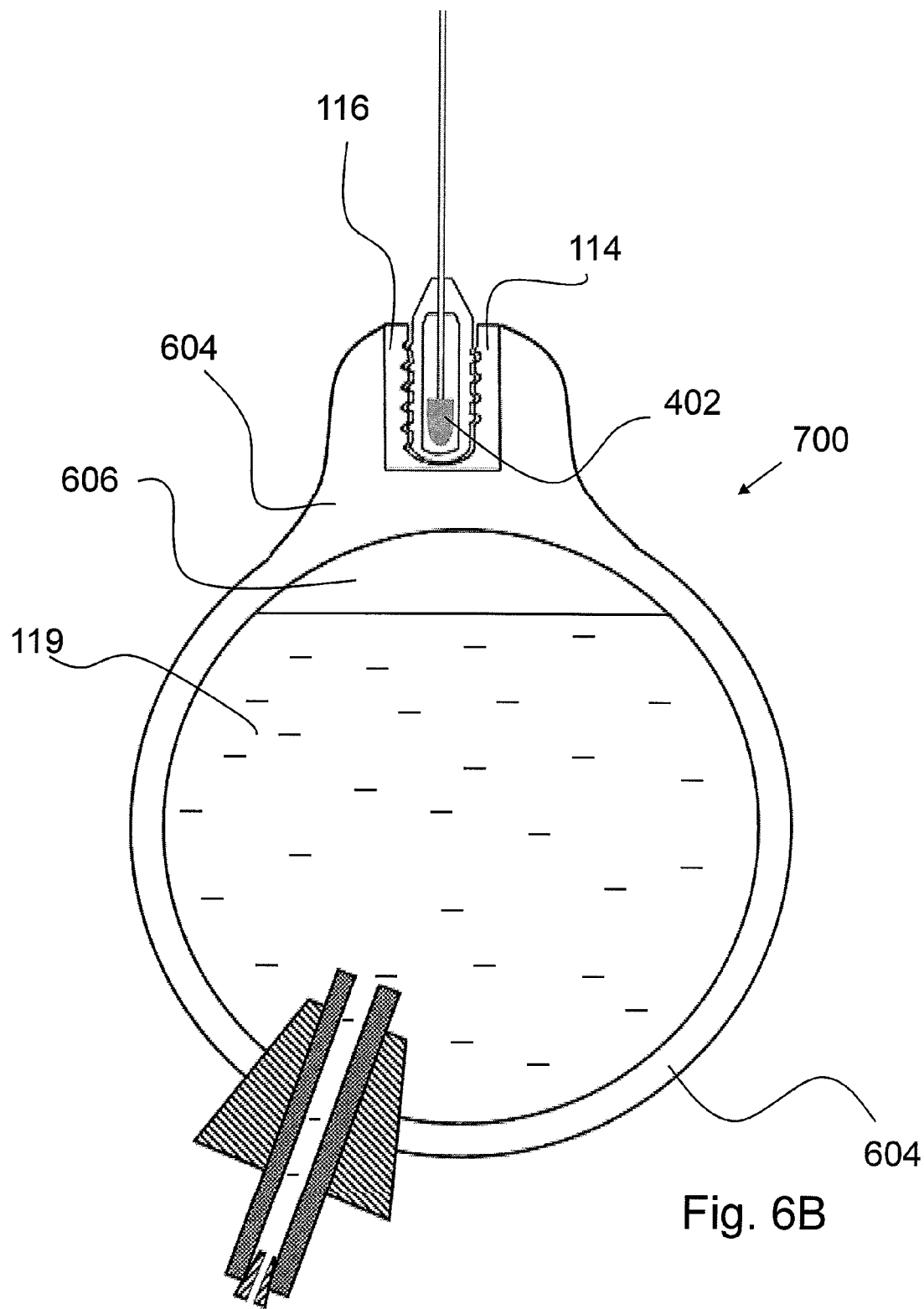
FIG. 6B is a cross-section view of a more fully assembled solar powered illuminated hummingbird feeder in accordance with the second embodiment of the present invention as shown in FIGS. 5 and 6A.

FIG. 6B is a cross-sectional view of an assembled solar powered illuminated hummingbird feeder 700 in accordance with the second embodiment of the present invention as shown in FIG. 6A attached to the releasable lighting module 114 of the shade canopy assembly 102 shown in FIG. 2. The releasable lighting module 114 is releasably connected to a threaded receiving portion 116 of the hummingbird feeder. The releasable lighting module 114 when connected provides suspension support to the hummingbird feeder 700 as well as illumination through the light transmissive feeder wall 604 into the food solution cavity 606. When illuminated at night, light passes from the light source 402 through the base of the releasable lighting module, through the threaded receiving portion 116, through the light transmissive feeder wall 604, into the food solution cavity 606, through at least part of the liquid food source 119, and outward through another part of the light transmissive feeder wall 604 so that light is visible externally. Because the liquid food source 119 is preferably not completely light transmissive, some light is reflected off parts of the liquid food source 119 causing part of the liquid food source to appear illuminated. Further, because the light transmissive feeder wall 604 is preferably not completely light transmissive and contains different colored material including a fluorescent material, at least part of the light transmissive feeder wall 604 is illuminated in an aesthetically pleasing way.

The food reservoir is effectively a lens that admits light. The lens can be made of glass, plastic, resin, or glass fibers. The lens material includes any formed material conventional to the art, such as glass, plastic or resin or glass fibers. The lens is made of glass and may be shaped substantially spherical, and may be impregnated directly with the phosphorescent material. The phosphorescent material may be a phosphorescent pigment. The luminescent material or pigment may be one or more of: Alkaline Earth Metal Aluminate (and can include Strontium, Magnesium, Calcium, and Barium, Silicon and Titanium and typically doped with Europium), Alkaline Earth Aluminate w/Fluorescent Pigment, Coated Alkaline Earth Aluminate, Alkaline Earth Silicate, and Zinc Sulfide. There should be no sulfur, uranium doped, or large amounts of Zinc mixed in with any of the luminescent material or pigment. Silicate base may be added to the manufacturing process to aid with the color melting into the glass surface. The luminescent material or pigment used is suitable for use with the heat involved with glass working and can be mixed in with raw clear glass powder. Large clumps of luminescent material or pigment should be avoided because such clumps may cause the piece to crack during cooling. Very fine diameter luminescent material or pigment is preferable.

Ultraviolet light emitted by a UV LED such as is made by Nichia of Japan, may strike the phosphorescent material in or on the food reservoir, and therefore the phosphorescent material is caused to emit visible light. The UV LED may be powered by a solar rechargeable battery source. A printed circuit board mounted controller may serve to automatically vary the brightness of the light source. Further, the printed circuit board mounted controller may selectively activate the light source in a time pulsed manner, The liquid food reservoir may be substantially constructed from hand-blown glass and comprise fluorescent and luminescent elements within it. This is achieved because a substantial percentage of the light emitted by the LED is in the ultraviolet light spectrum so that the LED emits at least some light in the blacklight ultraviolet wavelength spectrum.

At least some part of the liquid food reservoir exhibits fluorescence when excited by said LED and exhibits phosphorescence by emission of light by a luminescent element after excitation by the LED has ceased. The provision of the ultraviolet LED proximate to the phosphor assures that upon activation of the LED, the phosphor is excited and continues to phosphoresce after the LED has been deactivated.

Regardless of the application method, once the phosphorescent material is proximate to the surface of the liquid food reservoir, the UV LED directed into or located within the lens affords a highly efficient excitation of the phosphor resulting in efficient phosphorescent emission. A UV LED operative in the present invention preferably emits either UV-A corresponding to between 315 nm and 405 nm or UV-B corresponding to between 280 nm and 320 nm. Operative UV LEDs herein include gallium indium nitride and gallium nitride.

Power is provided to the LED by a rechargeable battery that is charged by a solar photovoltaic panel made from silicon. The battery source is selected according to the present invention to have a voltage output to activate the light source. Battery types operative herein alone or in series to increase the output voltage include nickel cadmium, nickel metal hydride, rechargeable alkaline and lithium batteries.

A user operable switch may selectively illuminate the LED. A battery within the housing selectively forms a circuit with contacts of the switch and leads of the LED upon switch engagement. The emission from the LED is directed onto phosphorescent laded glass lens from within. The now stimulated phosphorescent pigments emits visible light for a period of time consistent with the phosphorescent particulate decay time during the evening hours after the LED ceases to illuminate.

As a rule of thumb, if emission stops after the excitation source has been removed, then the resulting luminance is called fluorescence; if emission continues (so called "afterglow") then it is called phosphorescence.

The excitation time and saturation are primarily dependent on ultraviolet irradiance of the material. Phosphorescent paints, enamels and colorants are well known to the art and include, for example, U.S. Pat. Nos. 1,407,534; 1,637,963; 2,463,182; and 5,472,737. The choice of phosphor being dictated by the desired color of phosphorescence. Exemplary phosphor materials known to the art illustratively include group II metal-calcogenides, rare earth oxides, sulfides, phosphates, and combinations thereof doped with lanthanide series ions, such as $CaSr2S:Bi$, $CaAl2O4:Eu, Nd$; and $CaSrS: Eu, Dy$. Specific compositions and colors are well known to the art as detailed, for example, in U.S. Pat. Nos. 2,372,071; 2,979,467; 5,043,096; 4,857,228; 5,424,006; and 5,376,303. It is appreciated that multiple color phosphors are readily applied to a lens to yield regions of differing color emission.

The best light sources for excitation are those rich in ultraviolet light.

The light source 402 includes at least one of, at least LED, and a phosphorescent emitter element. The light source is a light emitting diode (LED). The light source may also has a variable color output provided by at least two light emitting diodes where the first light emitting diode has a first single color output and a second light emitting diode where the first color output differs from the second color output. In one of the instances of a single LED, or multiple LEDs, the light source includes a UV output or UV LED. The variable color light source optionally includes a third light emitting diode having a third color output, where the third color output varies from the second color output. The variable color output of the light source is varied automatically through the printed circuit board controller, which automatically cycles the light source color upon initial switch activation and continues to cycle the colors until switch deactivation. Typical cycle times range from 5 to 300 seconds.

Alternatively, the controller may vary the brightness of the light source up and down in brightness. Optionally, the cycle includes a period of no emission to allow for isolate visible phosphorescence emission. When multiple light sources are present, it is appreciated that two or more light sources having different emission characteristics can be controlled to afford different illumination levels and therefore a varying color emission. The light source is oriented to direct a majority of the emission there from into and through the lens.

In an alternative embodiment, the light source is a UV LED, as described above and the lens is decorated with a phosphorescent pigment that is stimulated by the emission of UV LED. When the light source is UV LED, the UV LED is activated in a time pulsed manner by the controller consistent with the decay time of the phosphor pigment.

The switch is provided for selectively forming an electrical engagement between the light source and the battery source. The switch is automatically activated by light levels through the use of a cadmium sulfide light activated resistor. The switch is a first switch and a there is second a manual user operable switch. The second switch is preferably accessible externally to the lens.

In a further embodiment, in which the lighting system includes a light emitting diode that has an emission spectrum that includes light capable of exciting a luminescent material associated with the hummingbird feeder, the lighting subsystem may include circuitry for cycling the light emitting diode between an "on" state that causes the luminescent material to emit fluorescent light and an "off" state that allows the luminescent material to emit phosphorescent light. Cycling from the on to the off state may take place in a time scale of several seconds, or it may take place over a time scale of minutes, or any suitable time scale in-between.

Moreover, the lighting system may also include a switch to allow a user to select between the light emitting diode being in the "on" state, being in the "off" state or being in the state of cycling between the "on" and the "off" state.

FIG. 7 is a schematic diagram showing a power control circuit that may be utilized in the preferred embodiment of the present invention. The circuit diagram shows circuitry for controlling a two color LEDs. This circuitry similar to that described in detail in U.S. patent application Ser. No. 10/789,488 of S. Richmond entitled "A solar powered light assembly to produce a light of varying colors" filed on Feb. 6, 2004, and in continuation-in-part U.S. patent application Ser. No. 11/102,229 of S. Richmond entitled "A solar powered light assembly to produce a light of varying colors" filed on Apr. 7, 2005, the contents of both of which are hereby incorporated by reference. The power supply circuit comprises a solar cell 30 connected in series to a forward biased diode 39, which is in turn connected to a positive terminal of a battery 33. The negative terminal of the battery 33 is then connected to the solar cell 30 to complete the power supply circuit. In the embodiment described herein, the diode 39 is a model number IN5817 Schottky diode and the battery comprises two rechargeable 1.2 volt battery cells. It will be apparent to a person skilled in the art that other diode and battery configurations may be utilized without departing from the spirit and scope of the invention.

When the solar cell 30 is exposed to sufficient light, the solar cell converts some of the solar energy to electrical energy and creates a current that passes through the diode 39 to charge the battery 33. Thus, during the day the solar cell 30 converts energy from the sun to charge the battery 33. The diode 39 prevents the battery 33 from expending 30 any power on the solar cell 30.

The power supply circuit is connected in parallel to the light operated circuit, which is connected across the terminals of the battery 33. The positive terminal of the battery 33 is connected to a switch 40, which is in turn connected to a 100 kΩ first resistor 41. The first resistor 41 is connected in series with a second, light-dependent resistor 42. The second resistor 42 connects to the negative terminal of the batteries 33 to complete the light operated circuit. The value of resistance of the second resistor 42 depends on the amount of light to which the second resistor 42 is exposed. When there is not much light, such as occurs during the night, the value of the second resistor 42 increases. During the daytime, when there is sufficient light, the value of the second resistor 42 decreases. Accordingly the resistor 42 allows the lighting device to operate only when there is insufficient light, i.e., at night.

The boost-up circuit is connected to the light operated circuit, in parallel with the first resistor 41 and the second, light-dependent resistor 42. A first circuit node 43 is defined between the switch 40 and the first resistor 41. Connected to the node 43, is an emitter terminal of a first triode 44. A collector terminal of the first triode 44 is connected in series with a 100 kΩ third resistor 45. The third resistor 45 is then connected to a point between the first resistor 41 and the second resistor 42.

A 220 kΩ fourth resistor 46 is connected to node 43 across the emitter and base terminals of the first triode 44. In parallel with the fourth resistor 46, and also connected across the emitter and base terminals of the first triode 44, is a 4.7 nF first capacitor 48.

Further connected to node 43, across the emitter and base terminals of the first triode 44 and in parallel with each of the fourth resistor 46 and the first capacitor 48, is a 100 µH inductor 49 in series with a 1 nF second capacitor 50. The second capacitor is then connected to the base terminal of the first triode 44.

A 20 kΩ fifth resistor 51 is connected across the base and collector terminals of the first triode 44. Connected across the terminals of the third resistor 45 are the collector and base terminals, respectively, of a second triode 52. The emitter terminal of the second triode 52 is connected to the negative terminal of the batteries 33. Connected between the inductor 49 and the second capacitor 50 is the collector terminal of a third triode 53. The base terminal of the third triode 53 is connected via an intermediary circuit to the collector terminal of the second triode 52. The intermediary circuit consists of a 2.4 kΩ fourth resistor 54 in parallel with a 1 nF third capacitor 55. The emitter terminal of the third triode 53 is connected to the negative terminal of the battery 33.

Also connected between the inductor 49 and the second capacitor 50 is the rectifier circuit. A forward biased second diode 56 is connected to a point between the inductor 49 and the second capacitor 50, and then to a positive terminal of a 33 µF fourth capacitor 57. The negative terminal of the fourth capacitor 57 is connected to the negative terminal of the battery 33. A second circuit node 58 is defined between the second diode 56 and the fourth capacitor 57. Connected in parallel with the fourth capacitor 57, between the second node 158 and the negative terminal of the battery 33 is a reverse biased 4.5V third diode 59. The second diode 56, the fourth capacitor 57 and the third diode 59 comprise the rectifier circuit. Further connected to the second circuit node 58, in parallel with each of the capacitor 57 and the reverse diode 59, is a light circuit 60.

The light circuit 60 contains an integrated circuit (IC) 61 for controlling lighting effects provided by the lighting device 10. In the embodiments shown, the IC 61 is a 16-pin, two color LED IC for controlling first and second light emitting diodes (LEDs) 34A and 34B. Each of pins 1 and 15 is connected in series to respective switches 69 and 71. Each of the switches 69 and 71 is then connected to the negative terminal of the battery 33. In one embodiment, the switches 69 and 71 activate the LEDs 34A and 34B to enable or disable a particular color range. In another embodiment, the switches 69 and 71 determine the frequency of a color changing effect. In a further embodiment, the switches 69 and 71 determine the intensity of light emitted by each of the LEDs 34A and 34B. Various combinations of the frequency and intensity of light are also possible. The switches 69 and 71 can be made accessible to a user to create custom lighting effects. Alternatively, the switches 69 and 71 are set according to a predetermined configuration and are not readily accessible by a user.

Pin 4 of the IC 61 enables an optional pause function. In the embodiment described herein embodiment, pin 4 connects to a push button 65 that is, in turn, connected to the negative terminal of the batteries 33. Pin 3 of the IC 161 connects to the second circuit node 58. Connected to the second circuit node 58, and in parallel with one another, are the first and second forward biased light emitting diodes (LEDs) 34A and 34B.

The first LED 34A is connected in series with a sixth resistor 66 that is connected to pin 13 of the IC 61. The second LED 34B is connected in series with a seventh resistor 67 that is connected to pin 12 of the IC 61. In the embodiment described herein example, the first LED 34A emits white light and the second LED 34B emits predominantly ultraviolet light.

Pins 6 and 8 of the IC 61 are tied to one another via a ninth resistor 72, which in the embodiment shown is a 20K ohm resistor. The valve of the ninth resistor 72 determines the frequency of a color change created by the IC 61. Accordingly, using different resistor values for the ninth resistor 72 produces color changes of different frequencies. Pin 9 of the IC 61 is tied to the negative terminal of the battery 33.

Figure 8A:
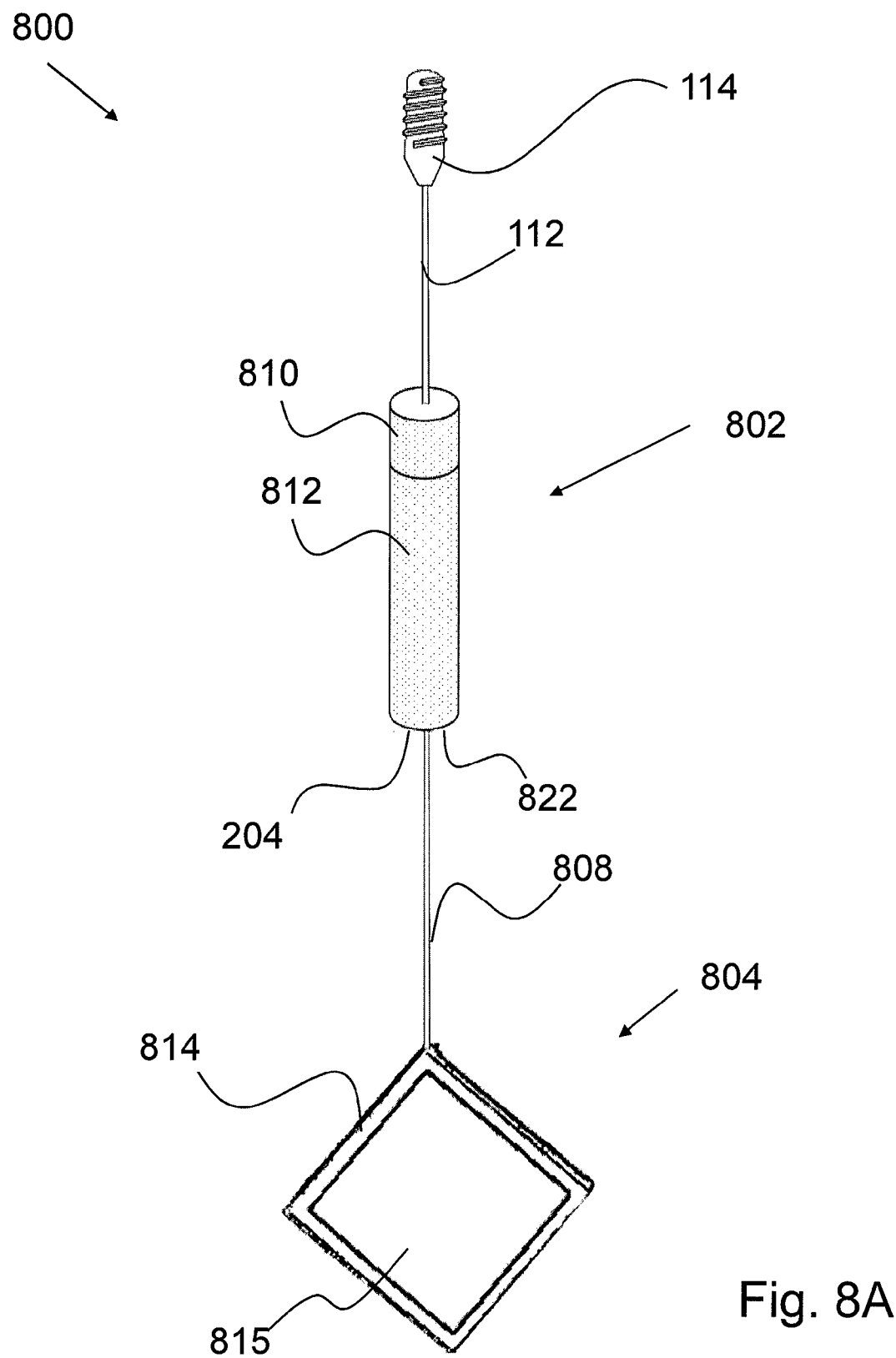
FIG. 8A is a schematic view of a suspendible solar powered lighting module in accordance with a third embodiment of the present invention.
Figure 8B:
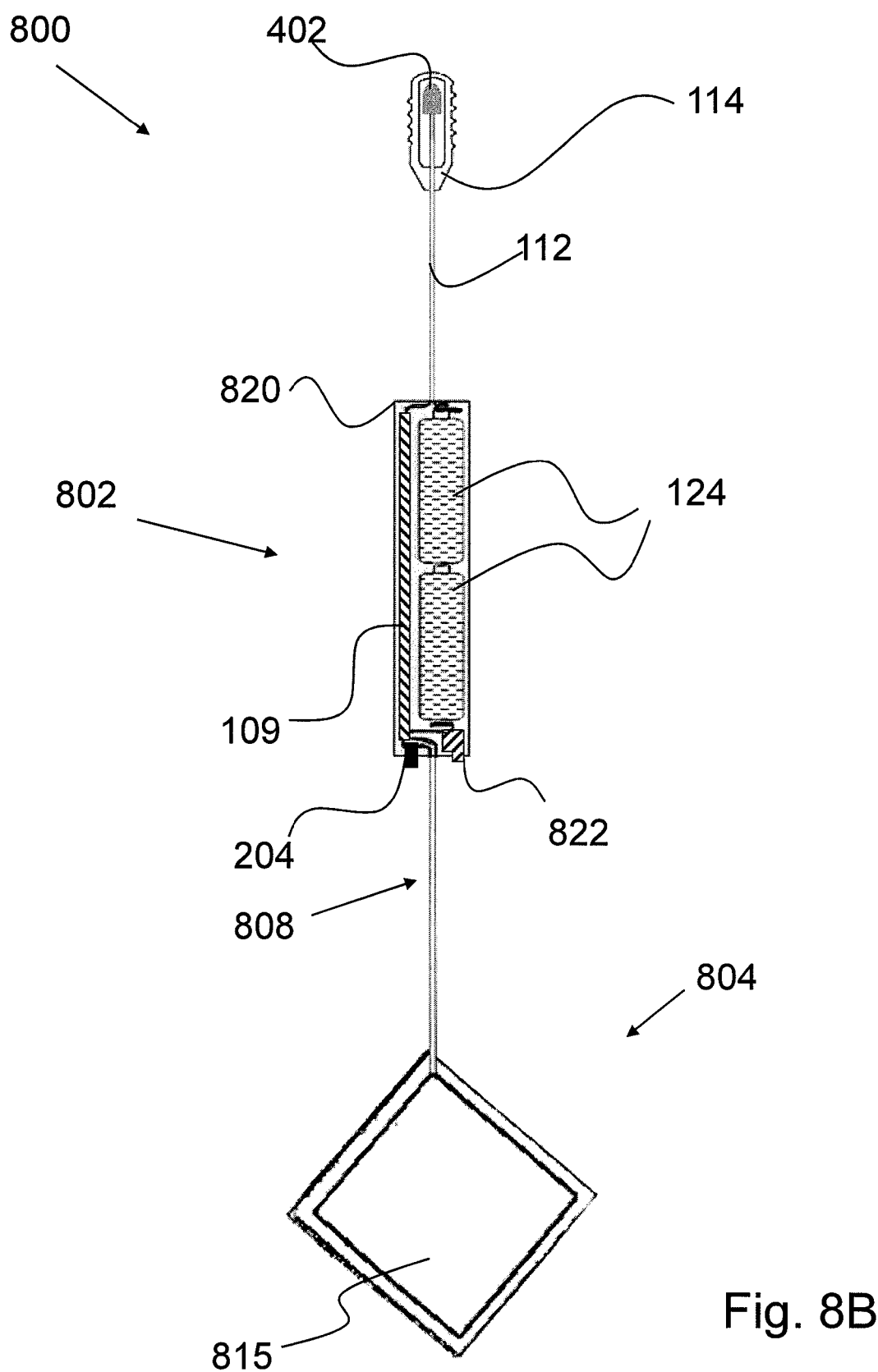
FIG. 8B is a cross-section view of the suspendible solar powered lighting module shown in FIG. 8A.

FIGS. 8A and 8B are schematic and cross-section views of a suspendible solar powered lighting assembly 800 in accordance with a third embodiment of the present invention. The suspendible solar powered lighting assembly 800 comprises a lighting module 114, suspension wires 112 between the lighting module 114 and an operative components compartment 802 containing control circuitry and a rechargeable power source, suspension wires 808 between the compartment 802 and at least one suspended solar panel 815. The operative components compartment 802 contains rechargeable batteries 124 which are vertically oriented. The operative components compartment 802 is preferably suspended from a central hanging point. The batteries 124 are preferably recharged by two substantially vertically oriented substantially parallel and outwardly facing amorphous silicon solar panel 815 located at the end of a suspension assembly 800 suspended by electrical wires 808 from the an operative components compartment 802. In the embodiment described herein embodiment, the rechargeable power source is in the form of two AA size 600 mA/hour nickel cadmium batteries 124. A power supply circuit connects the solar panel 815 disposed in the suspension 800 in series to a forward based diode, which is in turn connected to a positive terminal of at least one battery 124. A negative terminal of the battery 124 is then connected to the solar panel 815 to complete a power supply circuit. In the embodiment described herein the diode may be a model number IN5817 Schottky diode. It will be apparent to a person skilled in the art that other diode and battery configurations may be utilized without departing from the spirit and scope of the invention. When the solar panel 815 in the suspension assembly 800 is exposed to sufficient light, the solar panel 815 converts some of the solar energy to electrical energy and creates a current that passes through the diode to charge the battery 124. Thus, during the day the solar panel 815 converts energy from the sun to charge the battery 124. The diode prevents the battery 124 from expending any power on the solar panel 815.

Also located within the an operative components compartment 802 is the control unit 109 which may be arranged to sense the ambient light level, for example, in the present example, a light dependent cadmium sulfide resistor located in a light exposed location on the housing, and if a determination is made by the circuit that insufficient ambient light is available, a connection is made between the batteries 124 and the light source 402. If a determination is made that sufficient ambient light is available, a connection is not made between the batteries 124 and the light source 402 current does not flow from the batteries. Specifically, the positive terminal of the battery 124 is connected to a switch 40, as shown in FIG. 7, which is in turn connected to a 100 kΩ first resistor 41, as also shown in FIG. 7. The first resistor is connected in series with a second, light dependent resistor 204. The second resistor 204 connects to the negative terminal of the batteries 124 to complete the lighting circuit. The value of resistance of the second resistor 204 depends upon the amount of light to which the second resistor 204 is exposed. When there is not much light, such as occurs at night, the value of the second resistor 204 increases. During the daytime, when there is sufficient light, the value of the second resistor 204 decreases. Accordingly, the resistor 204 allows the lighting circuit to operate only when there is insufficient light, i.e. at night. The light sensitive resistor 204 and operative circuitry may be located in the suspended operative components compartment 802. A user-operable switch 822 to control the function of the light source 402 is located on an exposed surface of the operative components compartment 802.

Figure 11A:
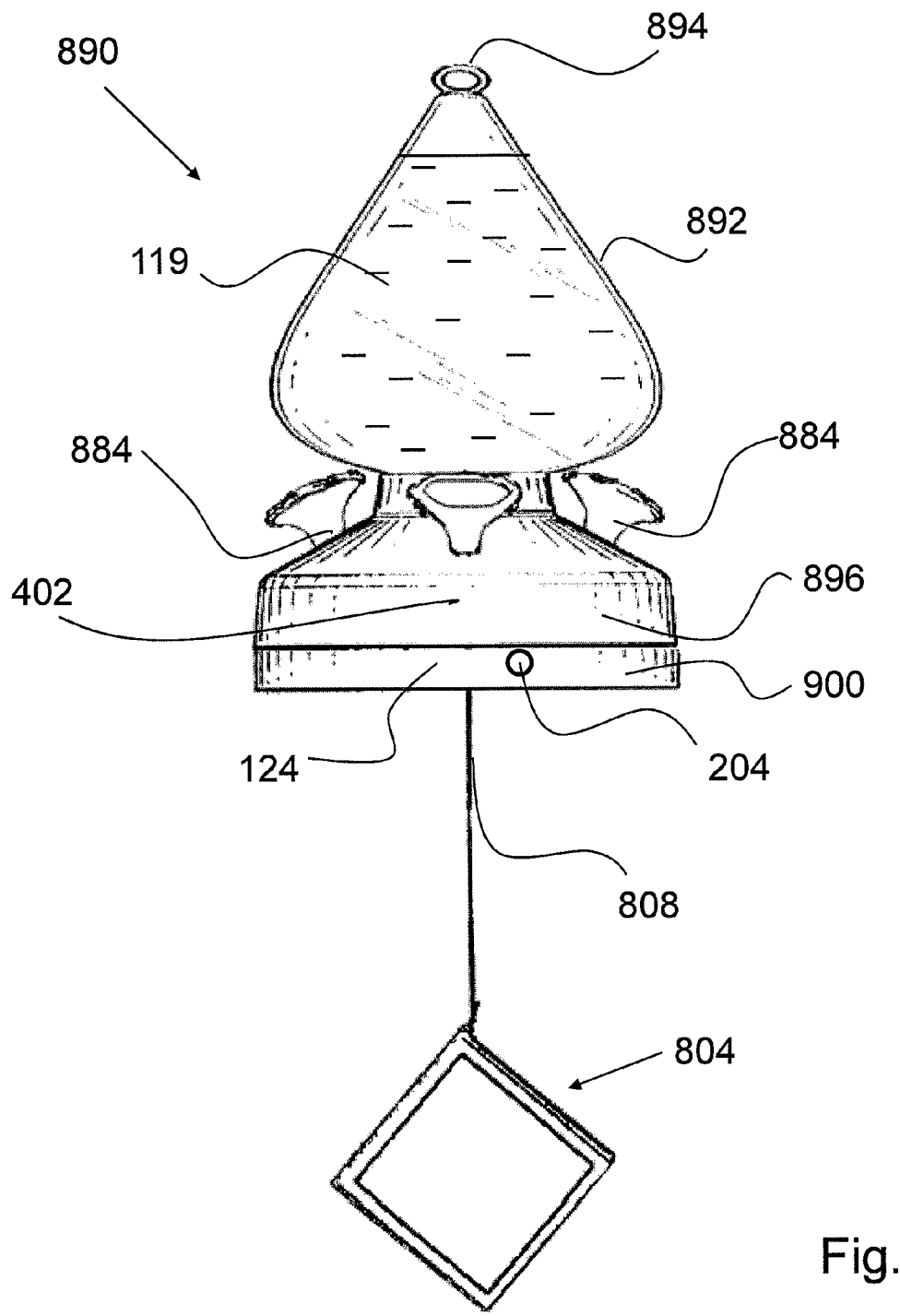
FIG. 11A is a schematic view of an assembled solar powered illuminated hummingbird feeder in accordance with a fifth embodiment of the present invention.
Figure 11B:
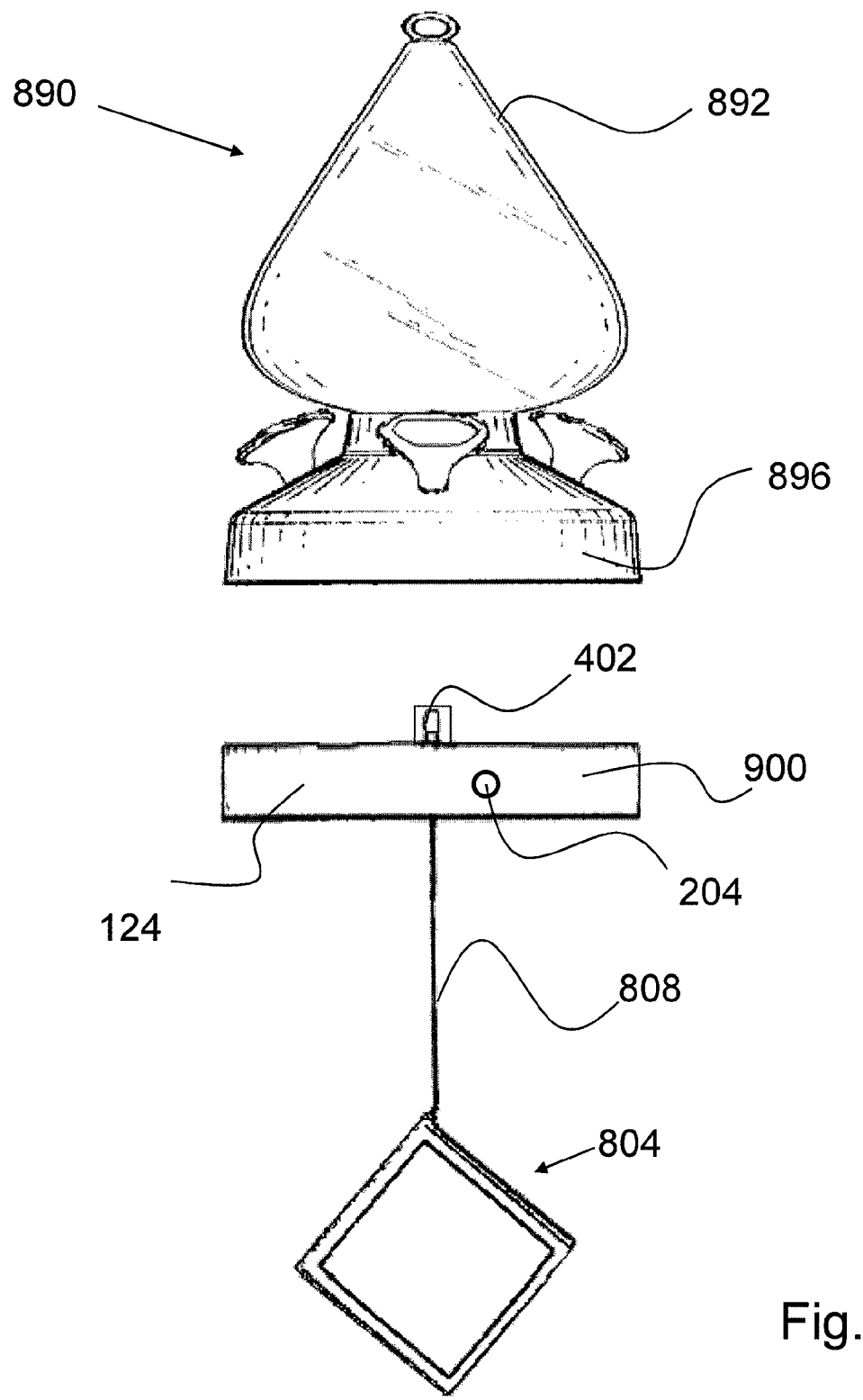
FIG. 11B is a schematic view of the solar powered illuminated hummingbird feeder as shown in FIG. 11A in a partially exploded state.

In a first alternative version of the third embodiment the lighting module 114 and the operative components compartment 802 are integral and there is no suspension cabling between them as shown in FIG. 11B.

In a second alternative version of the third embodiment the operative components compartment 802 and the solar panels 815 are integral and there is no suspension cabling between them.

In a third alternative version of the third embodiment the lighting module 114 is suspended between the operative components compartment 802 and the solar panels 30.

In the third embodiment as shown, the suspension assembly is moveably suspended from the lighting module 114. Also, connected to the lighting module 114 are electrical wires 112 that pass from the operative components compartment 802 into the lighting module 114. In the embodiment described herein, the electrical wires 112 are electrically connected to a light emitting element that in the embodiment described herein takes the form of an LED 402. The LED may be disposed inside, or directed into, the lighting module 114.

The LED may be more than one LED and may be two LEDs of different light wavelengths, for example on white LED and one ultraviolet LED.

The lighting module 114 may be formed, wholly or in part, of a suitable translucent or transparent material. In the embodiment described herein that material is plastic. Mechanical connection means to affix the lighting module 114 to the battery compartment 802 may also be provided in addition to the electrical wires. Such means may include a chain or wire affixed to the upper portion of the operative components compartment 802. A second pair of electrical wires 808 are located between the operative components compartment 802 and the solar panels 30 located in the suspension 800. The suspended solar panels 30 harnesses the power of the sun as it further comprises at least one amorphous silicon solar panel which converts light energy to electrical energy. As an alternative, one or more crystalline silicon structure type solar panels may be used. In that embodiment, the solar panels are preferably assembled using a lamination process as opposed to an epoxy embedded process.

Figure 9A:
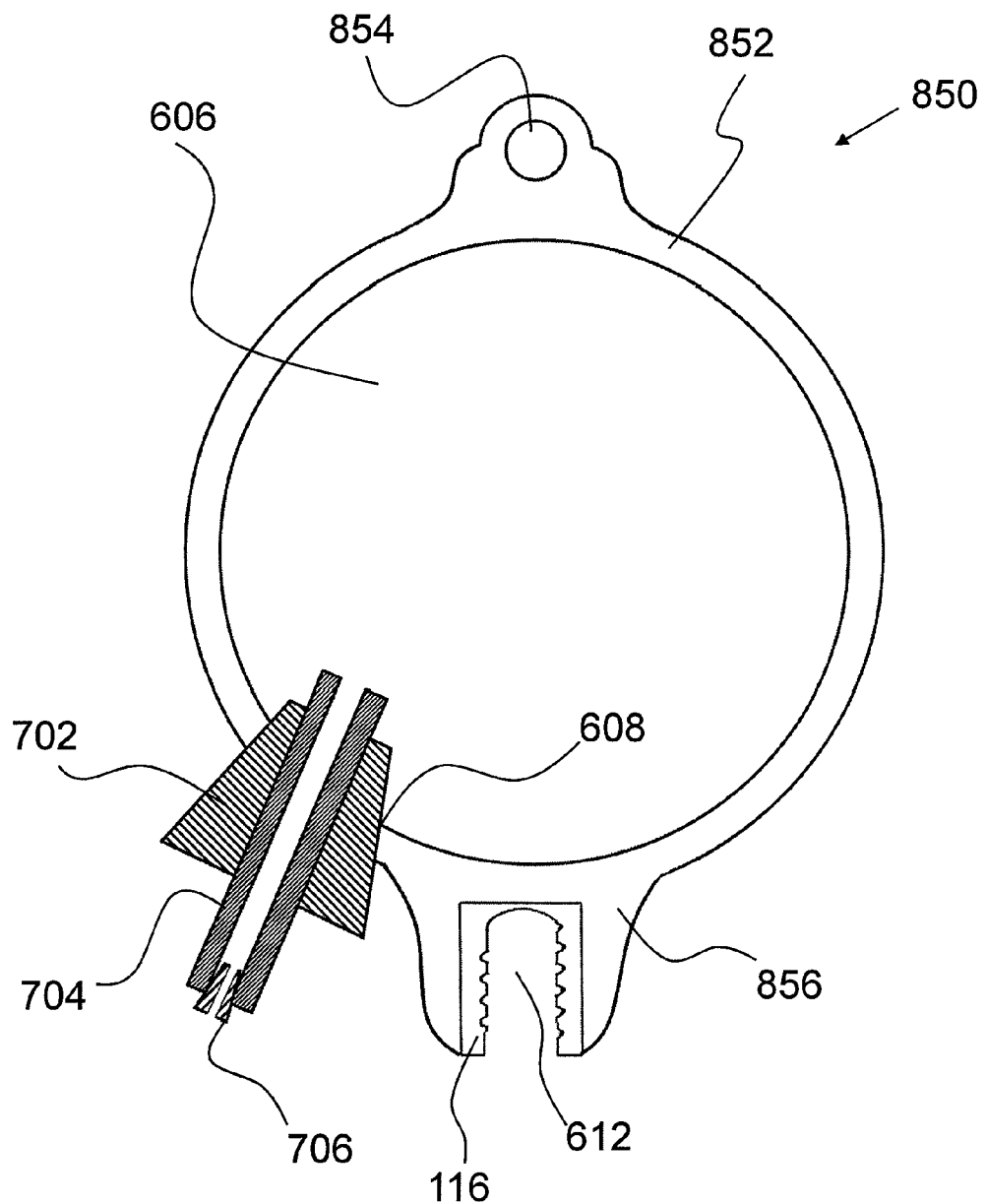
FIG. 9A is a cross-section view of a partially assembled solar powered illuminated hummingbird feeder in accordance with the third embodiment of the present invention wherein illumination is provided from the bottom.

FIG. 9A is a cross-section view of a partially assembled solar powered illuminated hummingbird feeder in accordance with the third embodiment of the present invention. As illustrated in FIG. 9A there is disclosed a hummingbird feeder 850 comprising a hanger tab 854, a liquid solution reservoir 852, a feeding plug assembly 702 with a feeding tube 704 and tube flow regulator 706, and a lower portion 856 further comprising a threaded socket assembly 116 which has a threaded cavity 612. The feeding plug assembly 702 is easily releasably coupled to the feeding reservoir 852. Hanging tab 854 is provided to allow feeder 850 to be hung and used at a desired location. The feeding solution reservoir 852 is an elongated substantially cylindrically shaped container for housing liquid hummingbird feed solution. Other geometric shapes and sizes, as well as shapes in form of animals and flowers, of different colors for the solution reservoir are possible. The volume in the solution reservoir, or course, can vary depending on size of the solution reservoir and the amount of feeding solution to be distributed. In addition, the feeder could be incorporated for feeding other types of birds and animals.

The bottom side of solution reservoir 852 has aperture 608. The aperture 608 has an opening 202 for a liquid feed solution to flow out through the feeding plug assembly 702.

Feeding plug assembly 702, which couples with aperture 608 when the feeder is in a final state of assembly for use, comprises a plug portion that compresses against the inner rim of aperture 608 to create a waterproof seal to prevent food liquid leakage.

While assembling the reservoir 852 and the feeding plug assembly 702 together to form a complete feeder 850, the feeding plug assembly 702 is forced into the aperture 608 of the reservoir 852.

The above-described releasably coupling is possible with the selection of a substantially rigid material constituting the aperture 608 and a softer feeding plug assembly 702 such that some deformation of the feeding plug 702 takes place during the engagement of the surfaces. It is noted that appropriate tolerance, as well as proper material selection, between the coupling parts is essential to ensure that the surfaces are able to engage into place in a cooperative relationship, and to ensure that the surfaces maintain a secure waterproof position against each other thus preventing the disassembling of the reservoir 852 and the feeding plug assembly 702.

In use, once the reservoir 852 is determined to be filled with a feeding solution, the feeding plug assembly 702 is pushed onto the aperture 608 to complete the assembling of the feeder 850.

Figure 9B:
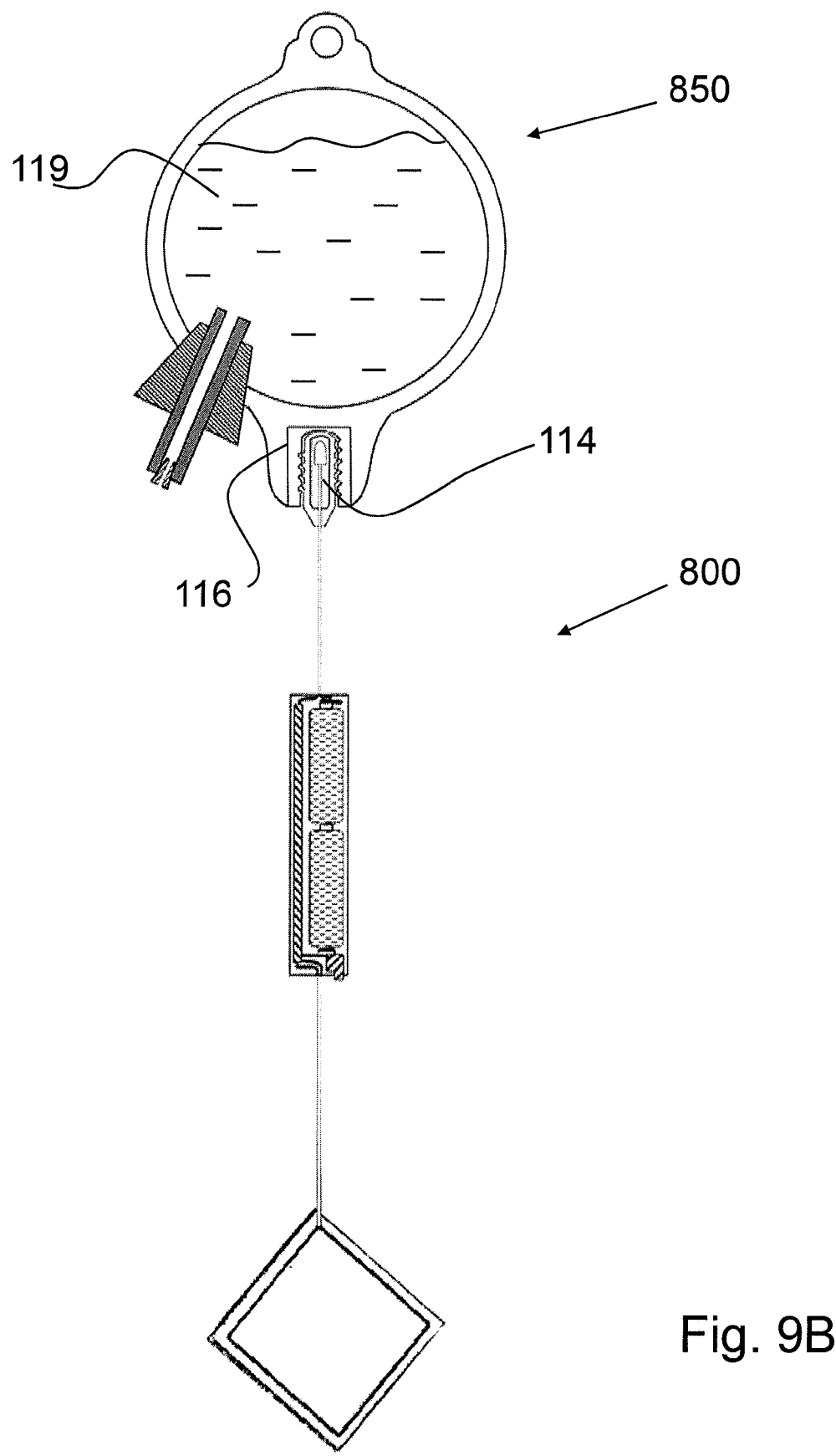
FIG. 9B is a cross-section view of an assembled solar powered illuminated hummingbird feeder in accordance with the third embodiment of the present invention shown in FIGS. 8A-9A.

FIG. 9B is a cross-section view of the assembled solar powered illuminated hummingbird feeder in accordance with the third embodiment of the present invention shown in FIGS. 8B and 9A and comprises the hummingbird feeder 850 with an illumination source receivably disposed in a lighting module 114 that is releasable from a socket housing module 116 in the hummingbird feeder. Suspended below the lighting module is the suspendible solar powered lighting assembly 800. Together these comprise an illuminated hummingbird feeder that lights up at night to illuminate the liquid food source 119 therein. When the hummingbird feeder 850 needs cleaning, the lighting components 800 can be easily removed so that the hummingbird feeder 850 may be submerged in water for washing.

Figure 10A:
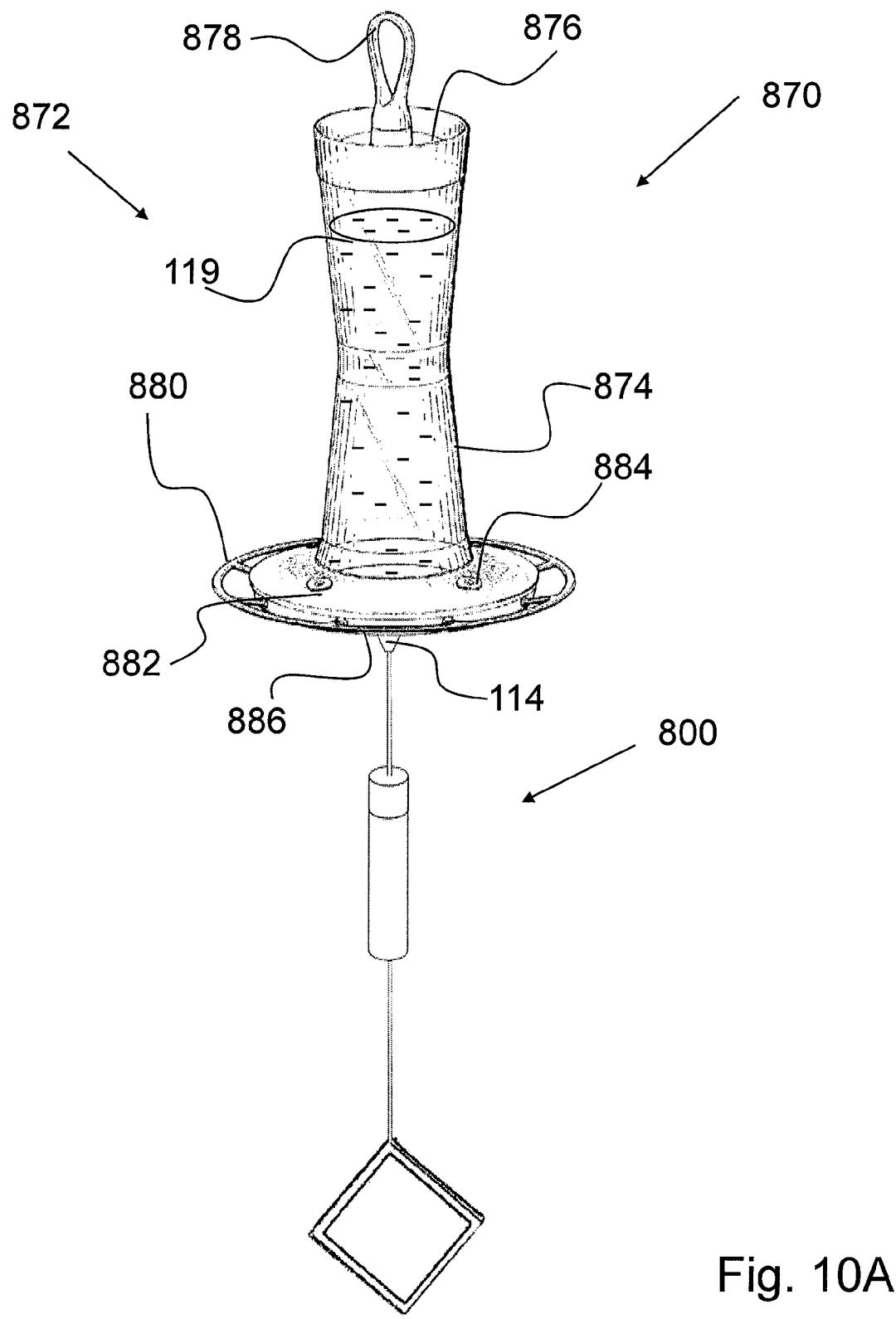
FIG. 10A is a schematic view of a solar powered illuminated hummingbird feeder in accordance with a fourth embodiment of the present invention.

FIG. 10A is a schematic view of a solar powered illuminated hummingbird feeder 872 in accordance with a fourth embodiment of the present invention. The present embodiment is an alternative hummingbird feeder design to the design disclosed in FIG. 9B. In the present embodiment there is a feeding assembly 870 which comprises a cap assembly 876 with an integral moat design which carries a hanging ring 878 which together provide support means and ant deterrent features for the feeder. The cap assembly 876 is preferably releasably attached to a liquid food reservoir 874 containing a nectar-like liquid food source 119, a covered feeding bowl assembly 882, a perch portion 880 and feeding stations 884. Attached to an at least partially light transmissive lower portion of the covered feeding bowl assembly 882 of the feeding assembly 870 is an illumination source. Suspended below the lighting module 114 is the previously suspendible solar powered lighting assembly 800 of FIG. 8A. Together these comprise an illuminated hummingbird feeder 872 that lights up at night to illuminate the liquid food source 119 therein.

The liquid food reservoir 874 is partially cylindrical in shape with the upper wider closed end tapering to a narrow mid-section and the lower end open. The only opening in the liquid food reservoir 874 is the lower end. Near the lower end of the liquid food reservoir 874 is a narrow flange. Between the flange and the open end of the liquid food reservoir 874 are threads which are located to securably connect with the covered feeding bowl assembly 882.

The covered feeding bowl assembly 882 is preferably circular in shape. The bottom portion has a central indentation projecting up into the cavity of the bowl assembly 882 thereby preventing pooling of the nectar in the center of the bowl away from the feeding stations 884. At least a part of the lower portion of the feeding bowl assembly 882 is at least partially light transmissive to allow light from a light source below to travel upward through a central portion of the feeding bowl assembly 882 and into the liquid food reservoir 874 thus illuminating the liquid food source 119 from below. In one embodiment the light source is situated within the covered feeding bowl assembly 882. A plurality of small apertures are disposed in upper surface of the bowl assembly to accommodate the feeding stations 884.

The feeding stations 884 are the locations from which the hummingbird obtains nectar. Each feeding station 884 has a short narrow insert with an aperture running therethrough designed to accommodate the beaks and tongues of hummingbirds. The feeding stations 884 are preferably rimmed by a decorative blossom-shaped flange extending radially outward.

A suitable durable material to use in fabricating the feeding assembly 870 is polycarbonate plastic. The liquid food reservoir is made of glass. Hummingbirds respond to and are attracted by bright colors, particularly red. Thus the majority of the feeder assembly 870 is composed of red plastic, the feeding stations 884 are made of white plastic.

When the hummingbird feeder 872 needs cleaning, the lighting module 114 of the lighting components 800 can be easily removed from a downward facing surface 886 of the covered feeding bowl assembly 882 thus detaching the feeding assembly 870 so that the hummingbird feeder parts 870 may be submerged in water for washing.

Figure 10B:
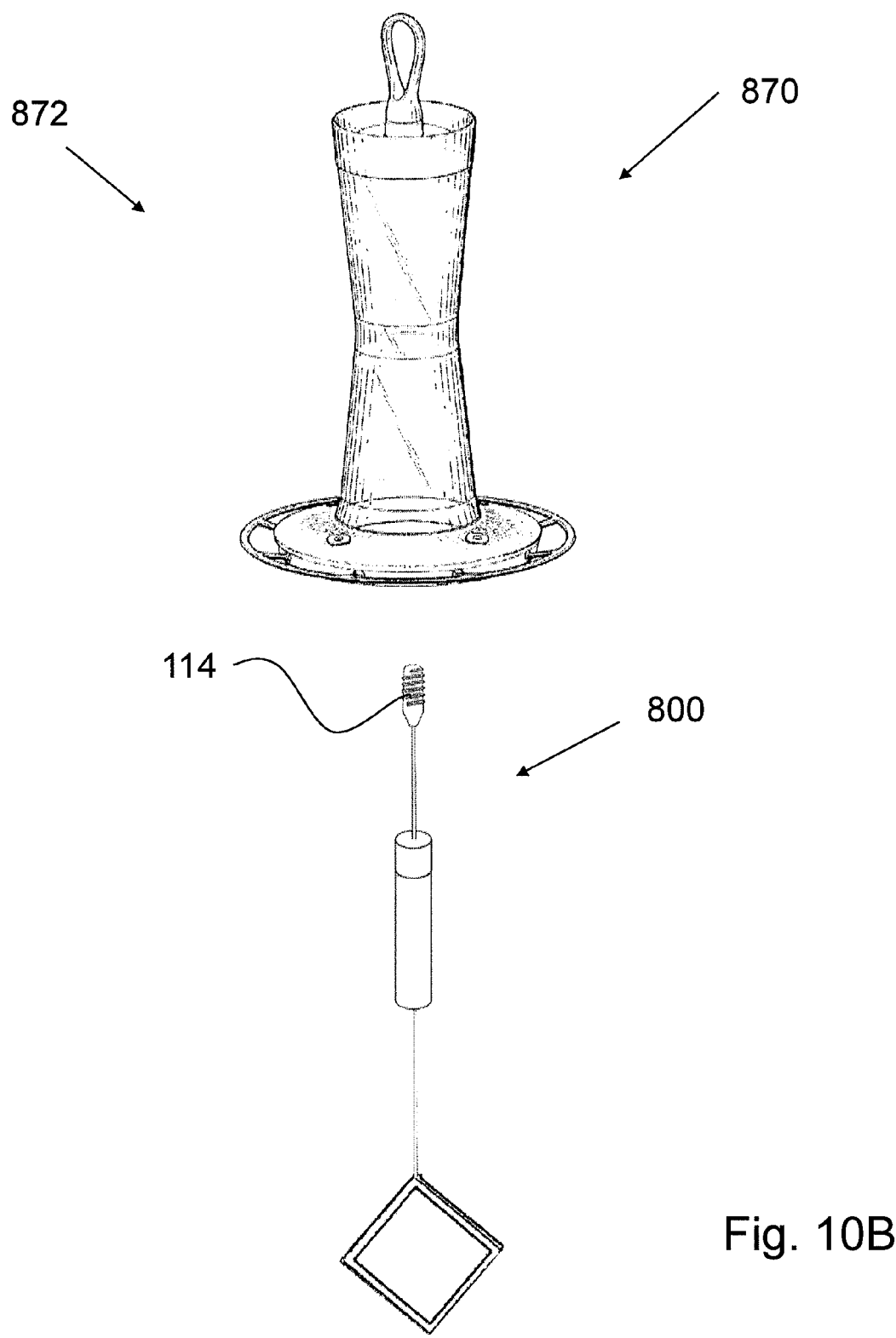
FIG. 10B is a schematic view of the fourth embodiment of a solar powered illuminated hummingbird feeder as shown in FIG. 10A in a partially exploded state.

FIG. 10B is a schematic view of the fourth embodiment of the solar powered illuminated hummingbird feeder 872 as shown in FIG. 10A in a partially unassembled state. When, the food reservoir 874 is empty as shown in FIG. 10B, the releasable feeding assembly 104 can be easily separated from the previously disclosed suspendible solar powered lighting assembly 800 of FIG. 8A by releasing the releasable lighting module 114 attached to the food reservoir 874. The feeding assembly 870 can now be cleaned via submerged washing and refilled without concern of damaging the water-sensitive electronics disposed within the lighting assembly 800.

FIG. 1A is a schematic view of an assembled solar powered illuminated hummingbird feeder 890 in accordance with a fifth embodiment of the present invention. The feeder 890 includes a hanging ring 894 above a liquid food reservoir 892 containing a nectar-like liquid food source 119, a covered feeding bowl assembly 896 disposed below the liquid food reservoir 892 and feeding stations 884, a releasable operative components module 900 attached to the base of covered feeding bowl assembly 896, a suspension cable 808 attached to the operative components module 900 and a solar panel 804 attached to the suspension cable 808.

The liquid food reservoir 892 is partially conical in shape with the upper narrow closed end and the lower end open. The only opening in the liquid food reservoir 892 is the lower end. Near the lower end of the liquid food reservoir 884 is a narrow flange. Between the flange and the open end of the liquid food reservoir 884 are threads which are located to securably connect with the covered feeding bowl assembly 896.

The covered feeding bowl assembly 896 is preferably circular in shape. The bottom portion has a central indentation projecting up into the cavity of the bowl assembly 896 thereby preventing pooling of the nectar in the center of the bowl away from the nectar ports 884. A plurality of small apertures are disposed in upper surface of the bowl assembly to accommodate the feeding stations 884.

The feeding stations 884 are the locations from which the hummingbird obtains nectar. Each feeding station 884 has a short narrow insert with an aperture running therethrough designed to accommodate the beaks and tongues of hummingbirds. The feeding stations 884 are preferably rimmed by a decorative blossom-shaped flange extending radially outward.

A suitable durable material to use in fabricating the feeding assembly 890 is polypropylene plastic. The liquid food reservoir is made of glass but may be made of any suitable at least partially light transmissive material including plastic or resin. Hummingbirds respond to and are attracted by bright colors, particularly red. Thus the majority of the feeder assembly 890 is composed of red plastic, the feeding stations 884 are made of white plastic.

Disposed within the operative components module 900 is a rechargeable power source 124, as shown in FIG. 8B, which is recharged by the solar panels 804. In the embodiment the rechargeable power source 124 is in the form of two AA size 600 mA/hour nickel cadmium batteries. Alternatively, other rechargeable power sources may be used including one or more nickel metal hydride batteries, rechargeable alkaline batteries, lead acid batteries, lithium ion batteries or similar. Access to the batteries for replacement is through a user accessible battery compartment located on the underside of the operative components module 900. A power supply circuit connects the solar panels 804 in series to a forward based diode, which is in turn connected to a positive terminal of at least one battery 124. A negative terminal of the battery 124 is then connected to the solar panel 804 to complete a power supply circuit. In the embodiment described herein the diode may be a model number IN5817 Schottky diode. It will be apparent to a person skilled in the art that other diode and battery configurations may be utilized without departing from the spirit and scope of the invention. When the solar panel 804 is exposed to sufficient light, the solar panel 804 converts some of the solar energy to electrical energy and creates a current that passes through the diode to charge the battery 124 located in the operative components module 900. Thus, during the day the solar panel 804 converts energy from the sun to charge the battery 124. The diode prevents the battery 124 from expending any power on the solar panel 804.

Also located within the operative components module 900 is a control unit, as shown in the circuit of FIG. 7, which may be arranged to sense the ambient light level, for example, in the present example, a light dependent cadmium sulfide resistor 204 located in a light exposed location upon the operative components module 900, and if a determination is made by the circuit that insufficient ambient light is available, a connection is made between the batteries 124 and a light source 402, as shown in FIG. 11B, disposed at an upper portion of the operative components module 900. If a determination is made that sufficient ambient light is available, a connection is not made between the batteries 124 and the light source 402 and current does not flow from the batteries 124. Specifically, the positive terminal of the battery 124 is connected to a switch 40, as shown in FIG. 7, which is in turn connected to a 100 kΩ first resistor 41, as shown in FIG. 7. The first resistor is connected in series with a second, light dependent resistor 204. The second resistor 204 connects to the negative terminal of the batteries 124 to complete the lighting circuit. The value of resistance of the second resistor 204 depends upon the amount of light to which the second resistor 204 is exposed. When there is not much light, such as occurs at night, the value of the second resistor 204 increases. During the daytime, when there is sufficient light, the value of the second resistor 204 decreases. Accordingly, the resistor 204 allows the lighting circuit to operate only when there is insufficient light, i.e. at night.

In the fifth embodiment, at least a part of the upper portion of the operative components module 900 is at least partially light transmissive to allow light from a light source below to travel upward through a central portion of the feeding bowl assembly 882 and into the liquid food reservoir 874 thus illuminating the liquid food source 119 from below.

FIG. 1B is a schematic view of the solar powered illuminated hummingbird feeder 890 as shown in FIG. 1A in a partially unassembled state. When, the food reservoir 892 is empty as shown in FIG. 11B, the operative components module 900 can be easily separated from the previously disclosed covered feeding bowl assembly 896. The operative components module 900 is releasably attached to the covered feeding bowl assembly 896 via a rotationally twist arrangement or bayonet cap lamp style releasable fitting. The covered feeding bowl assembly 896 and liquid food reservoir 892 can now be cleaned via submerged washing and refilled without concern of damaging the water-sensitive electronics disposed within the operative components module 900.

Figure 12A:
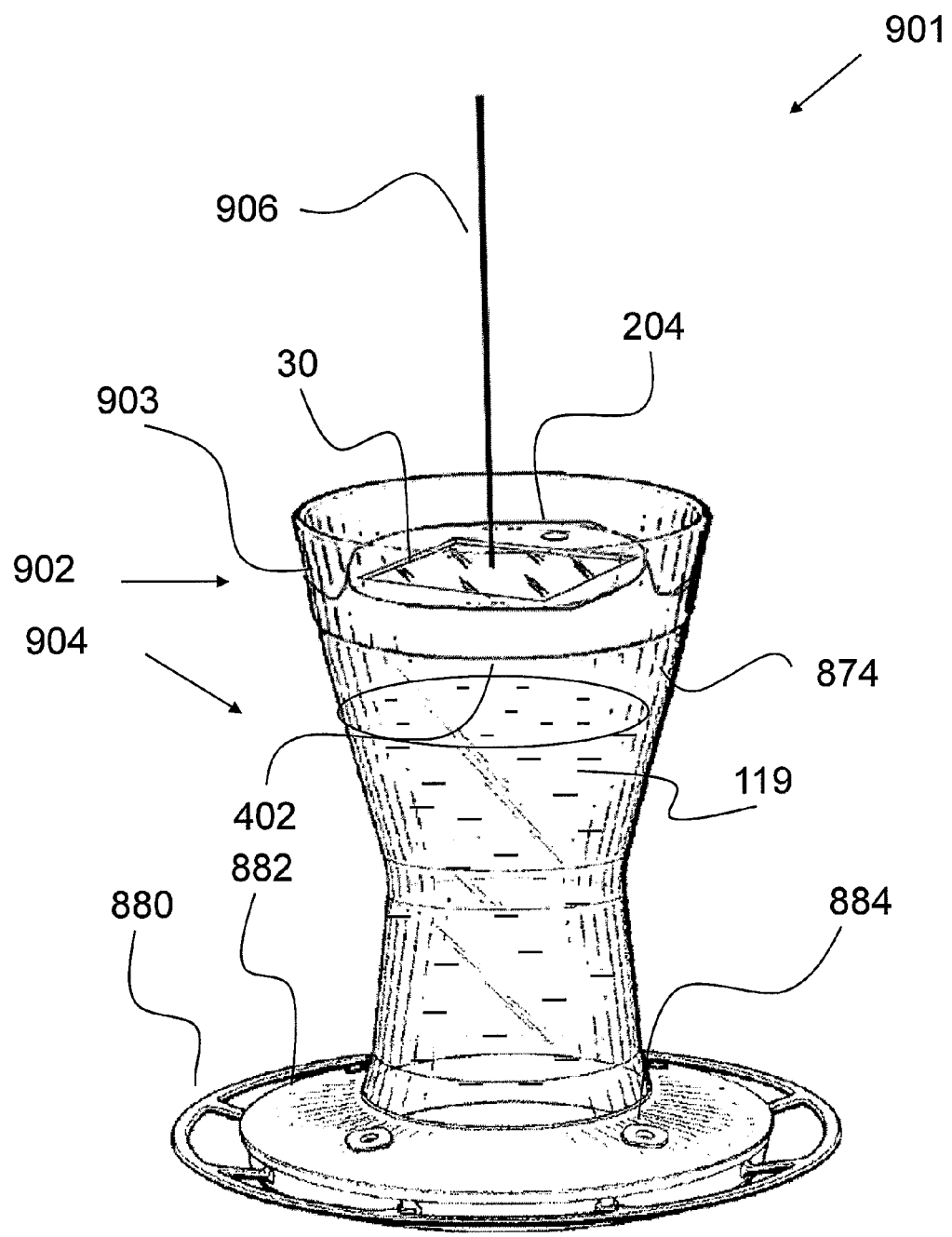
FIG. 12A is a schematic view of a solar powered illuminated hummingbird feeder in accordance with a sixth embodiment of the present invention.

FIG. 12A is a schematic view of a solar powered illuminated hummingbird feeder 901 in accordance with a sixth embodiment of the present invention. In the embodiment illustrated in FIG. 12A, the hummingbird feeder 901 includes a hanging cable 906 connected to a cap assembly 902, a feeder assembly 904 releasably connected to the cap assembly 902, comprising a liquid food reservoir 884 containing a nectar-like liquid food source 119, a covered feeding bowl assembly 882, a perch portion 880 proximate to the covered feeding bowl assembly 882 and feeding stations 884.

The cap assembly 902 is centrally suspended below a hanging cable 906. The cap assembly 902 which may be made from metal, plastic, wood or other suitable material or combination thereof. The upper shade portion of the cap assembly 902 is made from a light transmissive and the lower portion of the cap assembly 902 is made from an at least partially light transmissive thermoplastic. Disposed beneath but exposed to light through the surface of the cap assembly 902 are several solar photovoltaic panels 30 that in the present embodiment are of a crystalline silicon structure. The solar panels are assembled using a lamination process as opposed to an epoxy embedded process. As an alternative, one or more amorphous silicon type solar panels may be used. The amorphous silicon panels may be of a type produced by the company RWE in Germany.

Disposed within the cap assembly 902 is a rechargeable power source 124, as shown in FIG. 18, which is recharged by the solar panels 30. In the present embodiment the rechargeable power source is in the form of two AA size 600 mA/hour nickel cadmium batteries 124. Alternatively, other rechargeable power sources may be used including one or more nickel metal hydride batteries, rechargeable alkaline batteries, lead acid batteries, lithium ion batteries or similar. Access to the batteries for replacement is through a user accessible battery compartment located on the underside of the cap assembly 902. A power supply circuit connects the solar panels 30 in series to a forward based diode, which is in turn connected to a positive terminal of at least one battery 124. A negative terminal of the battery 124 is then connected to the solar panel 30 to complete a power supply circuit. When the solar panel 30 is exposed to sufficient light, the solar panel 30 converts some of the solar energy to electrical energy and creates a current that passes through the diode to charge the battery 124. Thus, during the day the solar panel 30 converts energy from the sun to charge the battery 124. The diode prevents the battery 124 from expending any power on the solar panel 30.

Also located within the cap assembly 902 is the control unit 875, as shown in the circuit of FIG. 7, which may be arranged to sense the ambient light level, for example, in the present example, a light dependent cadmium sulfide resistor 204 located in a light exposed location upon the housing, and if a determination is made by the circuit that insufficient ambient light is available, a connection is made between the batteries 124 and a light source 402, as shown in FIG. 3B, disposed within a lower portion 910 of the cap assembly 902. If a determination is made that sufficient ambient light is available, a connection is not made between the batteries 124 and the light source and current does not flow from the batteries 124. Specifically, the positive terminal of the battery 124 is connected to a switch 40, as shown in FIG. 7, which is in turn connected to a 100 kΩ first resistor 41, as shown in FIG. 7. The first resistor is connected in series with a second, light dependent resistor 204. The second resistor 204 is disposed beneath but exposed to light through the surface of the cap assembly 902. The second resistor 204 connects to the negative terminal of the batteries 124 to complete the lighting circuit. The value of resistance of the second resistor 204 depends upon the amount of light to which the second resistor 204 is exposed. When there is not much light, such as occurs at night, the value of the second resistor 204 increases. During the daytime, when there is sufficient light, the value of the second resistor 204 decreases. Accordingly, the resistor 204 allows the lighting circuit to operate only when there is insufficient light, i.e. at night.

Figure 12B:
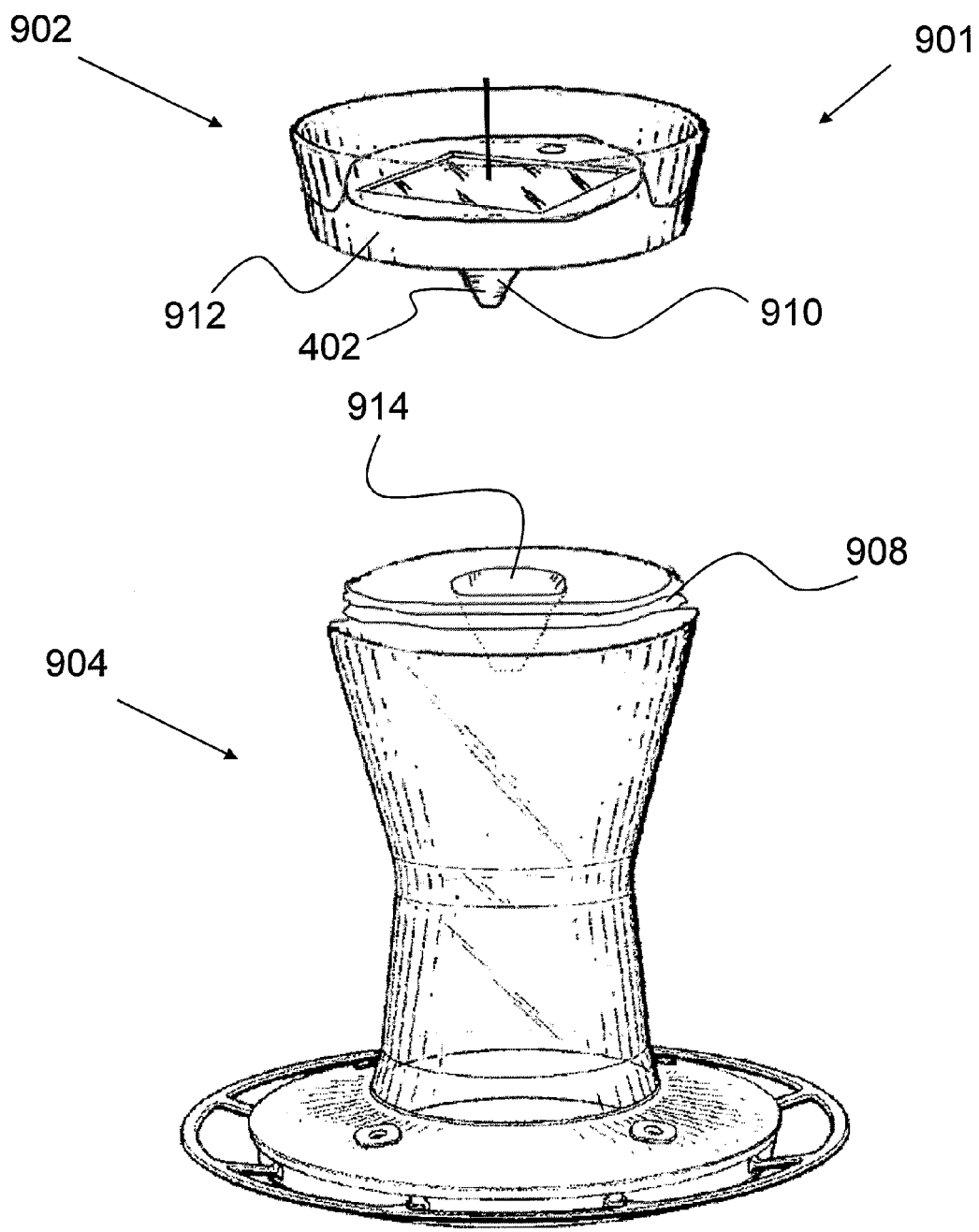
FIG. 12B is a schematic view of the solar powered illuminated hummingbird feeder as shown in FIG. 12A in a partially exploded state.

The cap assembly 902 is releasably connected via thread connections 908, as shown in FIG. 12B, to the liquid food reservoir 904.

The liquid food reservoir 884 is partially cylindrical in shape with the upper wider closed end tapering to a narrow mid-section and the lower end open. The only opening in the liquid food reservoir 884 is the lower end. Near the lower end of the liquid food reservoir 884 is a narrow flange. Between the flange and the open end of the liquid food reservoir 884 are threads which are located to securably connect with the covered feeding bowl assembly 882.

The covered feeding bowl assembly 882 is preferably circular in shape. The bottom portion has a central indentation projecting up into the cavity of the bowl assembly 882 thereby preventing pooling of the nectar in the center of the bowl away from the nectar ports 884. A plurality of small apertures are disposed in upper surface of the bowl assembly to accommodate the feeding stations 884.

The feeding stations 884 are the locations from which the hummingbird obtains nectar. Each feeding station 884 has a short narrow insert with an aperture running therethrough designed to accommodate the beaks and tongues of hummingbirds. The feeding stations 884 are preferably rimmed by a decorative blossom-shaped flange extending radially outward.

A suitable durable material to use in fabricating the feeding assembly 904 is polycarbonate plastic. The liquid food reservoir is made of glass. Hummingbirds respond to and are attracted by bright colors, particularly red. Thus the majority of the feeder assembly 904 is composed of red plastic, the feeding stations 884 are made of white plastic.

FIG. 12B is a schematic view of the solar powered illuminated hummingbird feeder as shown in FIG. 12A in a partially unassembled state. When the food reservoir is empty as shown in FIG. 12B, the releasable feeding assembly 904 can be easily separated from the cap assembly 902 by twisting apart both parts thus opening up the female mated thread arrangements on the lower part of the cap assembly 902 from the male mated thread arrangement on the upper part 908 of the feeding assembly 904. The feeding assembly 904 can now be cleaned via submersion washing and refilled without concern of damaging the water—sensitive electronics disposed within the cap assembly 908. Further, the removal of the feeding assembly 904 from the cap assembly 902 for refilling is made easier because the hanging cable 906 need not be released from its upper tether situation. To enhance the illumination of the liquid food source, the light source in the cap assembly is extended via an extension cavity 910 partly into the envelope of the food reservoir. To accommodate the extension cavity 910 which protrudes from the cap assembly into the food reservoir 874 when the feeder 901 is assembled, an accommodating recess 914 is designed into the upper portion of the feeder assembly 904.

Figure 13:
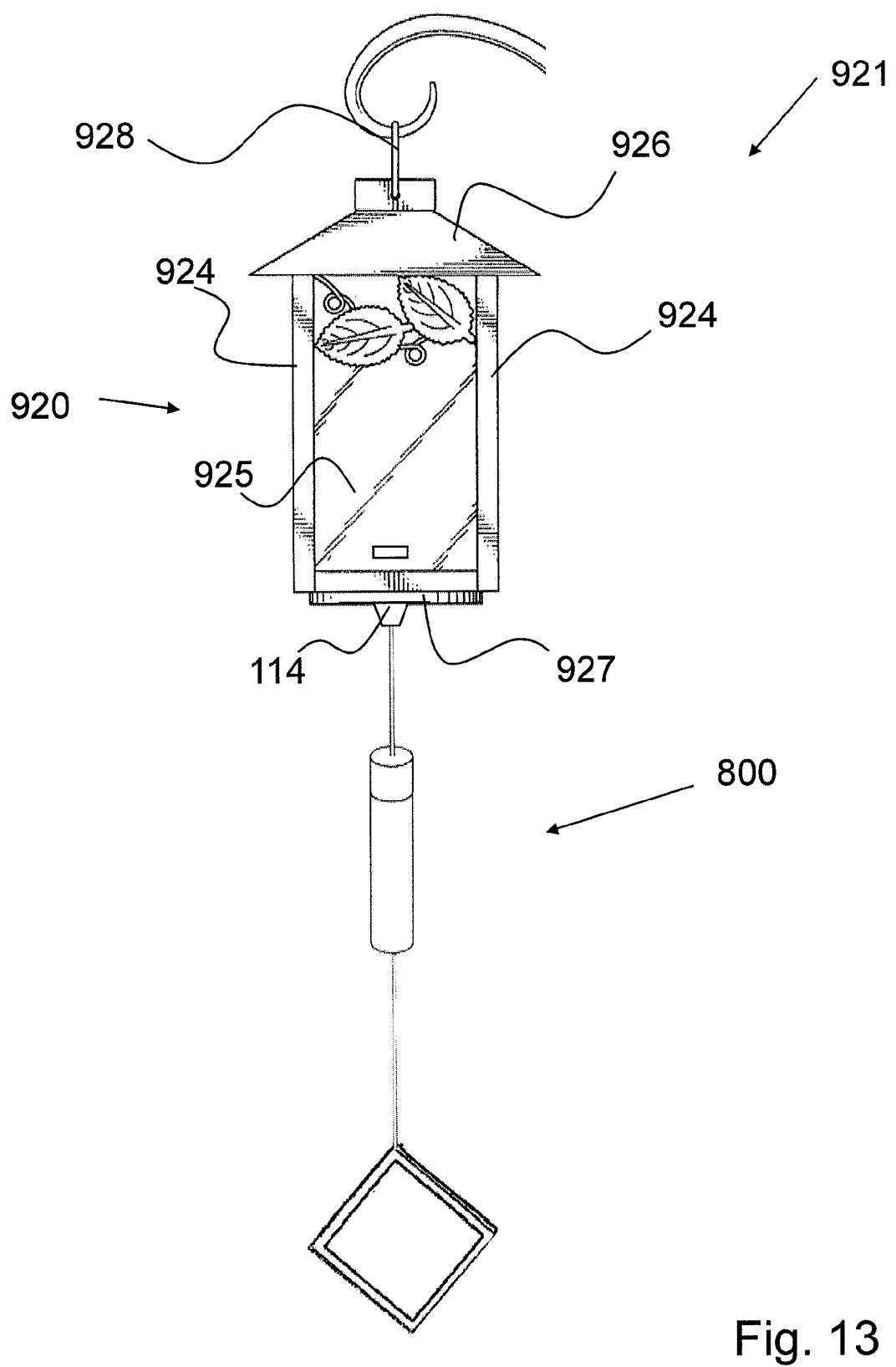
FIG. 13 is a schematic view of a solar powered light fixture in accordance with a sixth embodiment of the present invention.

FIG. 13 is a schematic view of a solar powered light fixture 921 in accordance with a sixth embodiment of the present invention. The light fixture 921 comprises a hangable lantern fixture 920 with a hanging device 928, a partially sloping raked top portion 926, side walls 924, a lens portion 925, a base 927, and a detachable suspendible solar powered lighting assembly 800 as previously detailed in FIGS. 10 and 11. When assembled, the LED inside the lighting module 114 of the solar powered lighting assembly 800 emits light into the lens 925 from below which is then emitted outward of the lens portion 925 so as to be visible at night. The utilization of the releasable lighting module facilitates a flexible modular manufacturing process of the light fixture 921 because the hangable lantern fixture part 920 which does not contain any electrical parts can be manufactured at a separate location to the suspendible solar powered lighting assembly 800 and then combined together in the final customer packaging. As a result, many existing candle lantern toolings can be converted to solar powered illumination with relative ease, provide a wide selection of customer choices with relatively small tooling investment.

Figures 14, 15:
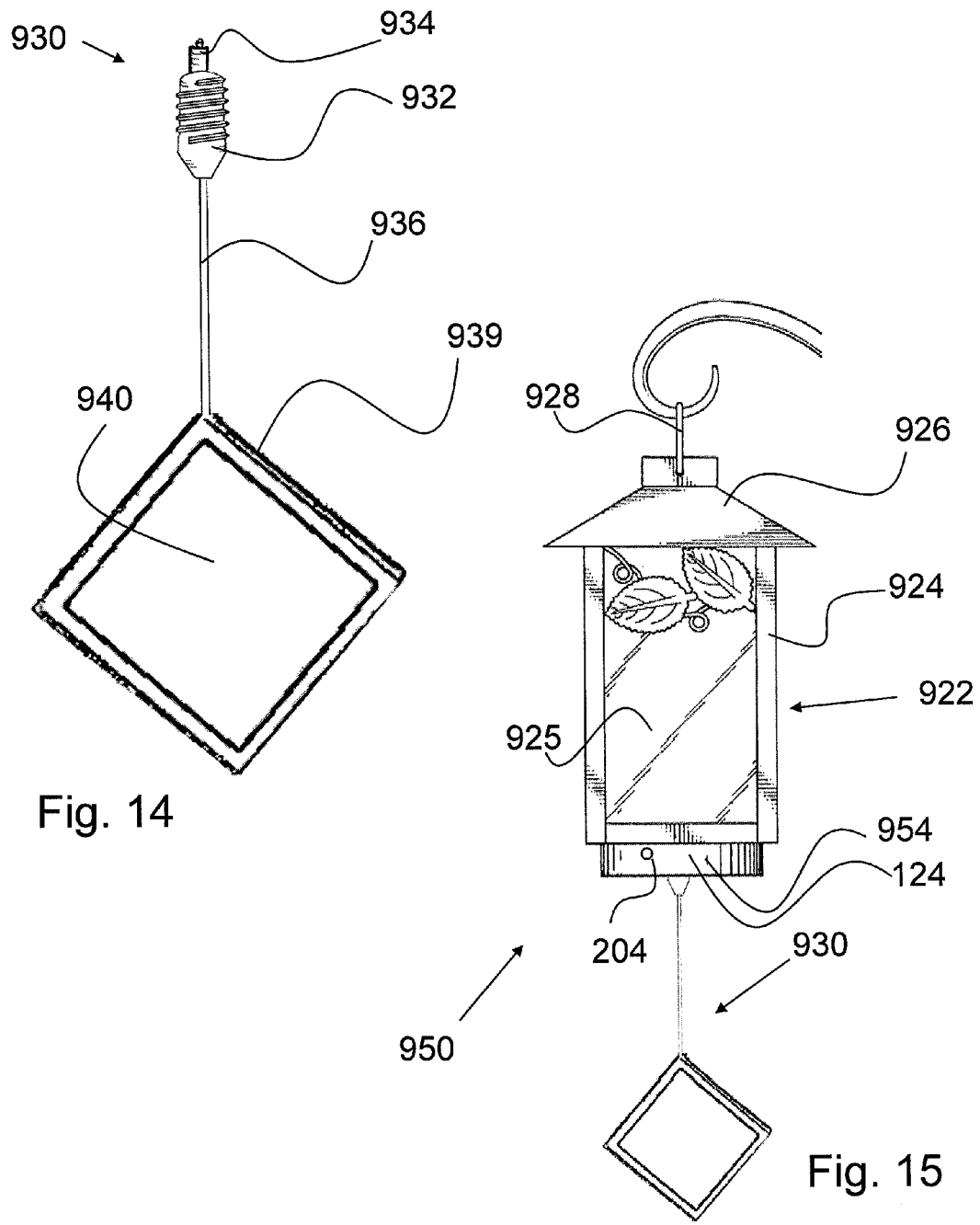
FIG. 14 is a schematic view of a suspendible solar charging module in accordance with a seventh embodiment of the present invention.
FIG. 15 is a schematic view of a solar powered light fixture in accordance with the seventh embodiment of the present invention comprising the suspendible solar charging module shown in FIG. 14.

FIG. 14 is a schematic view of a suspendible solar charging module 930 in accordance with a seventh embodiment of the present invention. In FIG. 14, a threaded power plug housing portion 934 contains a DC concentric barrel electrical plug connector portion 934. Electrically connected to the electrical plug connection portion 934 and suspended below the power plug housing portion 934 via suspension electrical cabling 936 is a solar panel housing 939 containing at least one suspended solar panel 940. In an alternative embodiment, the power plug housing portion 934 does not have threads but utilizes standard DC extra low voltage connections.

In use, a power supply circuit connects the solar panels 940 in series to a forward based diode to be used in a remote charging sub-circuit, an example of such a circuit is shown in FIG. 7, which is in turn connected to a positive terminal of a remote battery 124, as shown in FIG. 15 and in FIG. 8B. The negative terminal of the remote battery is then connected to the solar panel 30 to complete a power supply circuit. When the solar panel 940 in the solar panel housing 939 is exposed to sufficient light, the solar panel 940 converts some of the solar energy to electrical energy and creates a current that passes through the diode to charge a connected battery. The diode may be located in the solar housing 939 proximate to the solar panel 940 or may be remotely located closer to a battery charging circuitry. Thus, during the day the solar panel 940 converts energy from the sun to charge a connected battery. The diode prevents a connected battery from expending any power back on the solar panel 940. Because there are preferably two solar panels 940 mounted back to back facing away from each other on the solar panel housing 940, the panels are able to absorb sufficient sunlight to create an adequate charge current. The two amorphous silicon solar panels are mounted in a frame 939 to protect the edges of the panels which are usually constructed from a glass substrate. The frame 939 also offers protection to users from the risk of injury from the sharp cut edge of the glass solar panel.

The solar panel housing harnesses the power of the sun as it preferably comprises at least one amorphous silicon solar panel 940 which converts light energy to electrical energy. As an alternative, one or more crystalline silicon structure type solar panels may be used. In that embodiment, the solar panels are preferably assembled using a lamination process as opposed to an epoxy embedded process. The electrical energy produced by the solar panel 940 is transferred to the power plug housing portion 934 via the suspension electrical cabling 936.

FIG. 15 is a schematic view of a solar powered light fixture 950 in accordance with the seventh embodiment of the present invention comprising the suspendible solar charging module shown in FIG. 14. There is disclosed a portable dual-charging light fixture 950 which includes a light housing 922 with a hanging device 928, a partially sloping raked top portion 926, side walls 924, a lens portion 925, a lower portion 954, a rechargeable electrical power source 124 disposed in the lower portion 954, a lighting element illuminating part of lens portion 925 from within is conductively coupled to a rechargeable electrical power source located in the lower portion of the light housing 922. Also included in the lower portion of the light housing 922 is an electrical charging system coupled to the rechargeable electrical power source for recharging the rechargeable electrical power source, the electrical charging system being adapted to receive power from an external AC power source via a step down transformer, cable and DC concentric barrel electrical plug connector which may be removeably plugged into the light housing 922. When the rechargeable electrical power source is fully charged by the AC power source as described above, the cable and DC concentric barrel electrical plug connector are removed from the light fixture 922 and the light fixture 922 may be placed on a table or suspended from a hanging hook for use. The light housing 922 is weatherproof for outdoor use.

The light housing 922 includes a photoresistor 204 conductively coupled to the rechargeable power source for activating and deactivating the battery depending upon the amount of light hitting the photoresistor with the effect such that at low light levels, the lighting element illuminates.

There is timing circuitry contained in the light housing 922 and electrically connected to the photoresistor such that the light source illuminates at dusk and is turned off by the circuit after a predetermined period of time, preferably, six hours to conserve battery charge.

The lighting element is at least one light emitting diode.

When the light housing 922 is hung outdoors, it may be somewhat inconvenient to bring the light housing 922 indoors to recharge the batteries via an accessible AC power source. Accordingly, the present invention provides a suspended solar charging option that may be attached to charge the batteries in situ outside. Releasably connected to the lower portion of the light housing 922 and suspendible from the light housing 922 is the solar energy system 930 shown in FIG. 14 that may be conductively coupled to the rechargeable electrical power source for collecting solar energy, converting the solar energy into electrical energy, and recharging the rechargeable electrical power source with the converted electrical energy.

The solar panel housing harnesses the power of the sun as it preferably comprises two back-to-back amorphous silicon solar panels 940 which convert light energy to electrical energy. As an alternative, one or more crystalline silicon structure type solar panels may be used. In that embodiment, the solar panels are preferably assembled using a lamination process as opposed to an epoxy embedded process.

Figure 16:
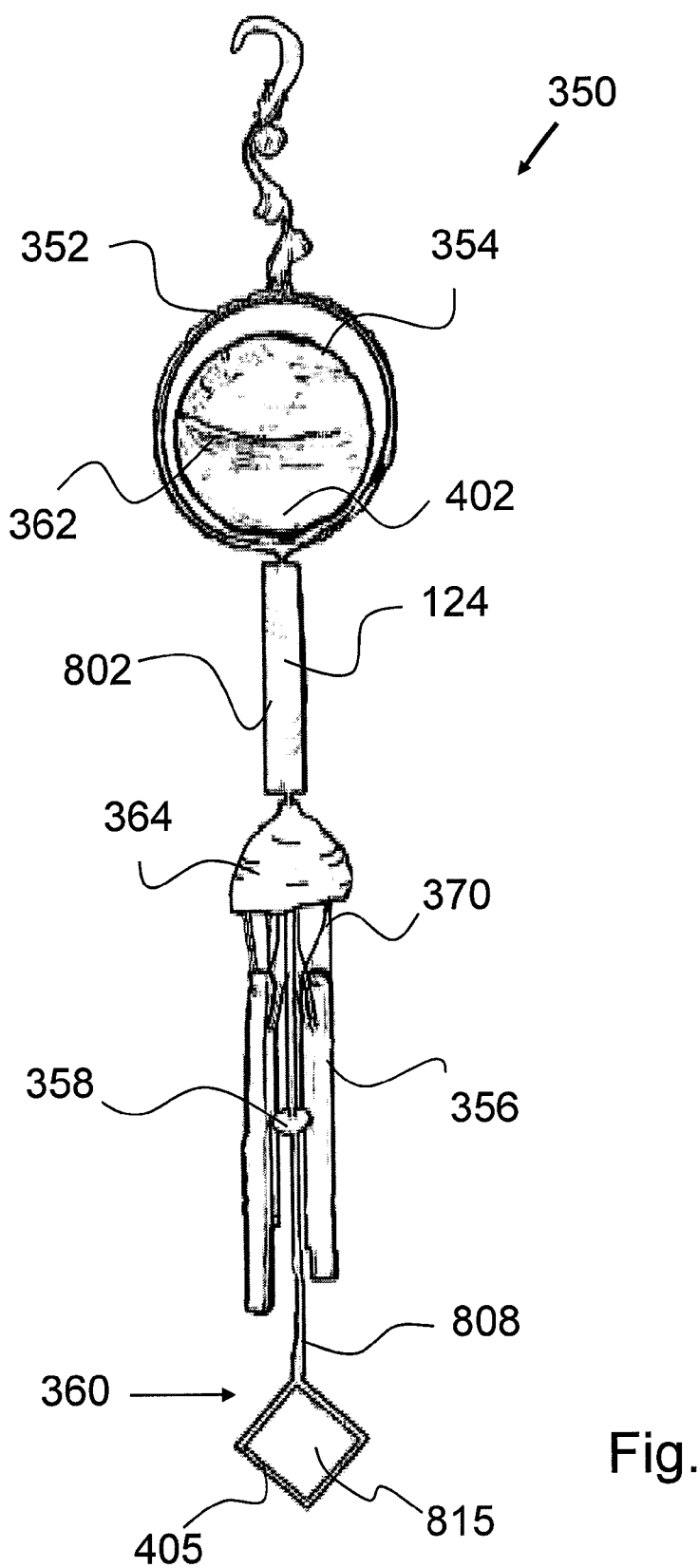
FIG. 16 is a schematic view of a solar powered light fixture in accordance with an eighth embodiment of the present invention.

FIG. 16 is a schematic view of an eighth embodiment of the present invention. In the embodiment illustrated in FIG. 16, there is disclosed a wind chime 350 which includes a frame 352 supporting a lens portion 354. Suspended below the lens portion 354 is a hollow control unit 802 that is shaped to resemble a chime member 356. Suspended below the control unit 802 is a housing portion 364. Suspended below the housing portion 364 are chime members 356 and a striker disc 358 below which is suspended a pendulum wind catcher 360.

The lens portion 354 may be made from plastic, glass, resin or other suitable light transmissive material or combination thereof. The lens portion 354 is made from hand-blown glass. The lens portion 354 is substantially spherical except for its lower extremity. In the present embodiment, the lens portion 354 has an internal layer of fluorescent or phosphorescent material or pigment 362 on part of the spherical inside wall thereof. Alternatively, the glass may be impregnated directly with phosphorescent pigment. The lens portion forms a chamber and is substantially constructed from hand-blown glass which may have different colored glass elements providing some contrast. The lens portion 354 may further comprise fluorescent and luminescent elements within it 362. The lens portion 354 is preferably sealed to prevent moisture from reaching the fluorescent and luminescent elements 362. Thus there is a wind chime 350 having a hollow light transmissive lens 354 which is partially impregnated or coated with a light transmissive phosphorescent element 362.

The housing portion 364 may be made from metal, plastic, wood or other suitable material or combination thereof. The housing may have a solid surface or be a horizontal open ring type commonly found in wind chimes where a ring is suspended below a central hanging point, the ring acting a spacer and support for the chime members suspended below it. The major portion of the housing 364 is made from a non-rusting metal such as brass or aluminum. Disposed above the housing 364 and below the lens portion 354 is a control unit 802 housing a rechargeable power source 124, and control circuitry. The control unit 802 contains the batteries 124 in a vertical orientation and a charging sub circuit 366 and an illumination sub-circuit 368. The rechargeable power source 124 is preferably recharged by two vertically oriented parallel and outwardly facing amorphous silicon solar panels 30 located at the end of a pendulum 360 connected by electrical wires 808 to the control unit 802. In the embodiment disclosed herein embodiment, the rechargeable power source is in the form of two AA size 600 mA/hour nickel cadmium batteries 124. As shown in FIG. 8A, access to the batteries for replacement is by opening the control unit 802 and separating the upper control unit housing 810 from the lower control unit housing 812 thereby providing access to the batteries 124. A power supply circuit connects the solar panels disposed in the pendulum 360 in series to a forward based diode in the charging sub-circuit (an example of this sub-circuit is shown in FIG. 7), which is in turn connected to a positive terminal of one battery 124. A negative terminal of the battery 124 is then connected to the solar panel 30 to complete a power supply circuit. When the solar panel 30 in the pendulum wind catcher 360 is exposed to sufficient light, the solar panel 30 converts some of the solar energy to electrical energy and creates a current that passes through the diode to charge the battery 124. Thus, during the day the solar panel 30 converts energy from the sun to charge the battery 124. The diode prevents the battery 124 from expending any power on the solar panel 30. Because there are two solar panels 30 mounted back to back facing away from each other on the pendulum wind catcher 360, the panels are able to absorb sufficient sunlight to create an adequate charge current. The two amorphous silicon solar panels are mounted in a frame 405 to protect the edges of the panels which are usually constructed from a glass substrate. The frame 405 also offers protection to users from the risk of injury from the sharp cut edge of the glass panel.

Also located within the control unit 802 is circuitry which may be arranged to sense the ambient light level, for example, in the present example, a light dependent cadmium sulfide resistor located in a light exposed location on the control unit housing 802, an example of such circuitry is shown in FIG. 7, and if a determination is made by the circuit that insufficient ambient light is available, a connection is made between the batteries 124 and the light source 402 located such that the light source 402 is directed into the lens portion 354. If a determination is made that sufficient ambient light is available, a connection is not made between the batteries 124 and the light source 402 current does not flow from the batteries. Specifically, the positive terminal of the battery 124 is connected to a switch 40, as shown in FIG. 7, which is in turn connected to a 100 kΩ first resistor 41, as also shown in FIG. 7. The first resistor is connected in series with a second, light dependent resistor 204, as shown in FIG. 8B. The second resistor 204 connects to the negative terminal of the batteries 124 to complete the lighting circuit. The value of resistance of the second resistor 204 depends upon the amount of light to which the second resistor 204 is exposed. When there is not much light, such as occurs at night, the value of the second resistor 204 increases. During the daytime, when there is sufficient light, the value of the second resistor 204 decreases. Accordingly, the resistor 204 allows the lighting circuit to operate only when there is insufficient light, i.e. at night.

The chime portion includes a plurality of chime members 356 moveably suspended from the housing portion 364, and a pendulum assembly also moveably suspended from the housing portion 364. The chime members 356 are suspended from the housing 364 by suspension lines 370. The suspension lines 370 are preferably made from a nylon that is highly resistant to abrasion, ultra-violet degradation, rot and mildew. The chime members 356 are suspended and the suspension lines 370 are attached to the chime members 356.

In this embodiment, the suspension lines 370 are suspended directly from drill support holes. In the embodiment disclosed herein, the drill support holes for affixing the suspension lines to the chime members are de-burred and burnished to minimize wear and tear of the line. Alternatively, the suspension lines 370 are centrally suspended from within each chime member 356 attached to a horizontal cross line that is attached to both drill support holes with smoothly polished tube ends to prevent abrasion.

The striker 358 may be made from polyethylene, wood, glass, resin or another material and is hung from the housing 364 from a central point of a radius. In the present embodiment the striker 358 is in the shape of a disc that is substantially round in its widest horizontal plane.

In the embodiment described herein, the chime members 356 are suspended within a substantially fixed radius equidistant of the central pendulum assembly 808.

In the embodiment described herein, electrical wires are electrically connected to a light emitting element 402, which in the present embodiment takes the form of an LED. The LED 402 may be disposed inside, or directed into, the lens portion 354. The lens portion 354 may be formed, wholly or in part, of a suitable translucent or transparent material. In the embodiment described herein that material is glass. Mechanical connection means to affix the lens portion 354 to the control unit 802 may also be provided in addition to the electrical wires. Such means may include a chain or wire affixed to the frame 370 which supports the control unit 802. A second pair of electrical wires is located between the control unit 802 and the housing 364, the electrical wires passing through the housing and through the striker disc 358 to the pendulum wind catcher 360 disposed at the end of electrical wires 808 remote from the housing 364. Mechanical connection means to affix the housing 364 to the control unit 802 may also be provided in addition to the electrical wires.

In the embodiment described herein, the light fixture 350 includes a striker disc 358 suspended from the housing 364. Also, connected to the striker disc 358 are electrical wires 808 that pass from the control unit 802 through the striker disc 358 to the pendulum wind catcher 360 and thereto the solar panels 30.

The pendulum wind catcher 360 harnesses the power of the wind and transfers it to the striker disc 358, which moves to strike the chime members 356 and thus create an acoustic sound. The pendulum wind catcher also harnesses the power of the sun as it further comprises at least one amorphous silicon solar panel 30 which converts light energy to electrical energy. As an alternative, one or more crystalline silicon structure type solar panels may be used. In that embodiment, the solar panels are preferably assembled using a lamination process as opposed to an epoxy embedded process. The pendulum wind catcher 360 incorporating the solar cell 815 is of appropriate cross section to be accelerated by local wind conditions. Thus the present invention discloses a pendulum wind catcher that also has electrical charging means.

Figures 17A, 17B:
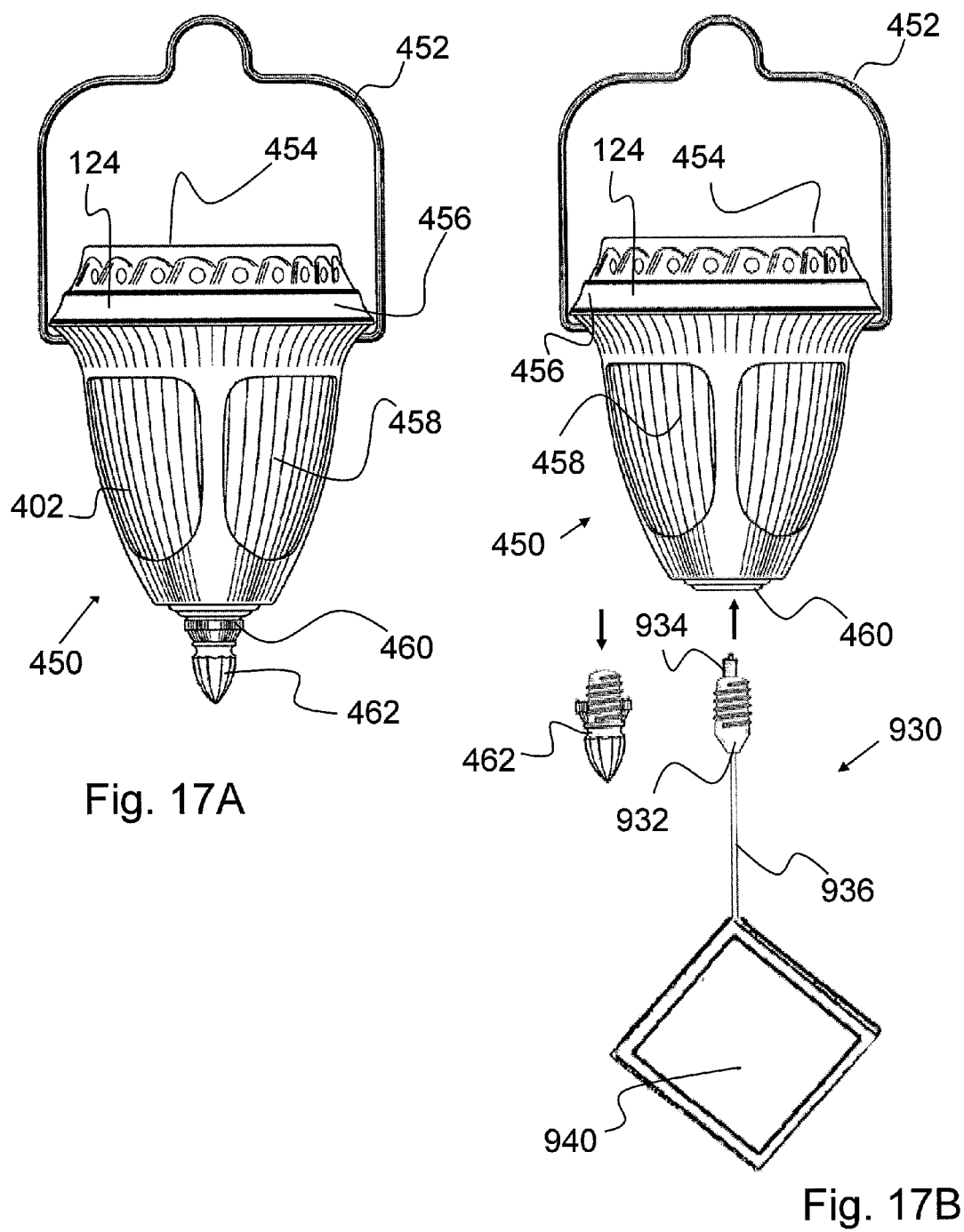
FIG. 17A is a schematic view of a solar powered light fixture in accordance with a ninth embodiment of the present invention.
FIG. 17B is a schematic view of the solar powered light fixture in accordance with the ninth embodiment of the present invention shown in FIG. 17A.
Figure 17C:
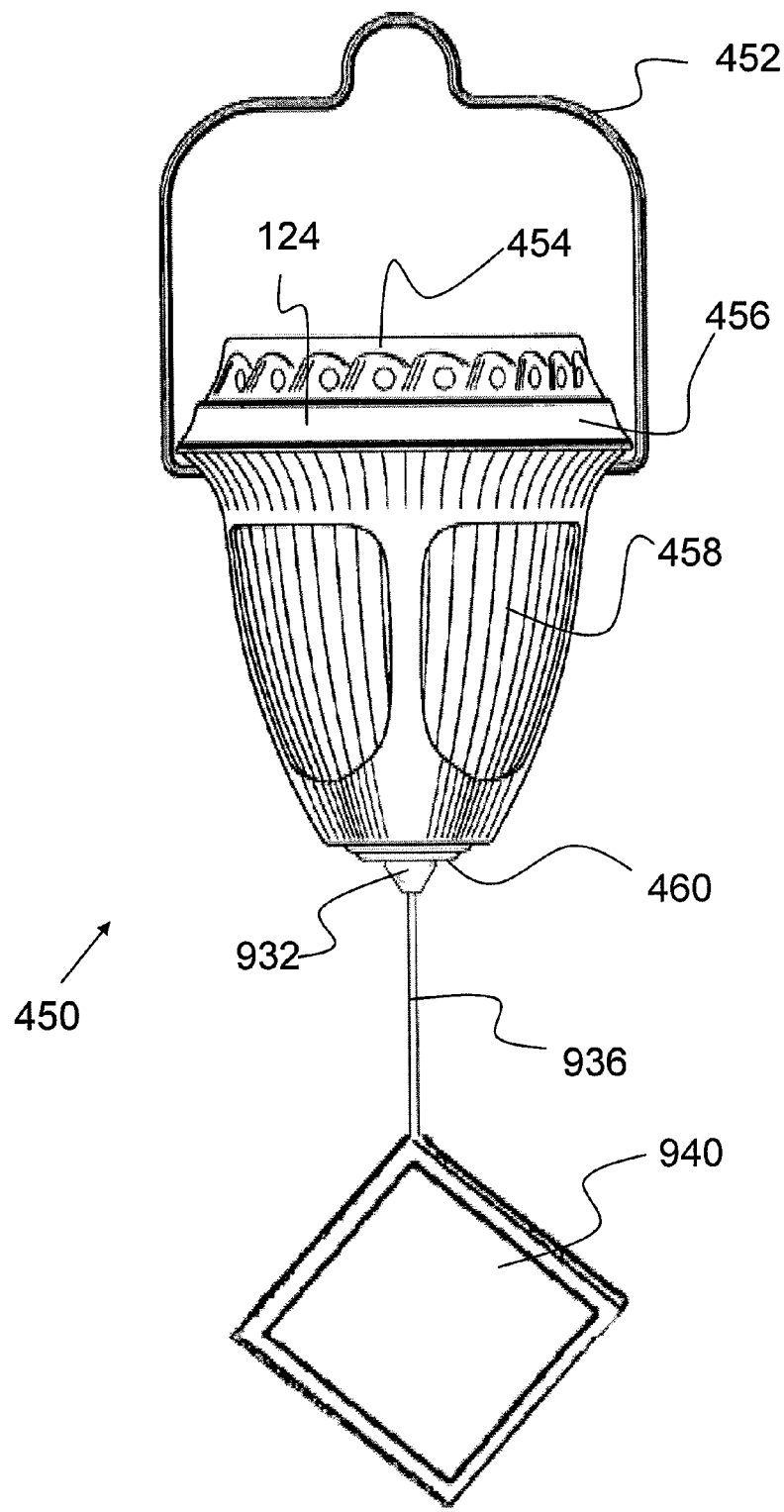
FIG. 17C is a further schematic view of a solar powered light fixture in accordance with the ninth embodiment of the invention shown in FIG. 17B.

FIGS. 17A, 17B and 17C show schematic views of a further solar powered light fixture 450 in accordance with a ninth embodiment of the present invention. In the ninth embodiment there is disclosed a light fixture 450 which comprises a light housing 456, a support member 452 coupled to the light housing for supporting the light housing 456, a rechargeable electrical power source 124, (as shown in FIG. 8B, disposed in the light housing 456, a lighting element 402, as also shown in FIG. 8B, disposed within the light housing 456 and being conductively coupled to the rechargeable electrical power source 124. The lighting element 402 is electrically coupled to the rechargeable electrical power source for receiving electrical energy from it and for illuminating the light fixture 450 so that the lens portion 458 of the light fixture 450 emits light. There is a solar panel 454 carried by the light housing 456, where the solar panel 454 is adapted to collect solar energy and convert the solar energy into electrical energy. The solar panel 454 is conductively coupled to the rechargeable electrical power source such that the solar energy collected and converted into electrical energy recharges the rechargeable electrical power source. A lower cap portion 462 is releasably connected to a lower portion of the light housing 460. The lower cap portion 462 may be removed by a user and replaced with an additional solar energy system 936 releasably suspended from and below the lower portion of the light housing 460 and connected to the rechargeable electrical power source via a releasable electrical cable 936 and electrical plug portion 934 so that the additional solar energy system 936 is adapted to collect solar energy and convert the solar energy into additional electrical energy. The additional solar energy system 936 is conductively electrically coupled to the rechargeable electrical power source in the light housing 456, such that the additional solar energy collected and converted into additional electrical energy recharges the rechargeable electrical power source 124 and the additional solar energy system incorporating solar panel 940 is removably suspended beneath a lower portion of the light housing 460.

Figure 19:
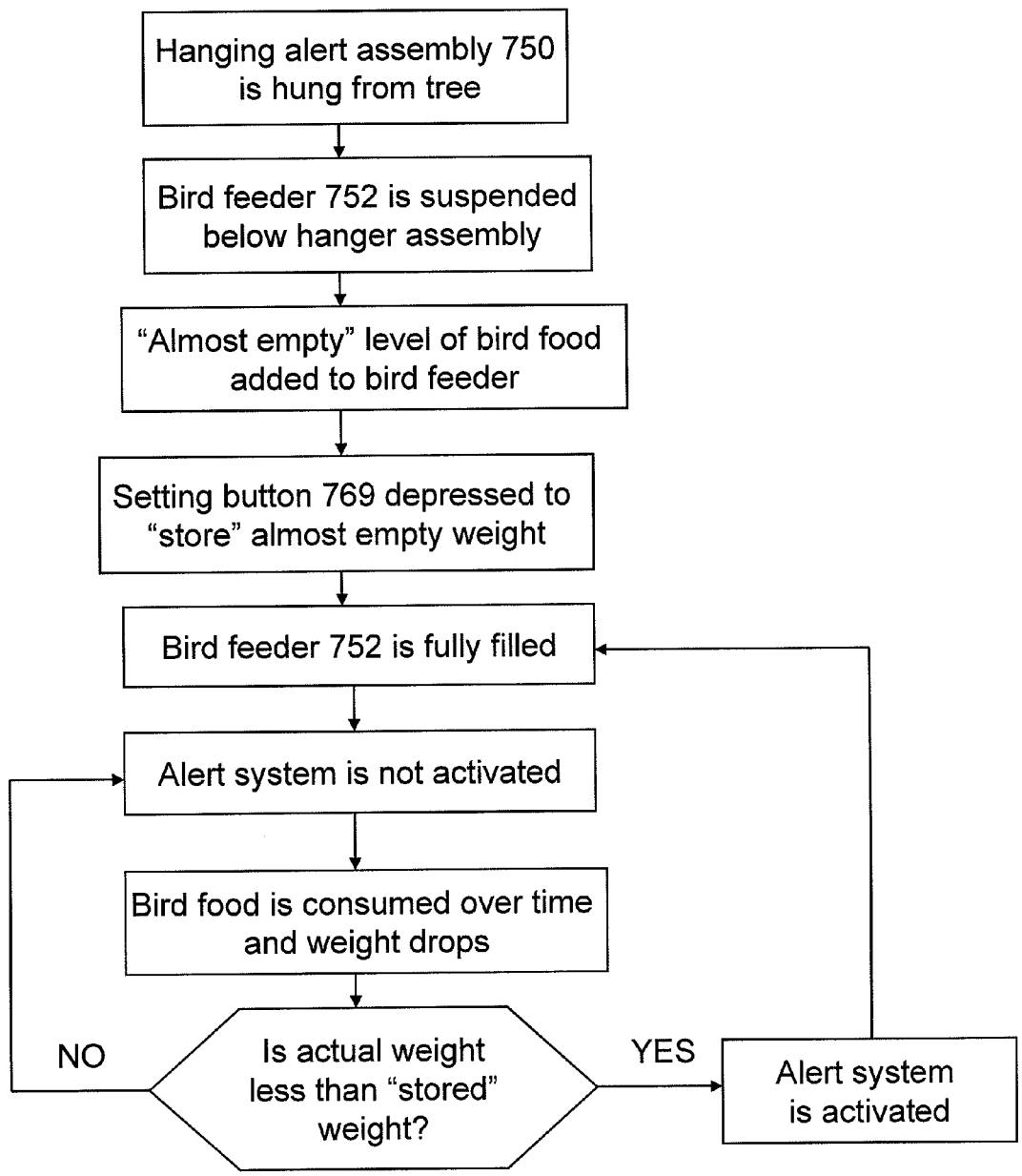
FIG. 19 is a flowchart illustrating some of the functions of the solar powered light fixture in accordance with the tenth embodiment of FIG. 18.

FIGS. 18 and 19 disclose a tenth alternative embodiment of the present invention being a hanging refill alert assembly for a bird feeder 752 or the like of the present invention 750 which is designed to support a bird feeder 752 having food therein. The hanger assembly 750 generally includes an enclosed housing 754 having an upper end 756 and a lower end 758. An upper hook or support 760 is secured to the housing and extends upwardly therefrom for mounting the same on a tree branch or the like.

A lower support 762 in the form of a hook or the like to which the bird feeder 752 may be connected. The lower support 762 is constructed of an electrically conductive metal material for a purpose to be described hereinafter. Lower support 762 is connected to a load cell 764 of conventional design. The load cell may be a S-load cell, a beam load cell, or any other type of load cell available on the market. The load cell 764 is conventionally connected by leads 766 and 768 to a conventional circuit board 770 including a microprocessor in conventional fashion. In a first alternative embodiment to the tenth alternative embodiment of the present invention, the load cell 764 may be a weight measurement and signal conversion device that measure the actual weight and converts the actual weight into a signal that may be processed by the microprocessor to calculate weight changes.

The circuit board and the circuitry associated therewith are powered by batteries 124. A light emitting device 402 such as a light bulb operatively associated with the circuitry. An on-off switch, as shown in FIG. 8B, is also provided. A momentary contact "setting" switch 769 is also provided.

Disposed on a top surface of the housing is a solar panel 30. The solar panel 30, which serves to convert solar power to electrical power, may be in the form of encapsulated polycrystalline PV solar panels or any other suitable solar power converting means.

The light sources 402 are at least one light emitting diode or LED. There may be two or more LEDs. The LEDs are situation so that some part of the housing 754 emits light when the light sources 402 are illuminated. The housing 754 contains a rechargeable electrical power source 124 preferably in the form of two replaceable AA-sized Nickel Cadmium batteries coupled to an electrical charging system built into the printed circuit board 770 for charging said power source 124. The LEDs are electrically coupled to the rechargeable batteries 124 and said at least one light source is capable of being situated such that light is emitted from said housing 754. The solar cell 30 is weatherproofing sealed to the top surface of the housing 754 and is electrically connected through an aperture in the top section 756 of housing 754 to the printed circuit board 770. When operative, a solar energy system is formed conductively coupled to a charging system for collecting solar energy during the day, converting the solar energy into electrical energy, and transferring the electrical energy to the charging system; and storing the energy in the batteries 124.

The load cell 764 is calibrated such that when a filled bird feeder 752 is supported on the lower support 762, the circuit will be closed. If less than a predetermined weight is present on the bird feeder 752, such as when the feeder is empty, the load cell 764 will activate the circuit board 770. If the on-off switch is "on," the change in weight below a predetermined threshold of the bird feeder 752 will activate the light 402 at night. The lights 402 will flash to alert the owner to refill the feeder.

A user fills the food reservoir of the bird feeder 752 to a level that is deemed "almost empty". The user then activates a momentary contact switch 769 on the housing 754 which when depressed causes then circuit to "learn" the predetermined weight of the feeder and the low level of food therein. The weight setting is stored in the memory of an integrated circuit in part of the circuit. The user then fills the rest of the food reservoir with food. When the food is consumed by the birds and the bird feeder and the food level drops below the weight that was set by the user, the alert system is activated.

FIG. 19 is a flow chart of the weighing steps of an assembled solar powered illuminated hummingbird feeder in accordance with the preferred embodiment of the present invention, shown in FIG. 18.

Figure 20:
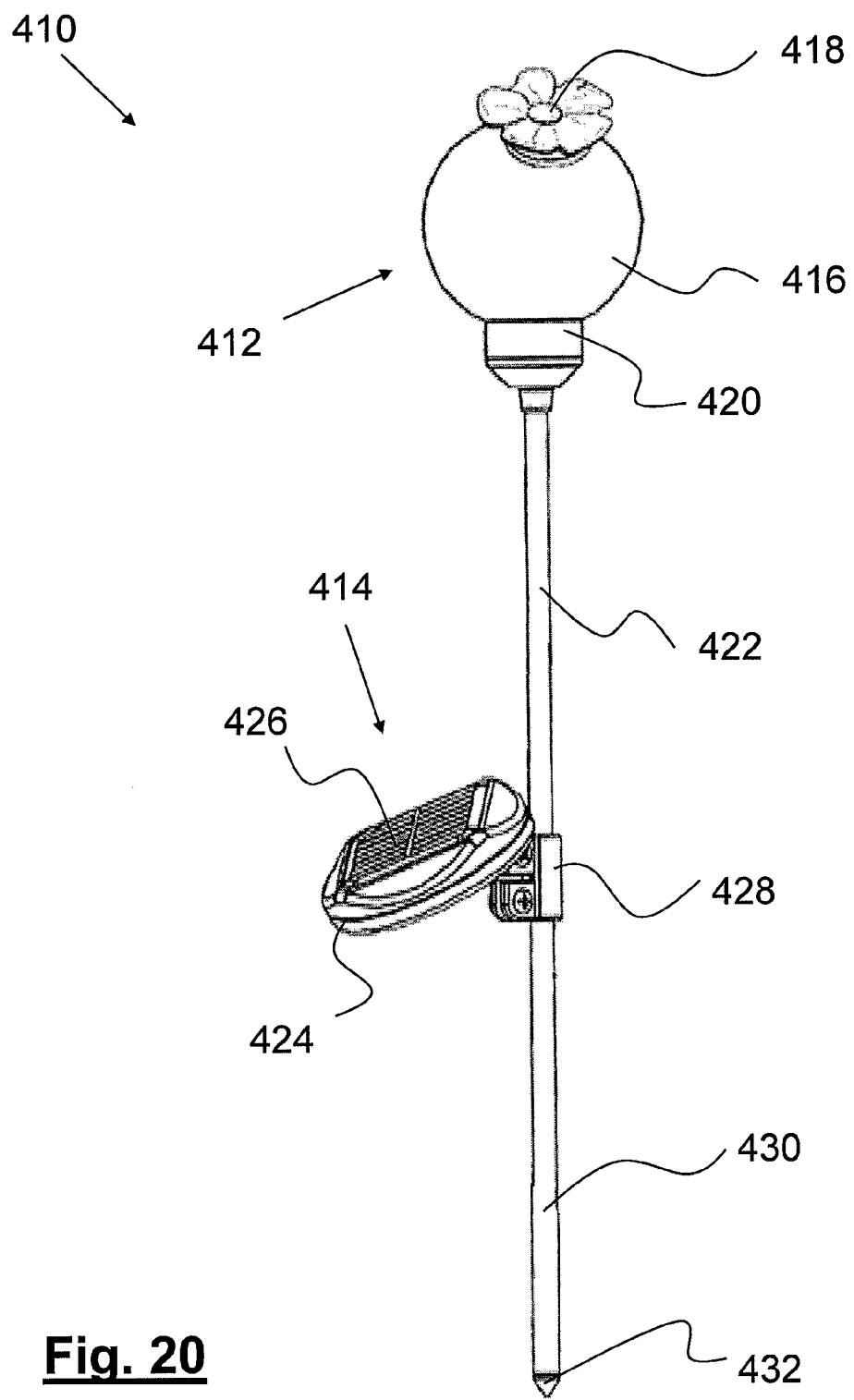
FIG. 20 is a schematic view of an assembled of a self supporting illuminated humming bird feeder in accordance with an eleventh embodiment of the present invention.

Referring to FIG. 20, a self supporting illuminated humming bird feeder 410 include a feeder assembly 412 comprising a liquid food reservoir 416 and a feeding port 418. The feeder assembly 412 is releasably connected to a lighting element and support assembly 420, a support 422, and a collector unit 414. The lighting element and support assembly 420 typically includes a light producing means such as an incandescent lamp or LED 420 (not shown). In some embodiments, a lighting element shield may be positioned over the lighting element and lighting element seat to protect the lighting element from moisture. Disposed upon the surface of the collector unit 414 are several solar photovoltaic panels 426 that in the present embodiment are of a crystalline silicon structure. The solar panels are assembled using a lamination process. Alternatively, an epoxy embedded process is utilized. As an alternative, one or more amorphous silicon type solar panels may be used.

The lighting element and support assembly 422 are secured near the upper end of the support 422 a distance from the collector unit 414. In typical uses, the collector unit 414 will be positioned at or below the upper boundary of foliage and the like in order to minimize its visual impact. The collector unit 414 typically contains at least one solar cell and a battery, or like means, for collecting and storing solar energy during daylight hours. The solar cell and battery may be integrated in the collector unit 414 or may be secured separately to the support 422. Wiring (not shown) connects the lighting element assembly 422 to the collector unit 414 within and via the hollow support 422.

The support 422 may be straight, curved, or sloped, or have a non-deterministic ornamental shape. In the illustrated embodiment the support 422 is embodied as a straight rod. The rod 422 may be hollow and may have any cross section offering sufficient strength to support the lighting element assembly 422. It may be one monolithic rod or assembled from smaller sections. The sections may be telescoping with fasteners maintaining the sections in place. Alternatively, the sections may thread into one another or secure to one another by threaded connecting pieces. In the illustrated embodiment, the rod 422 is made of stainless steel due to its resistance to weathering; however, aluminum, brass and rigid, weather-resistant plastics such as polycarbonate, polypropylene, or polyvinylcholoride, may also be used.

Beneath the collector unit is a lower stake portion 430 which typically is inserted partially into the soil or other substrate and may have a sharpened tip 432 to facilitate insertion. The sharpened tip 432 is either integrally formed with the lower stake portion 430 or secured by threads, press-fit, weld, or like attachment means. In other embodiments, the lower stake portion 430 may be supported by a broad-based stand or other structure that simply rests on the substrate. Such a support mechanism may be used when, for example, the feeder 410 is placed on a wooden deck or cement patio where insertion is not practicable. In other embodiments, the lower stake portion 430 includes a clamp arrangement for attachment to the rail or risers of a decking.

To preserve the aesthetic aspects of the feeder 410 it may be advantageous to position the collector unit 414 away from the liquid food reservoir 416. In the illustrated embodiment, in which the support 422 is embodied as a substantially straight rod 422, the collector unit 414 may be secured to the rod 422 such that the distance between itself and the lighting element assembly 422 is equal to about 50 percent or more of the length of the rod 422.

In other embodiments, the support 422 may extend horizontally. Accordingly, the collector unit 414 may be separated a horizontal distance from the liquid food reservoir 416 as well as a vertical distance. For example, the support 422 may be embodied as two stakes, one having the lighting element and support assembly 420 secured thereto and the other having the collector unit 414 secured thereto. Accordingly, the liquid food reservoir 416 may be placed prominently whereas the collector unit 414 is placed more discreetly. In addition, the position of the liquid food reservoir 416 may be chosen with reference to aesthetics, whereas the position of the collector unit 422 may be chosen based on light conditions.

Figure 21A:
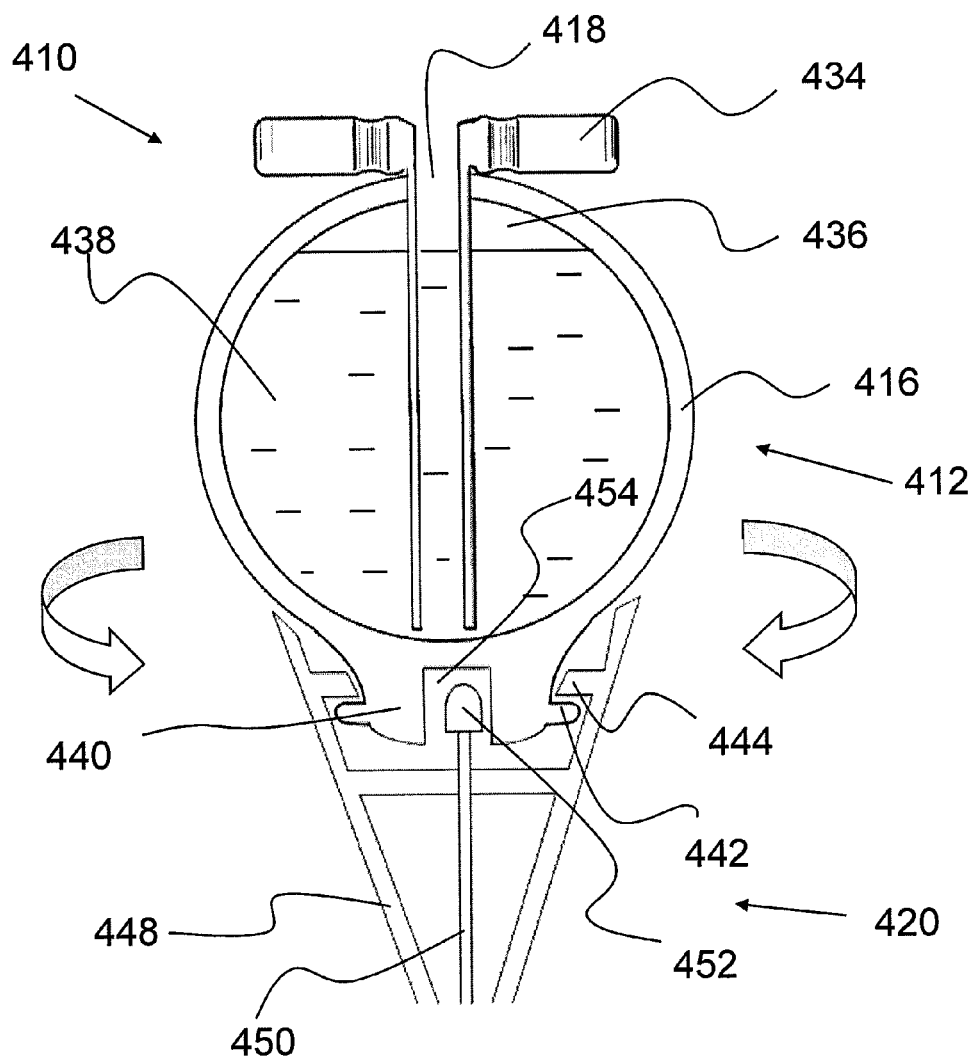
FIG. 21A is a cross-sectional view of part of a self supporting illuminated humming bird feeder similar to the design shown in FIG. 20.

FIG. 21A is a cross-sectional detail view of part of the assembled solar powered illuminated hummingbird feeder 410 in accordance with the eleventh embodiment of the invention shown in FIG. 20. It shows the feeder assembly 412 comprising a lower neck portion 440 that contains a socket receiving cavity 454, a reservoir portion 416 substantially enclosing a cavity 436, and a feeding port 418. The lower neck portion has feeder protrusions 442 that releasably mate with socket protrusions 444 in the lighting element and support assembly 420 to releasably secure the feeder assembly 412 to the lighting element and support assembly 420. A low heat emitting light source such as at least one light emitting diode 452 is positioned within the lighting element and support assembly 420 to direct light through at least part of the reservoir portion 416 via the cavity 436. The light source 452 is energized via electrical connections 450 to the collector unit 414 shown in FIG. 20. The socket protrusions 444 are supported by a support frame 448 on the lighting element and support assembly 420. A decorative feeding tube 434 is positioned so that a portion of the feeding tube is directed downward towards the liquid food solution 438. The feeding tube is removable for washing. The unassembled food reservoir 416 is preferably constructed from a hand-blown glass with the neck portion 440 added and the feeding port 418 drilled out as second and third manufacturing operations respectively. The food reservoir portion 416 is an elongated substantially spheriod shaped container for housing liquid food solution 438. Other geometric shapes and sizes, as well as shapes in form of animals and flowers, of different colors for the solution reservoir are possible. The volume in the solution reservoir, or course, can vary depending upon size of the food reservoir and the amount of feeding solution to be distributed therein. In addition, the feeder could be incorporated for feeding other types of birds and animals.

Figure 21B:
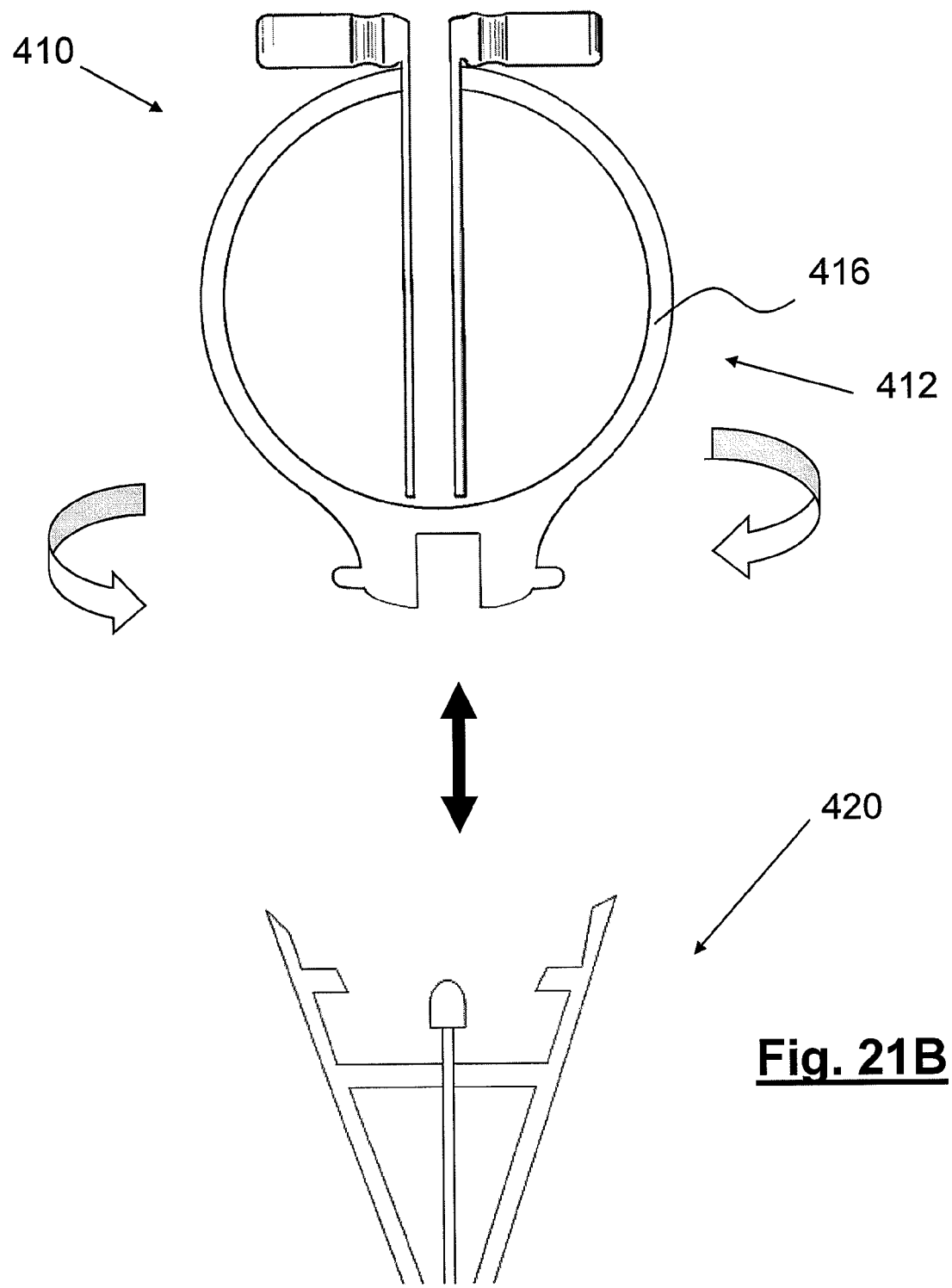
FIG. 21B is a cross-sectional view of part of the self supporting illuminated humming bird feeder in a partially exploded state in accordance with the present invention as shown in FIG. 21A.

FIG. 21B is a cross-sectional view of part of the self supporting illuminated humming bird feeder in a partially unassembled state, in accordance with the present invention shown in FIG. 21A. It shows the feeder assembly 412 detached from the support assembly 420. In such a detached state the reservoir portion 416 can be easily washed to remove stale liquid food solution without damaging any electrical wiring.

Figure 22:
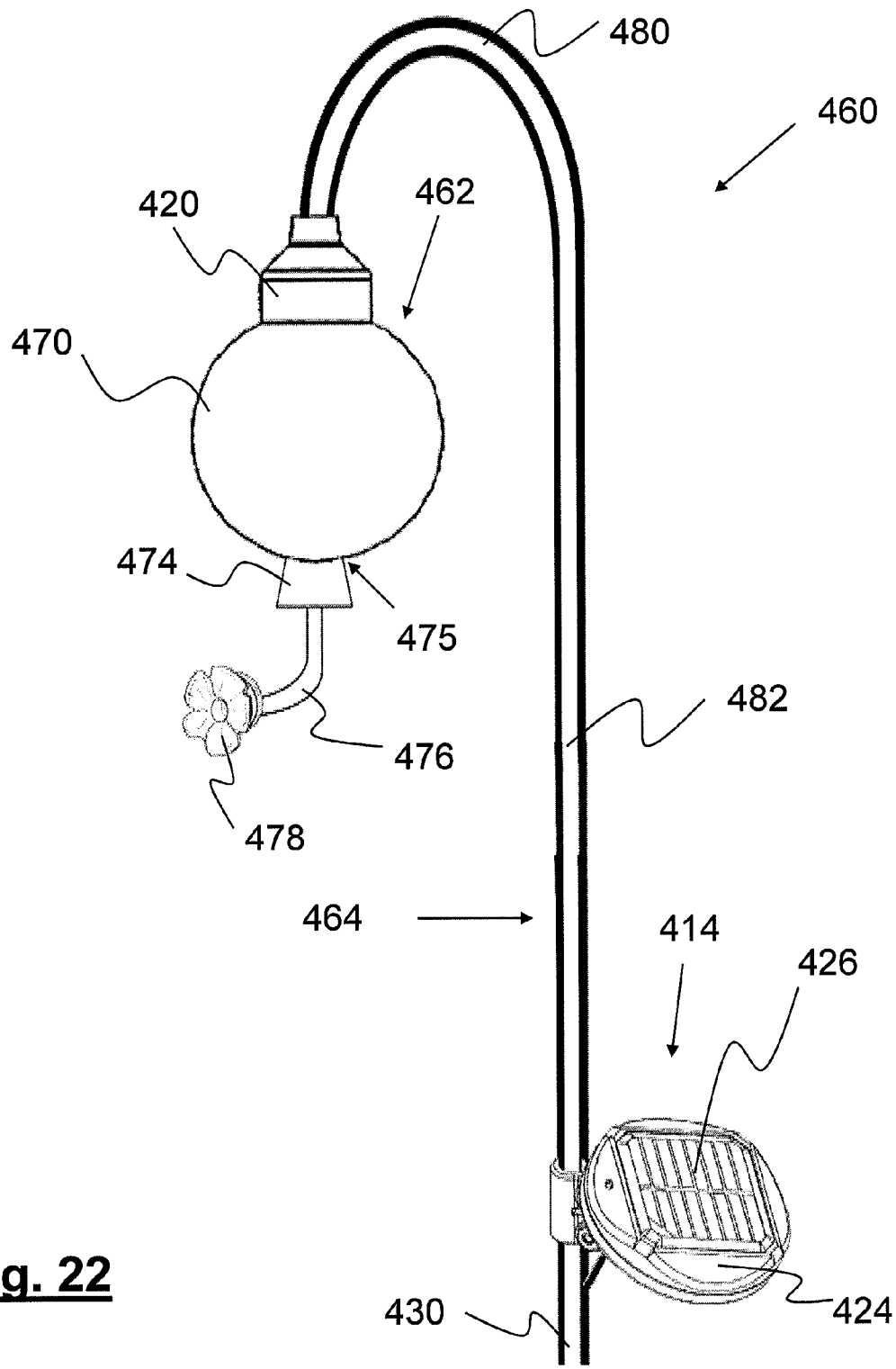
FIG. 22 is a schematic view of an assembled self supporting illuminated humming bird feeder in accordance with a twelfth embodiment of the present invention.

FIG. 22 is a schematic view of an assembled self supporting illuminated humming bird feeder, in accordance with a twelfth embodiment of the present invention. Referring to FIG. 22, the self supporting illuminated humming bird feeder 460 includes a feeder assembly 462 comprising a liquid food reservoir 470 and a feeding plug assembly 474 with a feeding tube 476 and liquid flow regulator 478. Disposed within an aperture 475 at a lower portion of the food reservoir 470 is the feeding plug assembly 474 which is easily releasably coupled to the liquid food reservoir 470. The feeding plug assembly 474, which couples with aperture 475 when the feeder is in a final state of assembly for use, comprises a plug portion that compresses against the inner rim of aperture 475 to create a waterproof seal to prevent food liquid leakage.

The feeder assembly 462 is releasably connected to a lighting element and support assembly 420, a support 464 assembly, and a collector unit 414. The lighting element and support assembly 420 typically includes a light producing means such as an incandescent lamp or LED 420 (not shown). Disposed upon the surface of the collector unit 414 are one or more solar photovoltaic panels 426 that in the present embodiment are of a crystalline silicon structure.

The lighting element and support assembly 420 are secured near the upper end of the support 480 a distance from the collector unit 414. The collector unit 414 typically contains at least one solar cell and a battery for collecting and storing solar energy during daylight hours. The solar cell and battery may be integrated in the collector unit 414 or the collector unit 414 may secure separately to the support assembly 464. Wiring (not shown) connects the lighting element and support assembly 420 to the collector unit 414 within and via the support assembly 464.

In the illustrated embodiment the support assembly 464 is embodied as a straight rod section of the hollow pole 482 with a curved downward upper section 480. The rod section 482 may be hollow and may have any cross section offering sufficient strength to support the lighting element assembly 422. It may be one monolithic rod or assembled from smaller sections.

Figure 23A:
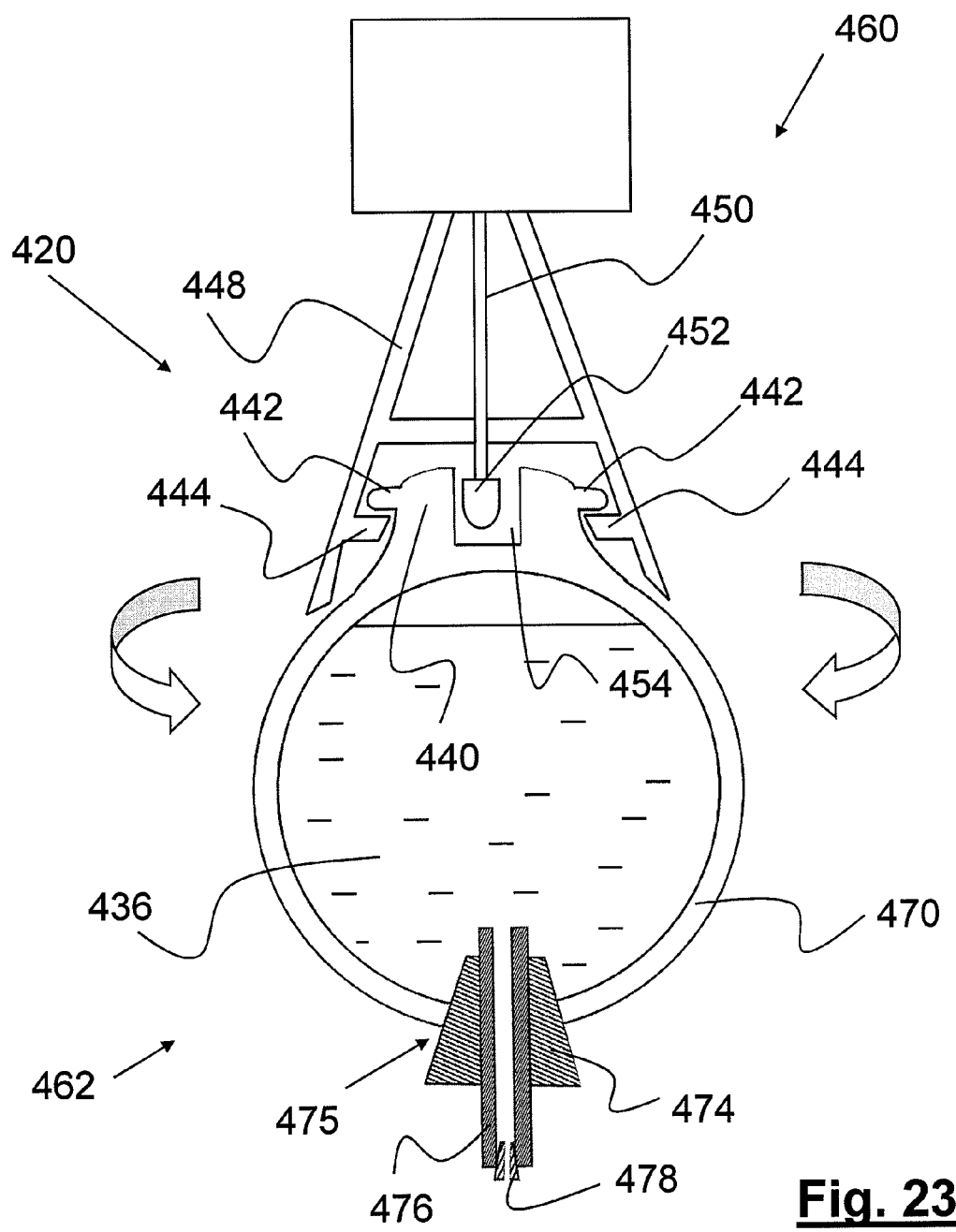
FIG. 23A is a cross-sectional view of a detail of the self supporting illuminated humming bird feeder in accordance with the present invention shown in FIG. 22.

FIG. 23A is a cross-sectional view of part of the self supporting illuminated humming bird feeder 460, in accordance with the embodiment shown in FIG. 22. It illustrates the feeder assembly 462 comprising an upper neck portion 440 that contains a socket receiving cavity 454. It shows a liquid food reservoir 470 and a feeding plug assembly 474 with a feeding tube 476 and liquid flow regulator 478. Disposed within an aperture 475 at a lower portion of the food reservoir 470 is the feeding plug assembly 474 which is easily releasably coupled to the liquid food reservoir 470. The upper neck portion has feeder protrusions 442 that releasably mate with socket protrusions 444 in the lighting element and support assembly 420 to releasably secure the feeder assembly 462 to the lighting element and support assembly 420. A low heat emitting light source such as at least one light emitting diode 452 is positioned within the lighting element and support assembly 420 to direct light through at least part of the reservoir portion 470 via the cavity 436. The light source 452 is energized via electrical connections 450 to the collector unit 414 of FIG. 20. The socket protrusions 444 are supported by a support frame 448 on the lighting element and support assembly 420. The unassembled food reservoir 470 is preferably constructed from a hand-blown glass with the neck portion 440 added and the aperture 475 drilled out as second and third manufacturing operations respectively. The food reservoir portion 470 is an elongated substantially spheriod shaped container for housing liquid food solution 438.

Figure 23B:
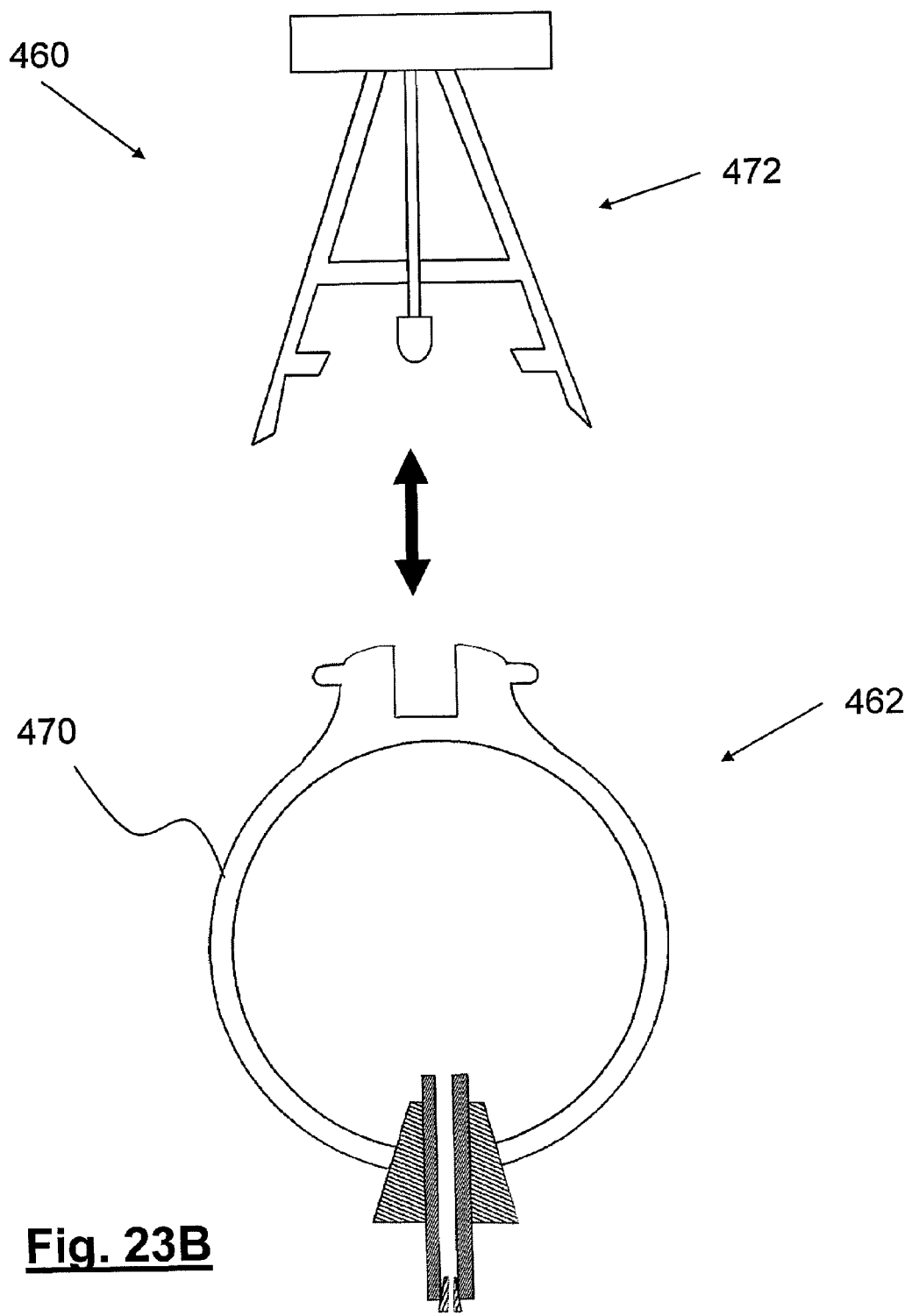
FIG. 23B is a cross-sectional view of part of the self supporting illuminated humming bird feeder shown in FIG. 23A in a partially exploded state.

FIG. 23B is a cross-sectional view of part of the self supporting illuminated humming bird feeder shown in FIG. 23A, in a partially unassembled state. It shows the feeder assembly 462 detached from the support assembly 472. In such a detached state the reservoir portion 4706 can be easily washed to remove stale liquid food solution without damaging any electrical wiring.

Figure 24A:
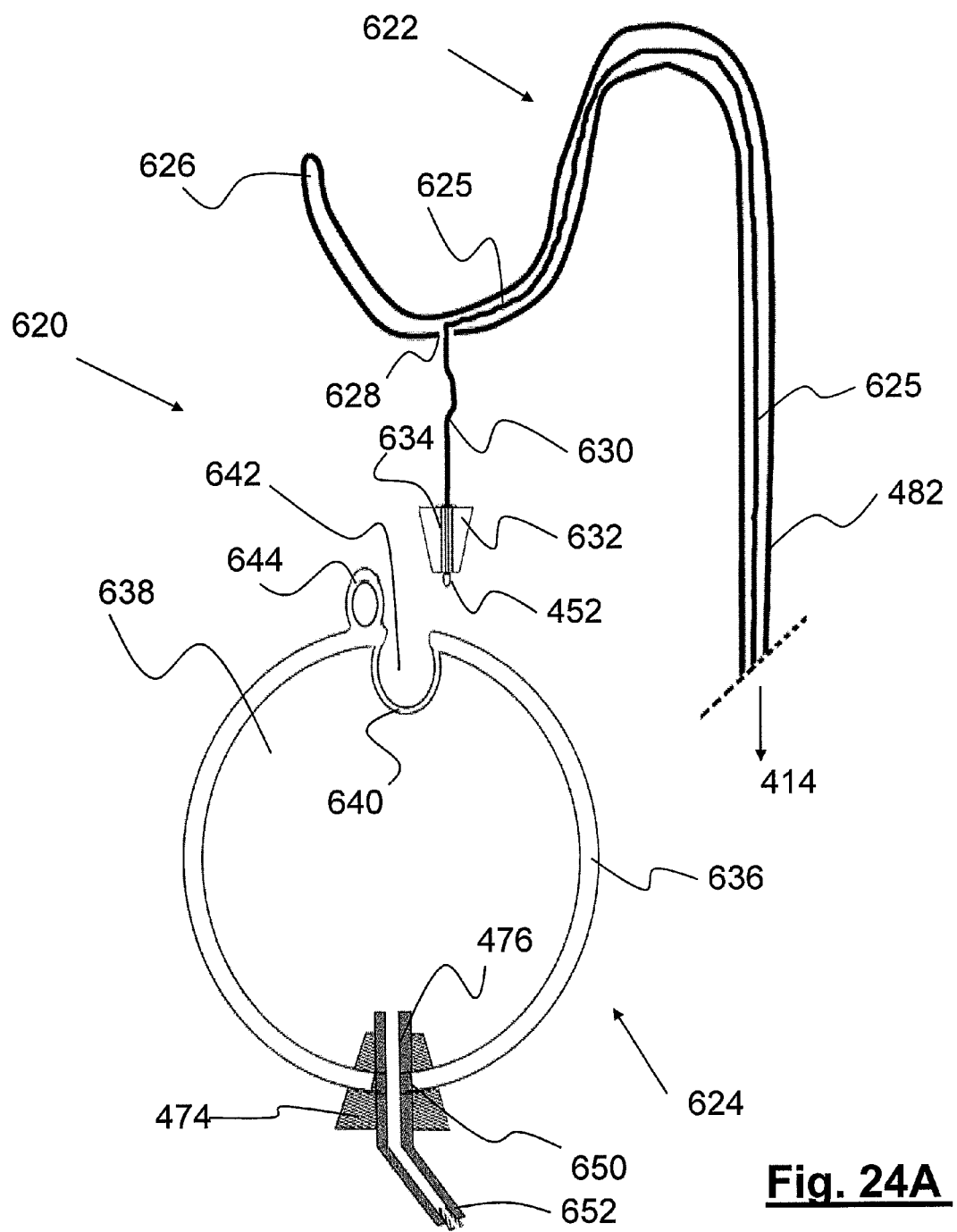
FIG. 24A is a cross-sectional view of part of a self supporting illuminated humming bird feeder in a partially exploded state in accordance with a thirteenth embodiment of the present invention.

FIG. 24A is a cross-sectional view of part of a self supporting illuminated humming bird feeder 620 in a partially unassembled state, in accordance with a thirteenth embodiment of the present invention. It shows the unassembled food reservoir assembly 624 comprising a reservoir portion 636 substantially enclosing a first chamber 638, an inner bubble 640 substantially enclosing a second smaller chamber 642, a lower aperture 650 and a feeding plug assembly 474. The main unassembled food reservoir body is preferably constructed from hand-blown glass and the outer reservoir portion 636 forms a first chamber 638. The second chamber 642 is created during manufacturing by blowing a smaller inner bubble 640 within the outer reservoir portion 636 of the reservoir body 624 and which is attached to the outer reservoir portion 636 forming a permanent air and water impermeable seal. Alternatively, the reservoir portion may be constructed integrally using a casting process or made be made from a thermopolymeric material, or an alternative manufacturing process may be employed whereby an aperture may be drilled into an upper location of the reservoir body 636 and a small light permeable cup glued into the aperture to create the sealed second chamber 640. An integral hanging ring 644 is also attached to the outer wall of the reservoir portion 636 adjacent to the aperture of the inner bubble 640. Other geometric shapes and sizes, as well as shapes in form of animals and flowers, or different colors for the outer wall 636 are possible. The volume within the first chamber 638, or course, can vary depending on size of the first chamber 638 and the amount of feeding solution to be distributed therein. In addition, the feeder could be incorporated for feeding other types of birds and animals.

The feeding plug assembly 474 is removably disposed within the aperture 650 at a lower portion of the food reservoir assembly 624. Both this aperture 650 and feeding plug may alternatively be located at the side or an upper portion or the food reservoir assembly 624. The feeding plug assembly 474, which couples with aperture 650 when the feeder is in a final state of assembly for use, comprises a resilient plug portion that compresses against the inner rim of aperture 650 to create a water and air proof seal to prevent food liquid leakage. Preferably, the compressible plug portion is made of rubber or silicon. A feeding tube 476 with a liquid flow regulator 652 penetrates completely through the plug portion into the first chamber 638 and provides an outlet for a controlled flow of liquid from the first chamber 638.

Since there are no other external openings in the liquid food reservoir body 636, the level of end of the feeding tube 476 can be held at a higher elevation than the feeding solution level in the food reservoir assembly 636. When a sufficient amount of feeding solution is taken from the reservoir assembly 636, air is able to bubble up in the reservoir assembly 636, thus releasing a quantity of feeding solution into feeding tube 476. Any air-permeable external aperture in the reservoir above the level of feeding solution in the reservoir assembly 636 would allow air to enter the reservoir assembly 636 and cause the feeding solution to leak out from either the aperture itself or the reservoir assembly 636 through the feeding tube 476 because air would be then allowed to displace the feeding solution. Thus it is critical for the feeding operation of the feeder reservoir 624 that the inner bubble 640 is air-impermeable and the joint between the inner bubble 640 and the reservoir portion 636 is also air-impermeable. If either the inner bubble 640 or the joint between the inner bubble 640 and the reservoir portion 636 were air-permeable, air would enter the reservoir portion 636 in an uncontrolled manner and the feeding solution would constantly leak out from the feeding tube 476 until the reservoir portion 636 was substantially empty of liquid.

FIG. 24A also shows a support and lighting structure 622 which comprises an at least partially hollow pole 482 bent at one end to form a hook with a tip 626. As shown later in FIG. 25A, a solar collector unit 414 (not shown) provides power via internal wiring 625 along part of the length of the pole 482. The wiring 625 exits the pole portion 482 via a wiring aperture 628 at a location proximate to a local nadir near the upper end of the pole 482. The external wiring 630 is attached to a compressible lighting plug 632, preferably made from a resilient rubber-like material, such as rubber or silicon. The external wiring 630 extends through a channel 634 in the lighting plug 632 ending at and electrically connected to at least one downward-facing light emitting diode 452. This may also be more than one light source and may emit a light of varying brightness and or color.

The food reservoir 624 is assembled to the support and lighting structure 622 by threading the tip 626 of the pole 482 through the integral hanging ring 644 of the food reservoir 624. The lighting plug 632 of the support and lighting structure 622, is releasably and compressibly inserted into the smaller chamber 642 of the inner bubble 640 of the food reservoir 624. The above-described releasably coupling is possible with the selection of a substantially rigid material constituting reservoir portion 636 and a wider and softer lighting plug assembly 632 such that some deformation of the lighting plug 632 takes place during the engagement of the surfaces. It is noted that appropriate tolerance, as well as proper material selection, between the coupling parts is essential to ensure that the surfaces are able to engage into place in a cooperative relationship, and to ensure that the surfaces maintain a secure waterproof position against each other thus preventing the accidental disassembling of the food reservoir 636 and the lighting plug assembly 632.

Figure 24B:
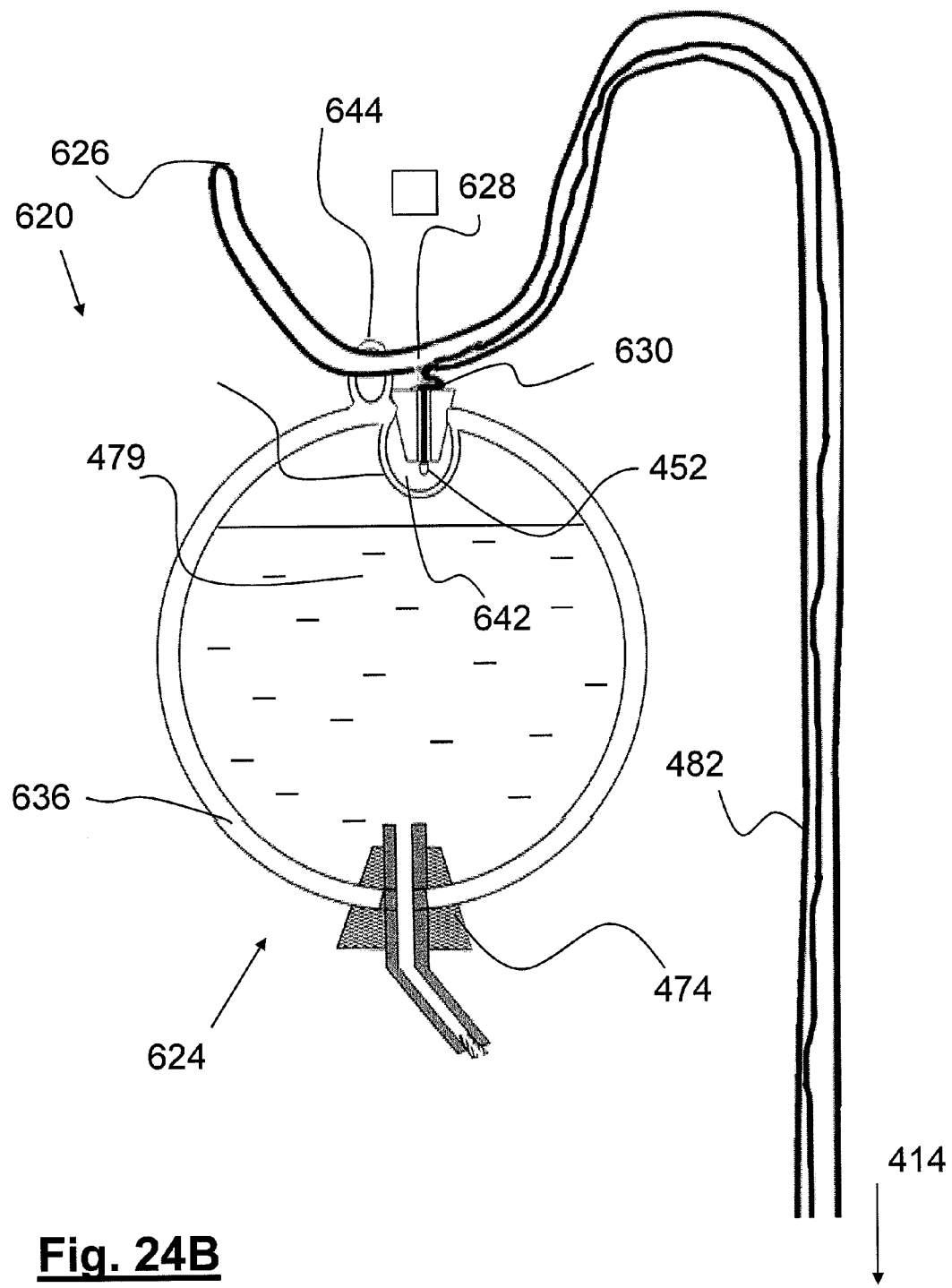
FIG. 24B is a cross-sectional view of part of the self supporting illuminated humming bird feeder in an assembled state in accordance with the present invention shown in FIG. 24A.

FIG. 24B is a cross-sectional view of part of the assembled self-supporting solar-powered illuminated hummingbird feeder 620 in accordance with the embodiment of the present invention shown in FIG. 24A.

Prior to use and once the food reservoir 636 is determined to be filled with a feeding solution 476, the feeding plug assembly 474 is pushed into the aperture 650 to complete the assembling of the feeder assembly 624. As described above in FIG. 24A, the food reservoir 624 is then assembled to the support and lighting structure 622. The inner bubble 640, feeding solution 479 and outer reservoir portion 636 are all at least partially light-permeable. When the appropriate power is applied to the light source 452, light is emitted by the food reservoir 624 via the inner bubble 640, through the feeding solution 479 and via the outer reservoir portion 636.

Because the feeding solution 479 is usually not completely light-transmissive, some light is both transmitted through and reflected off parts of the liquid feeding solution 479 causing part of the liquid feeding solution 479 to appear illuminated. Further, because the light-transmissive outer reservoir portion 636 is preferably not completely light-transmissive and contains different colored material including a fluorescent material, at least part of the light-transmissive outer reservoir portion 636 is illuminated in an aesthetically pleasing way.

Because the weight of the preferably hand-blown glass food reservoir when filled with feeding solution 479 could potentially create a tensile stress on the external wiring 630, the weight of the filled food reservoir 636 is instead carried by the preferably glass integral hanging ring 644, thus alleviating potential stress and damage to the wiring 630. The length of the external wiring 630 is minimized because the wiring exit aperture 628 is close to the local nadir of the pole 482 and the aperture of the inner bubble 640 is proximate to the integral hanging ring 644, so via gravity the feeder reservoir 624 is positioned so the visible external wiring can be kept to an unobtrusive length of 1 or 2 inches.

Unlike seed type bird feeders, hummingbird feeders use a liquid food solution rich in sugar. Accordingly, the solution can spoil very easily and hummingbirds will not consume spoiled feed solution. Most feeders should be cleaned bi-weekly. This usually necessitates immersion of the solution contacting parts in water. The electrical parts that create the solar illumination are not usually suitable for water immersion. Accordingly the releasable construction of the present invention shown in FIGS. 24A and 24B ensures some of the solar and water sensitive electrical parts are easily removable from the parts that require frequent washing and cleaning.

Figure 25A:
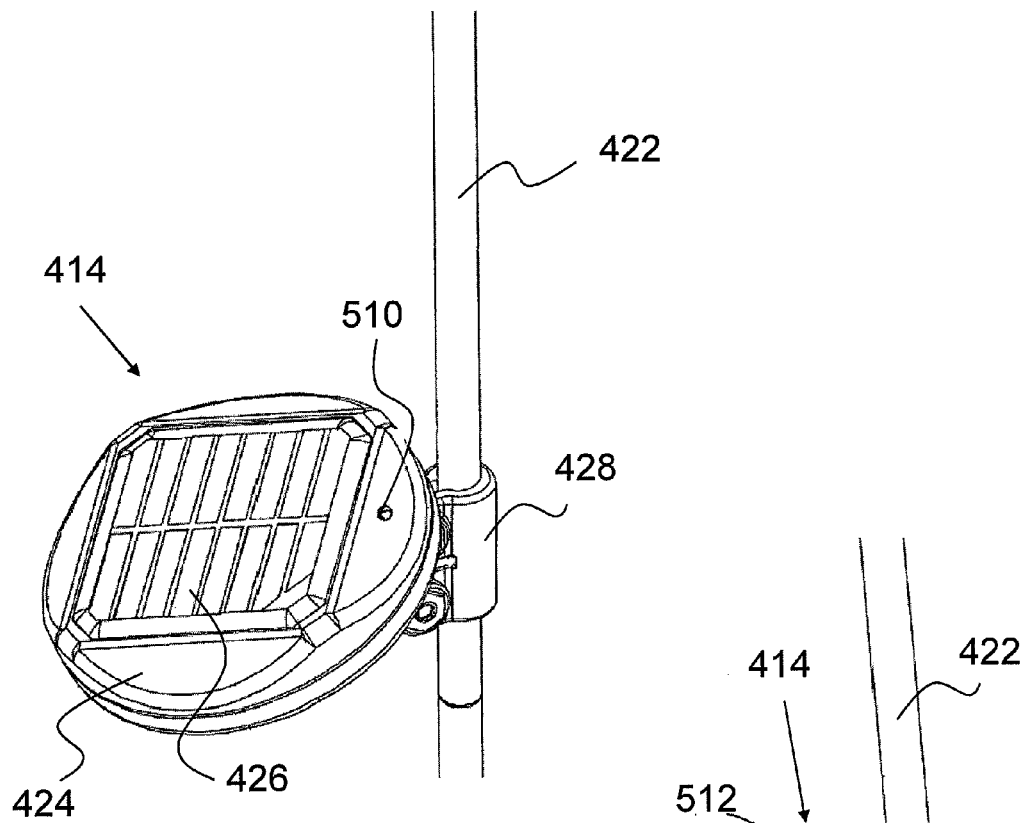
FIG. 25A is a top detail view of the solar collecting unit of the self supporting illuminated humming bird feeders in accordance with the present invention as seen in FIGS. 20, 22, and 24B.
Figure 25B:
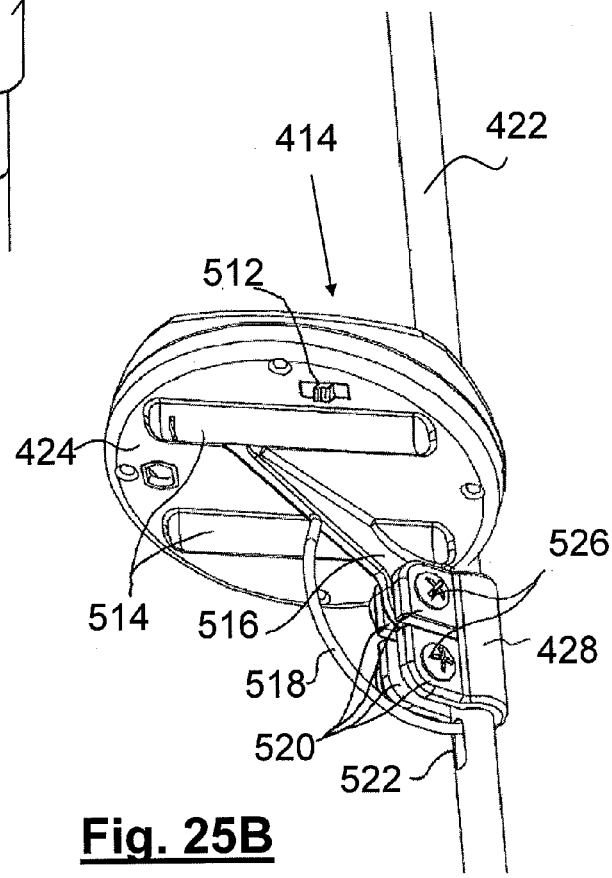
FIG. 25B is a bottom detail view of the solar collecting unit of the self supporting illuminated humming bird feeders in accordance with the present invention seen in FIGS. 20, 22, and 24B.

FIGS. 25A and 25B are first and second perspective views respectively of the solar collecting unit 414 of the self supporting illuminated humming bird feeders, in accordance with the present invention shown in FIGS. 20, 22, and 24B. Referring to FIGS. 25A and 25B, the collector unit 414 typically contains a solar cell 426 secured to a housing 424. Within the housing 424 is a rechargeable power source in the form of one or more rechargeable batteries which are recharged by the solar cell 426. In the preferred embodiment the rechargeable power source is in the form of two AA size 600 mA/hour nickel cadmium batteries 124. Alternatively, other rechargeable power sources may be used including one or more nickel metal hydride batteries, rechargeable alkaline batteries, lead acid batteries, lithium ion or polymer batteries or similar. Access to the batteries for replacement is through at least one user-accessible battery compartment or bay 514 located on the underside of the collector unit 414. The collector unit 414 may be adaptable to varying foliage and lighting conditions. For example, in the illustrated embodiment, the location of the collector unit 414 may be adjusted in vertical direction. Thus, in high thick foliage, the collector unit 414 may be secured higher on the support 422 to increase the amount of sunlight incident thereon. The collector unit 414 may also be tilted vertically to facilitate both storage and solar power collection.

Figure 26:
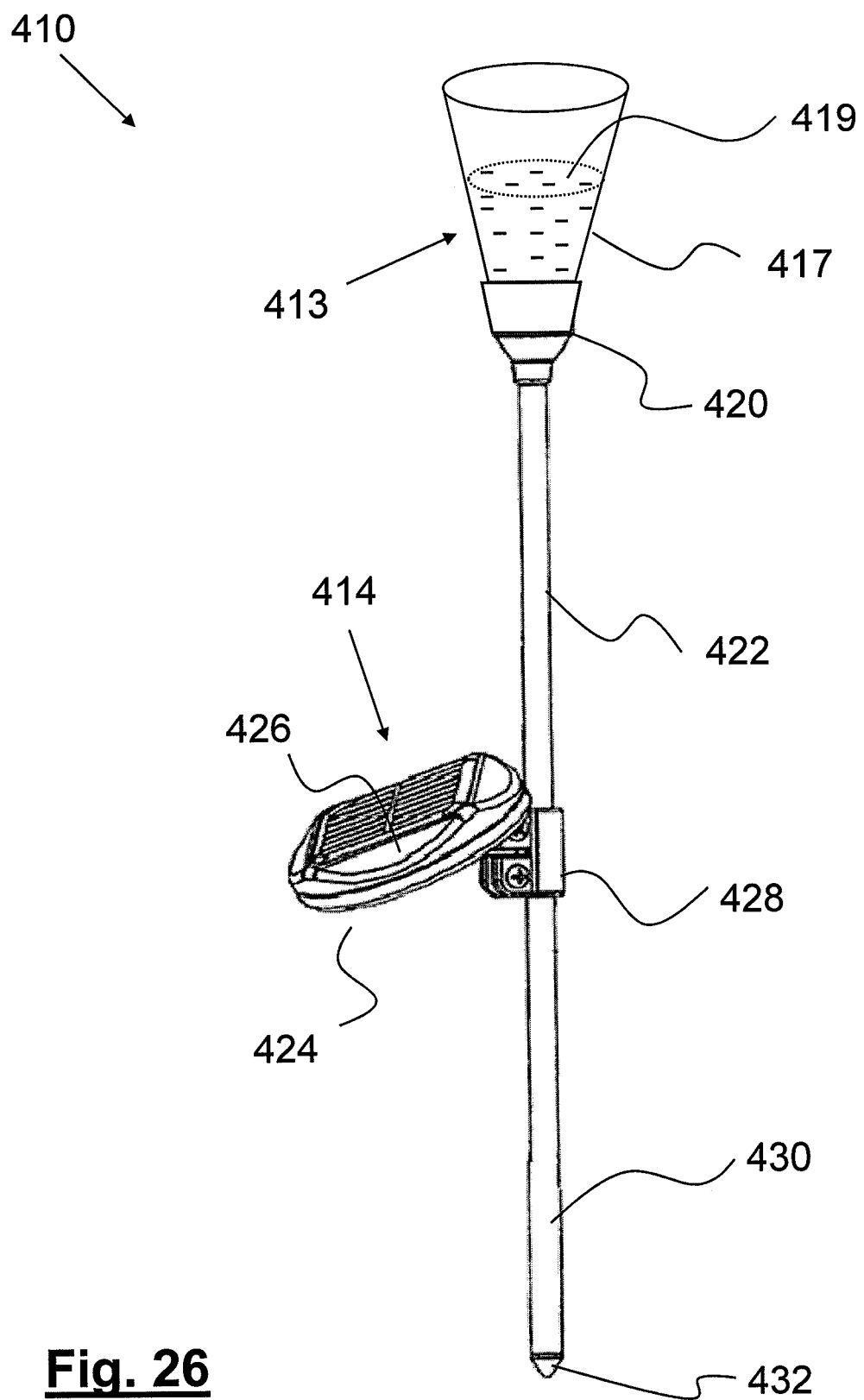
FIG. 26 is a schematic view of an assembled self supporting illuminated butterfly feeder in accordance with a fourteenth embodiment of the present invention.

Batteries 124 may be enclosed by the housing 424 or secured to the support 422 at a different location. A light sensor 510, typically positioned on the same face of the housing 424 as the solar cell 426, serves to automatically close an electrical circuit between the battery and lighting element assembly 422 at low light intensities. In other embodiments, the light sensor 510 is separate from the collector unit 414 and secures separately to the support 422 such as near the lighting element and support assembly 420, as shown in FIG. 26, or a substantial distance therefrom. Where the lighting element and support assembly 420 is separated from the light sensor 510, the light sensor 510 may be less likely to detect light from the lighting element and support assembly 420 and misinterpret lighting conditions. However, the light from the lighting element and support assembly 420 may be of insufficient intensity to cause such misinterpretations.

Power is provided to the light source by a rechargeable battery that is charged by a solar photovoltaic panel 426 made from silicon.

A wire 518 typically extends from the collector unit 414 to the lighting element and support assembly 420 as shown in FIG. 25B. In embodiments of the invention having a support 422 embodied as a hollow rod, the wire 518 may be directed through an aperture 522 in the rod 422 and pass through the rod 422 to the lighting element and support assembly 420. Alternatively, the wire 518 may wrap around the exterior of the support 422. In embodiments having a telescoping rod 422, coiling the wire 518 around the rod 422 enables adjustment in length without interference from the wire 518.

Bays 514 may be formed in the housing 424 to receive batteries for storing electrical energy generated by the solar cell 426 during daylight hours for use in the evening and at night. Alternatively, batteries may be stored in the lighting element and support assembly 420. In such an embodiment, the wire 518 would connect to the solar cell 426 and carry electrical power to the batteries. In some embodiments, a circuit board resides within the housing 424 and regulates voltage passing to and from the batteries and to the lighting element assembly 422. The circuit board may also receive the output of the light sensor 510 and turn on the lighting element assembly 422 when the output indicates low light levels and turn it off when the output indicates high light levels.

The versatility in positioning and orienting the collector unit 414 may be facilitated by a clamp 428 having a 'U' shape. Arms 520 of the clamp 428 receive fasteners 526, such as screws, bolts, or the like, which are selectively tightened to secure the clamp 428 to the rod 422. A flange 516 formed in the housing 424 may be positioned between the arms 520 to be clamped thereby. In some embodiments, one of the fasteners 526 also extends through the flange 516, establishing a point of rotation when adjusting the orientation of the collector unit 414. In operation, the fasteners 526 are loosened to permit alteration in the position and orientation of the collector unit 414 and then tightened to prevent further movement. The clamp 428 typically secures to the rod 422 near the aperture 522. In some applications, the clamp 514 secures over the aperture 522 to hinder the entry of contaminants and to make it less visible.

In some embodiments, an on/off switch 512 may secure to the housing 424. The on/off switch 512 is interposed between the batteries and the lighting element and support assembly 420, enabling a user to optionally turn off the lighting element assembly regardless of the output of the light sensor 510.

When the solar panel 426 is exposed to sufficient light, the solar panel 426 converts some of the solar energy to electrical energy and creates a current that passes through the diode to charge the battery 33, as shown in FIG. 7. Thus, during the day the solar panel 426 converts energy from the sun to charge the battery 33. The diode prevents the battery 33 from expending any power on the solar panel 426.

Also located within the housing 424 is the control unit 109, which may be arranged to sense the ambient light level, for example, in the present example, a light dependent cadmium sulfide resistor 204 located in a light exposed location upon the housing, and if a determination is made by the circuit that insufficient ambient light is available, a connection is made between the batteries 124 and a light source 402. An example of a circuit used in the control unit is shown in FIG. 7. If a determination is made that sufficient ambient light is available, a connection is not made between the batteries 124 and the light source 402 and current does not flow from the batteries 124. Specifically, the positive terminal of the battery 124 is connected to a switch, which is in turn connected to a 100 kΩ first resistor 41, as shown in FIG. 7. The first resistor is connected in series with a second, light dependent resistor 204. The second resistor 204 connects to the negative terminal of the batteries 124 to complete the lighting circuit. The value of resistance of the second resistor 204 depends upon the amount of light to which the second resistor 204 is exposed. When there is not much light, such as occurs at night, the value of the second resistor 204 increases. During the daytime, when there is sufficient light, the value of the second resistor 204 decreases. Accordingly, the resistor 204 allows the lighting circuit to operate only when there is insufficient light, i.e. at night.

In all of the above embodiments, the liquid food reservoir is effectively a lens that admits light. The lens can be made of glass, plastic, resin, or glass fibers. The lens material includes any formed material conventional to the art, such as glass, plastic or resin or glass fibers. The lens is made of glass and may be shaped substantially spherical, and may be impregnated directly with the phosphorescent material. The phosphorescent material may be a phosphorescent pigment. The luminescent material or pigment may be one or more of: Alkaline Earth Metal Aluminate (and can include Strontium, Magnesium, Calcium, and Barium, Silicon and Titanium and typically doped with Europium), Alkaline Earth Aluminate w/Fluorescent Pigment, Coated Alkaline Earth Aluminate, Alkaline Earth Silicate, and Zinc Sulfide. There should be no sulfur, uranium doped, or large amounts of Zinc mixed in with any of the luminescent material or pigment. Silicate base may be added to the manufacturing process to aid with the color melting into the glass surface. The luminescent material or pigment used is suitable for use with the heat involved with glass working and can be mixed in with raw clear glass powder. Large clumps of luminescent material or pigment should be avoided because such clumps may cause the piece to crack during cooling. Very fine diameter luminescent material or pigment is preferable.

Ultraviolet light emitted by a UV LED such as is made by Nichia of Japan, may strike the phosphorescent material in or on the food reservoir, and, therefore, the phosphorescent material is caused to emit visible light. The UV LED may be powered by a solar rechargeable battery source. A printed circuit board mounted controller may serve to automatically vary the brightness of the light source. Further, the printed circuit board mounted controller may selectively activate the light source in a time pulsed manner, The liquid food reservoir may be substantially constructed from hand-blown glass and comprise fluorescent and luminescent elements within it. This is achieved because a substantial percentage of the light emitted by the LED is in the ultraviolet light spectrum so that the LED emits at least some light in the blacklight ultraviolet wavelength spectrum.

At least some part of the liquid food reservoir exhibits fluorescence when excited by said LED and exhibits phosphorescence by emission of light by a luminescent element after excitation by the LED has ceased. The provision of the ultraviolet LED proximate to the phosphor assures that upon activation of the LED, the phosphor is excited and continues to phosphoresce after the LED has been deactivated.

Regardless of the application method, once the phosphorescent material is proximate to the surface of the liquid food reservoir, the UV LED directed into or located within the lens affords a highly efficient excitation of the phosphor resulting in efficient phosphorescent emission. A UV LED operative in the present invention preferably emits either UV-A corresponding to between 315 nm and 405 nm or UV-B corresponding to between 280 nm and 320 nm. Operative UV LEDs herein include gallium indium nitride and gallium nitride.

A user operable switch may selectively illuminate the LED. A battery within the housing selectively forms a circuit with contacts of the switch and leads of the LED upon switch engagement. The emission from the LED is directed onto phosphorescent laded glass lens from within. The now stimulated phosphorescent pigments emits visible light for a period of time consistent with the phosphorescent particulate decay time during the evening hours after the LED ceases to illuminate.

As a rule of thumb, if emission stops after the excitation source has been removed, then the resulting luminance is called fluorescence; if emission continues (so called "afterglow") then it is called phosphorescence.

The excitation time and saturation are primarily dependent on ultraviolet irradiance of the material. Phosphorescent paints, enamels and colorants are well known to the art and include, for example, U.S. Pat. Nos. 1,407,534; 1,637,963; 2,463,182; and 5,472,737. The choice of phosphor being dictated by the desired color of phosphorescence. Exemplary phosphor materials known to the art illustratively include group II metal-calcogenides, rare earth oxides, sulfides, phosphates, and combinations thereof doped with lanthanide series ions, such as $CaSr2S:Bi$, $CaAl2O4:Eu, Nd$; and $CaSrS:Eu, Dy$. Specific compositions and colors are well known to the art as detailed, for example, in U.S. Pat. Nos. 2,372,071; 2,979,467; 5,043,096; 4,857,228; 5,424,006; and 5,376,303. It is appreciated that multiple color phosphors are readily applied to a lens to yield regions of differing color emission.

The best light sources for excitation are those rich in ultraviolet light.

The light source includes at least one of, at least LED, and a phosphorescent emitter element. The light source is a light emitting diode (LED). The light source may also has a variable color output provided by at least two light emitting diodes where the first light emitting diode has a first single color output and a second light emitting diode where the first color output differs from the second color output. In one of the instances of a single LED, or multiple LEDs, the light source includes a UV output or UV LED. The variable color light source optionally includes a third light emitting diode having a third color output, where the third color output varies from the second color output. The variable color output of the light source is varied automatically through the printed circuit board controller, which automatically cycles the light source color upon initial switch activation and continues to cycle the colors until switch deactivation. Typical cycle times range from 5 to 300 seconds.

Alternatively, the controller may vary the brightness of the light source up and down in brightness. Optionally, the cycle includes a period of no emission to allow for isolate visible phosphorescence emission. When multiple light sources are present, it is appreciated that two or more light sources having different emission characteristics can be controlled to afford different illumination levels and therefore a varying color emission. The light source is oriented to direct a majority of the emission there from into and through the lens.

In an alternative embodiment, the light source is a UV LED, as described above and the lens is decorated with a phosphorescent pigment that is stimulated by the emission of UV LED. When the light source is UV LED, the UV LED is activated in a time pulsed manner by the controller consistent with the decay time of the phosphor pigment.

The switch is provided for selectively forming an electrical engagement between the light source and the battery source. The switch is automatically activated by light levels through the use of a cadmium sulfide light activated resistor. The switch is a first switch and a there is second a manual user operable switch. The second switch is preferably accessible externally to the lens.

In a further embodiment, in which the lighting system includes a light emitting diode that has an emission spectrum that includes light capable of exciting a luminescent material associated with the hummingbird feeder, the lighting subsystem may include circuitry for cycling the light emitting diode between an "on" state that causes the luminescent material to emit fluorescent light and an "off" state that allows the luminescent material to emit phosphorescent light. Cycling from the on to the off state may take place in a time scale of several seconds, or it may take place over a time scale of minutes, or any suitable time scale in-between.

Moreover, the lighting system may also include a switch to allow a user to select between the light emitting diode being in the "on" state, being in the "off" state or being in the state of cycling between the "on" and the "off" state.

FIG. 26 is a schematic view of an assembled of a self supporting illuminated butterfly feeder 410, in accordance with a fourteenth embodiment of the present invention. Referring to FIG. 26, a self supporting illuminated butterfly feeder 410 includes a liquid food reservoir 417 for filling with a liquid food source. The reservoir 417 is releasably connected to a lighting element and support assembly 420, a support 422, and a collector unit 414. The lighting element and support assembly 420 typically includes a light producing means such as an incandescent lamp or LED 420 (not shown). In some embodiments, a lighting element shield may be positioned over the lighting element and lighting element seat to protect the lighting element from moisture. Due to the rapidly spoiling nature of the liquid food source 419 for the butterflys, the liquid food reservoir 417 would be released for washing every few days. The shape of the reservoir 118 may be narrow like a flower and shaped in a decorative flower-like form or wide in a bowl or basing design to accommodate multiple simultaneous feedings. Disposed upon the surface of the collector unit 414 are several solar photovoltaic panels 426 that in the present embodiment are of a crystalline silicon structure.

The lighting element and support assembly 422 secures near the upper end of the support 422 a distance from the collector unit 414. The collector unit 414 typically contains at least one solar cell and a battery, or like means, for collecting and storing solar energy during daylight hours. Wiring (not shown) connects the lighting element assembly 420 to the collector unit 414 within and via the hollow support 422.

In the illustrated embodiment, the rod 422 is made of stainless steel due to its resistance to weathering, however, aluminum, brass and rigid, weather-resistant plastics such as polycarbonate, polypropylene, or polyvinylcholoride, may also be used.

Beneath the collector unit is a lower stake portion 430 which typically inserts partially into the soil or other substrate and may have a sharpened tip 432 to facilitate insertion. The sharpened tip 432 is either integrally formed with the lower stake portion 430 or secured by threads, press-fit, weld, or like attachment means. In other embodiments, the lower stake portion 430 may be supported by a broad-based stand or other structure that simply rests on the substrate. To preserve the aesthetic aspects of the feeder 410 it may be advantageous to position the collector unit 414 away from the liquid food reservoir 416.

Figure 27A:
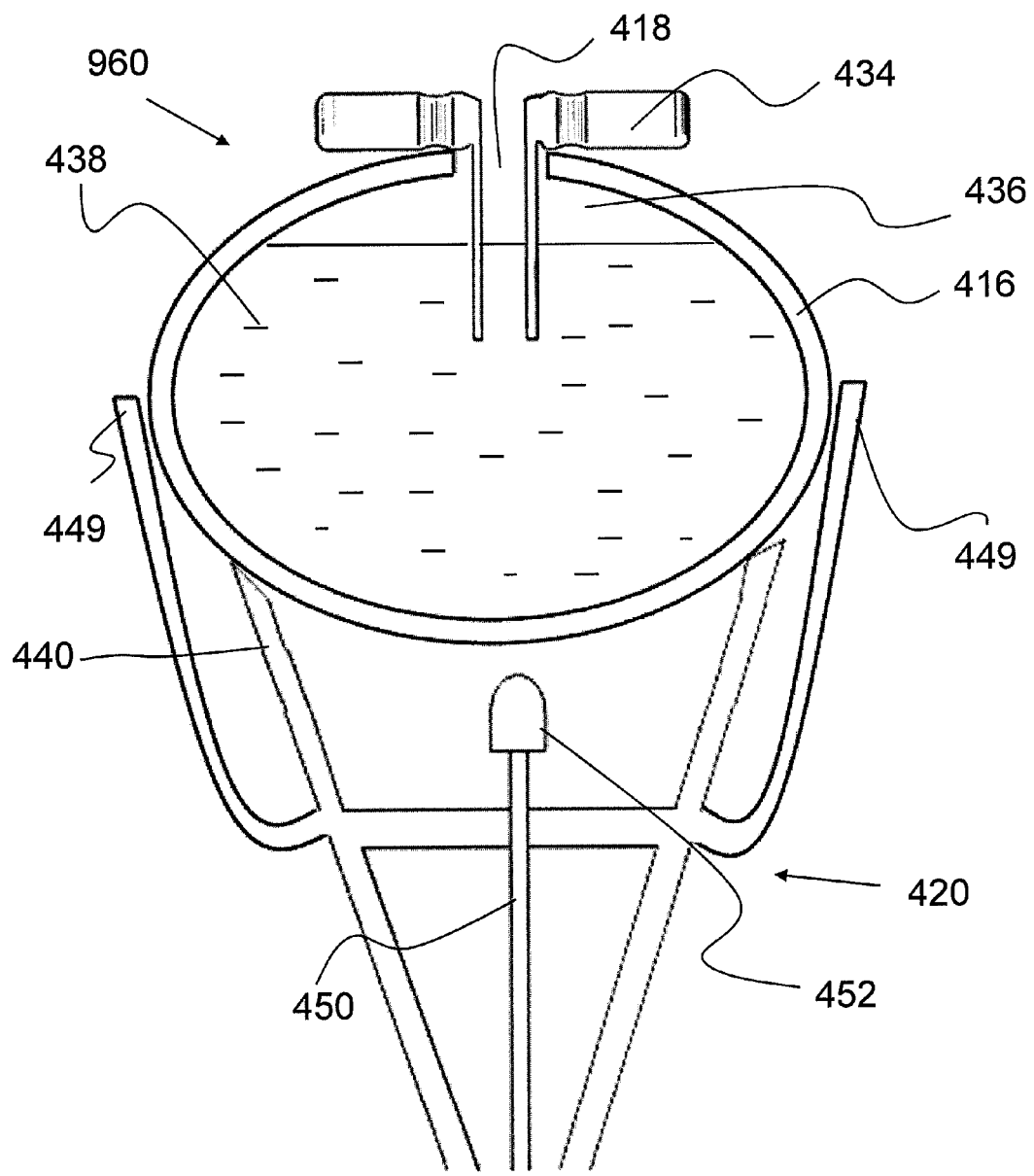
FIG. 27A is a cross-sectional detail view of a self supporting illuminated humming bird feeder in accordance with a fifteenth embodiment of the present invention.

FIG. 27A is a cross-sectional view of part of a self supporting illuminated humming bird feeder 960, in accordance with a fifteenth embodiment of the present invention. It discloses a reservoir portion 416 substantially enclosing a cavity 436, and an upper feeding port 418. A liquid food solution is poured into the reservoir portion 416 via the feeding port 418. It further shows a lighting element and support assembly 420 having a reservoir support frame 449 that extends at least partly up and around the reservoir portion 416 to reduce the likelihood of the reservoir portion 416 being unintentionally removed from the lighting element and support assembly 420 and to position the reservoir portion to optimally receive light emitted from the lighting element and support assembly 420. A low heat emitting light source such as at least one light emitting diode 452 is positioned within the lighting element and support assembly 420 to direct light through at least part of the reservoir portion 416. The light source 452 is energized via electrical connections 450 to a collector unit 414 as shown in FIG. 25. A decorative feeding tube 434 is positioned so that a portion of the feeding tube 434 is directed downward towards the liquid food solution 438. The feeding tube is removable for washing. The unassembled food reservoir 416 is preferably constructed from a hand-blown glass with the feeding port 418 drilled out as second manufacturing operation. The food reservoir portion 416 is a substantially spheriod shaped container for housing liquid food solution 438. Other geometric shapes and sizes, as well as shapes in form of animals and flowers, of different colors for the solution reservoir are possible.

Figure 27B:
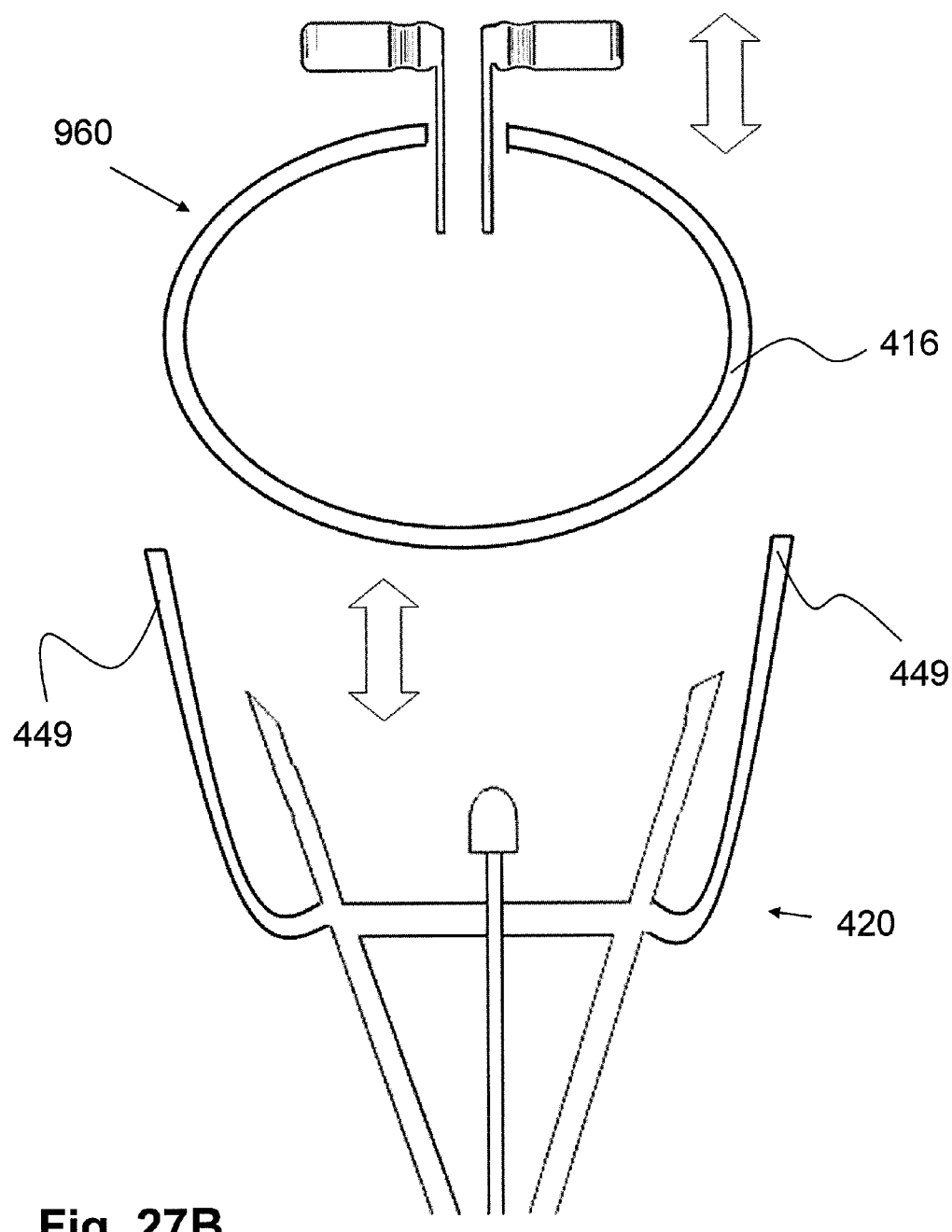
FIG. 27B is a cross-sectional detail view of the self supporting illuminated humming bird feeder in a partially exploded state in accordance with the present invention shown in FIG. 27A.

FIG. 27B is a cross-sectional view of part of the self supporting illuminated humming bird feeder 960 in a partially unassembled state, in accordance with the present invention shown in FIG. 27A. It shows the reservoir portion 416 detached from the lighting element and support assembly 420. In such a detached state the reservoir portion 416 can be easily washed to remove stale liquid food solution without damaging any electrical parts or wiring.

Figure 28A:
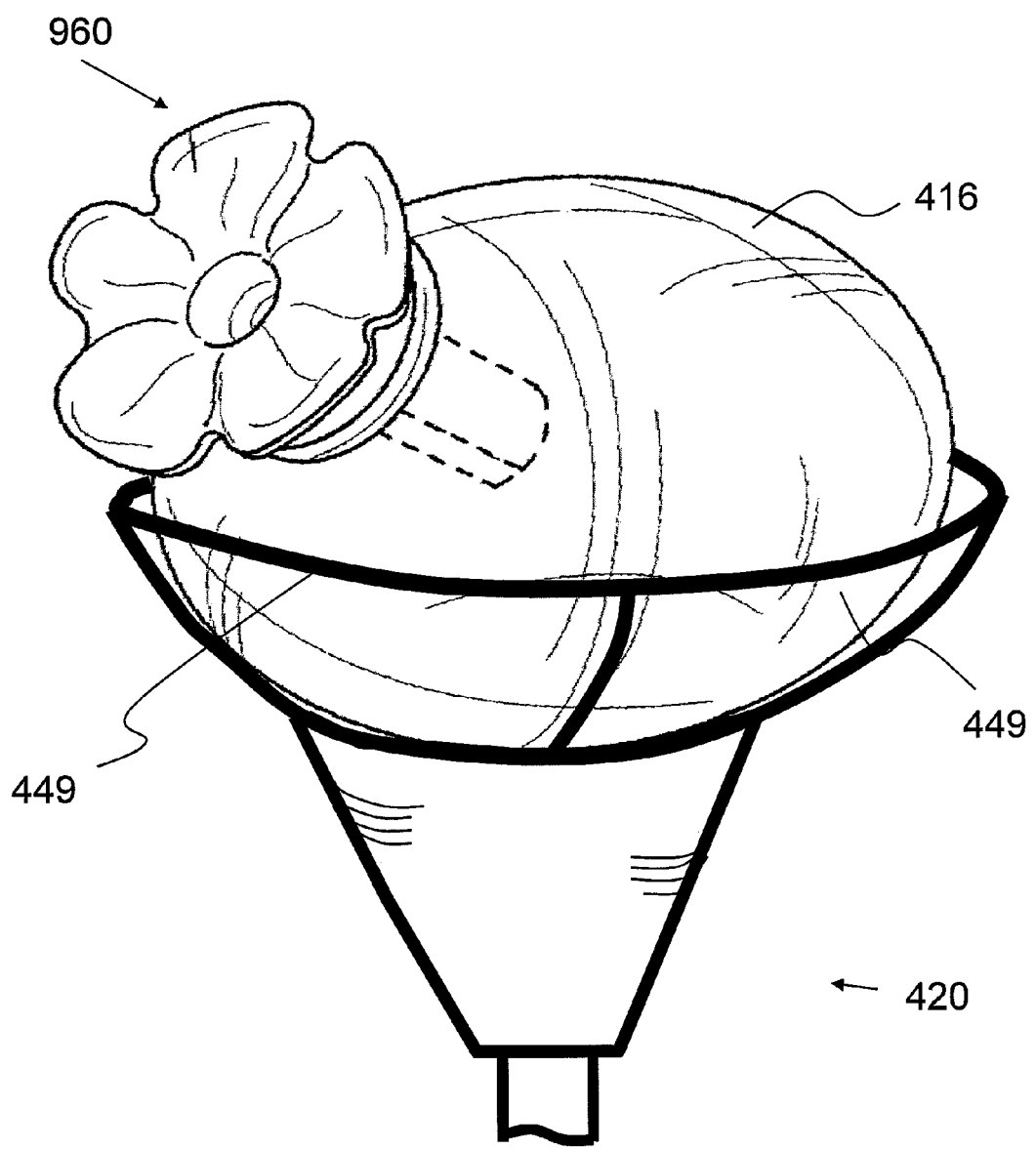
FIG. 28A is a schematic view of an assembled self supporting illuminated humming bird feeder similar to the embodiment shown in FIG. 27A.

FIG. 28A is a schematic view of a part of an assembled self supporting illuminated humming bird feeder, similar to the present invention shown in FIG. 27A. It shows the reservoir portion 416 seated in the reservoir support frame 449 of the support assembly 420.

Figure 28B:
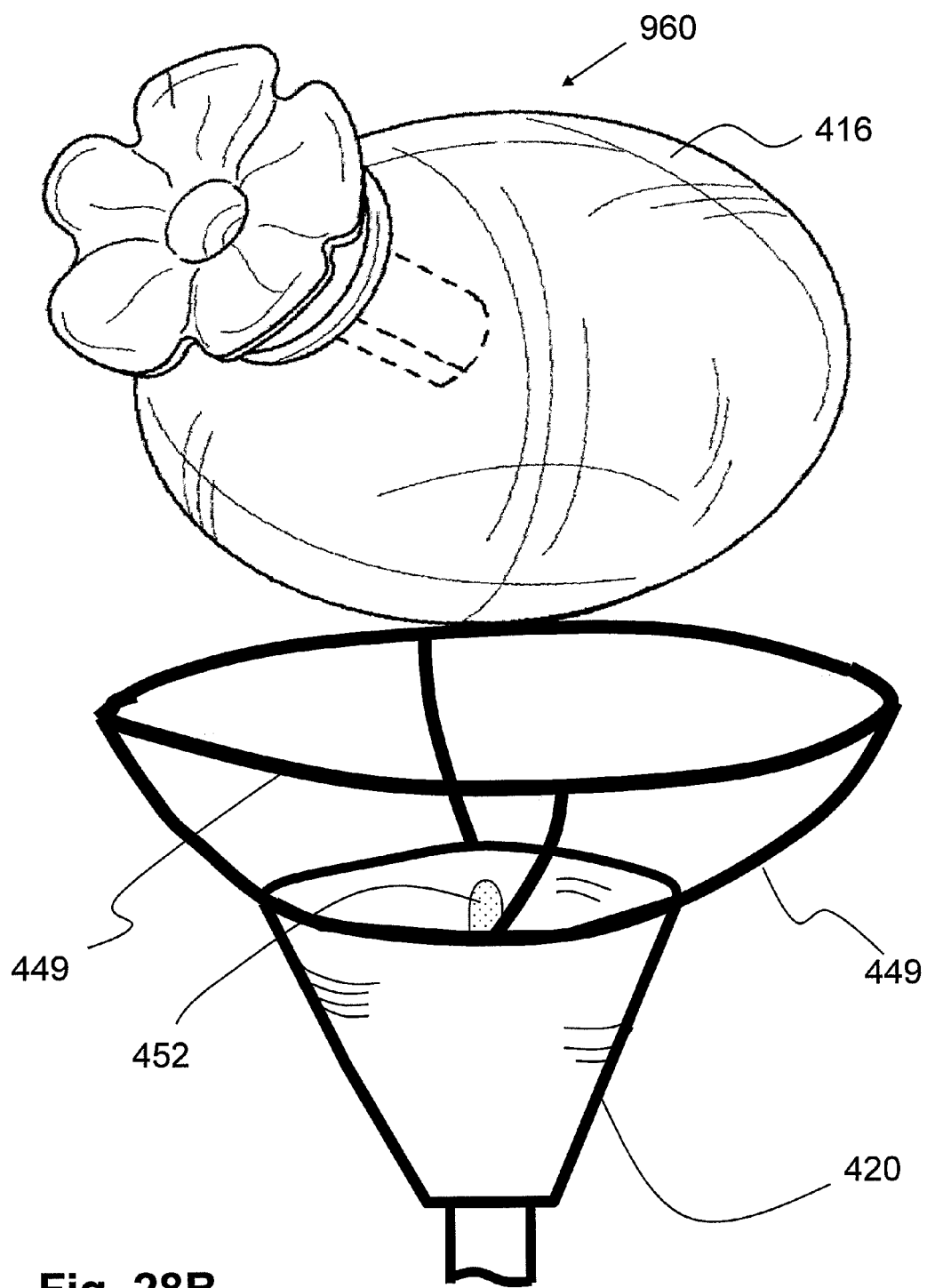
FIG. 28B is a schematic detail view of the self supporting illuminated humming bird feeder in a partially exploded state in accordance with the present invention shown in FIG. 28A.

FIG. 28B is a schematic view of part of the self supporting illuminated humming bird feeder in a partially unassembled state, in accordance with the embodiment shown in FIG. 28A. It shows the reservoir portion 416 detached from the lighting element 452 and the reservoir support frame 449 of the support assembly 420. In such a detached state the reservoir portion 416 can be easily washed to remove stale liquid food solution without damaging any electrical parts or wiring.

In the preferred embodiment, the hummingbird feeder comprises a light-permeable food reservoir for holding an at least partly light-permeable liquid food source, at least one feeding portion associated with the food reservoir; a rechargeable electrical battery, a solar energy system conductively coupled to an electrical charging system for collecting solar energy, converting the solar energy into electrical energy, and transferring the electrical energy to the rechargeable battery, and a light source electrically coupled to the rechargeable battery for receiving electrical energy from the battery at night and situated such that a portion of the liquid food source emits light at night via a portion of the food reservoir.

In the preferred embodiment, the hummingbird feeder comprises a mechanical subsystem for releasably connecting together the solar energy system and the food reservoir.

In the preferred embodiment, the hummingbird feeder includes a photoresistor conductively coupled to the rechargeable battery for activating and deactivating the battery depending upon the amount of light hitting the photoresistor.

In the preferred embodiment, the hummingbird feeder has a cap portion attached to the food reservoir where the solar energy system is carried by the cap portion and there is a mechanical subsystem for releasably connecting together the cap portion and the food reservoir.

Alternatively, in the tenth embodiment, there may be a hanging assembly adaptor that any existing suspendible bird feeder may hung from that a user can program to set an empty weight or "refilling weight" weight of the feeder. When the seed level falls such that the weight of the feeder is below the user-set "refill weight", the hanging assembly provides an alert for an owner to refill the feeder. The alert is a visual alert such as a flashing light. The hanging assembly is solar powered.

In the tenth embodiment a user fills the food reservoir to a level that is deemed "almost empty". On the hanging assembly, the user activates a momentary contact switch. When the momentary contact switch is depressed then circuit "learns" the predetermined weight of the feeder and the low level of food therein. The weight setting is stored in the memory of an integrated circuit in part of the circuit. The user then fills the rest of the food reservoir with food. When the food is consumed by the birds and the bird feeder and the food level drops below the weight that was set by the user, the alert system is activated.

In the tenth embodiment, the cap portion of the hummingbird feeder has a suspension cable for hanging the feeder, a circumferential outwardly and upwardly extending lip surrounding the cap portion creating a cup portion suitable for containing water which when partially filled may discourage ants from moving from the suspension cable to the cup wall and further to the feeding portion below. Also, the solar energy system is capable of charging through the light transmissive surface of the cap portion and through the water.

In the second embodiment there is disclosed a hummingbird feeder comprising a support housing, a light permeable food reservoir suspended below the housing for holding a light-permeable liquid hummingbird food source, a feeding portion associated with the food reservoir, a rechargeable electrical power source, a solar panel carried by the support housing and conductively coupled to an electrical charging system for collecting solar energy, converting the solar energy into electrical energy, and transferring the electrical energy to the rechargeable electrical power source. There is also a lighting subsystem proximate to the food reservoir and electrically coupled to the rechargeable electrical power source for receiving electrical energy from it and for illuminating some of the liquid food source when the food reservoir contains the liquid so that a the liquid food source is visible from outside the food reservoir in low light conditions.

In the second embodiment there is disclosed a hummingbird feeder comprising a transparent food reservoir for storing a liquid food source, a feeding portion associated with the food reservoir, a first light source comprising a luminescent material situated such that a portion of the food reservoir emits light, a second light source having a suitable wavelength and being situated such that the second light source causes the first light source to emit light; and wherein the second light source is situated such that a portion of the liquid food source emits light via the light transmitting region of the food reservoir and generated by the second light source when the food reservoir contains the liquid food source.

In the second embodiment, the hummingbird feeder further comprises a rechargeable power source connected so as to provide power to the second light source.

In the second embodiment, the hummingbird feeder further comprises a solar panel, a control circuit and a light sensor, connected such that the rechargeable power source accumulates charge when the solar panel is exposed to ambient light level of sufficient intensity and that when the light sensor detects ambient light lower than a predetermined level the control circuit connects the second light source and the rechargeable power source such that the second light source emits light.

In the second embodiment, the second light source is one or more light emitting diodes.

In the second embodiment, the luminescent material comprises a phosphorescent or fluorescent material.

In the fifth embodiment the hummingbird feeder has a lighting subsystem such that light is emitted from below by a portion of the liquid food source via the food reservoir. In the fifth embodiment the rechargeable electrical power source is proximate to the feeding portion.

In the fifth embodiment at least part of the solar energy system is suspended below the food reservoir.

In the sixth embodiment, the hummingbird feeder has a cap, a light permeable food reservoir for holding a light-permeable liquid food source coupled to extend below the cap, a feeding portion below the food reservoir coupled to extend below the food reservoir, a rechargeable electrical battery, a solar panel conductively coupled to an electrical charging system for collecting solar energy, converting the solar energy into electrical energy, and transferring the electrical energy to the rechargeable electrical power source; an LED lighting subsystem carried directly by the cap and electrically coupled to the rechargeable electrical battery for receiving electrical energy so light is emitted by the liquid food source via the food reservoir.

In the sixth embodiment, the solar panel is carried by the cap and there is a mechanical subsystem for releasably connecting together the cap and the food reservoir.

In the ninth embodiment there is disclosed a light fixture which comprises a light housing, a hanging support member coupled to the light housing for supporting the light housing, a rechargeable battery disposed in the light housing, a lighting element disposed within the light housing and being conductively coupled to the rechargeable electrical power source, a solar panel carried by the light housing, where the solar panel is adapted to collect solar energy and convert the solar energy into electrical energy. The solar panel is conductively coupled to the rechargeable battery such that the solar energy collected and converted into electrical energy recharges the rechargeable electrical power source. The ninth embodiment further comprises an additional solar panel releasably suspended from and below the light housing and connected to the rechargeable battery by a releasable electrical cable so that the additional solar panel is adapted to collect solar energy and convert the solar energy into additional electrical energy. The additional solar panel is conductively coupled to the rechargeable electrical power source, such that the additional solar energy collected and converted into electrical additional energy recharges the rechargeable battery and the additional solar panel is removably suspended beneath the light housing.

Although the invention has been described in language specific to structural features and/or methodological acts, it is to be understood that the invention defined herein is not necessarily limited to the specific features or acts described. Rather, the specific features and acts are disclosed as exemplary forms of implementing the claimed invention.

We claim:

1. A solar powered bird feeder apparatus having a top and a bottom, said apparatus comprising:
   a light transmission reservoir for holding liquid bird feed;
   a liquid bird feed delivery device for delivering said liquid bird feed to a bird outside of said reservoir;
   a light source attached to said apparatus for illuminating at least part of said liquid bird feeder within said reservoir;
   a solar cell means connected to said apparatus and to said light source for powering said light source;
   battery means connected to said solar cell means for storing energy from said solar cell means during the day; and,
   control circuit means connected to said battery means and said solar cell means for turning on said light source when it gets dark.

2. The apparatus of claim 1 further comprising:
a photosensitive means connected to said control circuit for detecting when it is light or dark.

3. The apparatus of claim 2 further comprising:
an On/Off switch connected to said control circuit means for turning said apparatus on or off.

4. The apparatus of claim 2 wherein said solar cell means is located below said apparatus.

5. The apparatus of claim 4 wherein said solar cell means is suspended by flexible wires from below said apparatus.

6. The apparatus of claim 1 further comprising:
a weight sensing detector means attached to said apparatus and said control circuit means for detecting when said reservoir runs low on liquid bird feed,
wherein said light source produces a signal to indicate that said reservoir is running low on said liquid bird feed.

7. The apparatus of claim 1 wherein said light source comprises at least one solid state light source which does not get hotter than 100° Fahrenheit in order to minimize spoilage of said liquid bird feed.

8. The apparatus of claim 7 wherein said solid state light source comprises at least one substantially white light emitting diode.

9. The apparatus of claim 7 wherein said solid state light source comprises at least one light emitting diode that emits light substantially in the UV light spectrum.

10. The apparatus of claim 7 wherein said solid state light source comprises at least two solid state light sources of different wavelengths.

11. The apparatus of claim 7 wherein said solid state light source is located adjacent to the reservoir in order to better indicate when the reservoir needs refilling.

12. The apparatus of claim 11 wherein said reservoir has a wall and said solid state light source is mounted in said wall.

13. The apparatus of claim 7 further comprising:
coupling means for attaching said reservoir to said apparatus,
wherein said coupling means can be easily manipulated so that said reservoir may be efficiently and quickly removed from said apparatus for cleaning.

14. The apparatus of claim 1 further comprising:
attachment means connected to said apparatus; and,
mounting means connectable to said attachment means for suspending said apparatus.

* * * * *